(12) United States Patent
Vertelney et al.

(10) Patent No.: US 11,047,701 B2
(45) Date of Patent: Jun. 29, 2021

(54) USER INTERFACE SYSTEM AND METHOD FOR A VEHICLE NAVIGATION DEVICE

(71) Applicant: BlackBerry Corporation, San Ramon, CA (US)

(72) Inventors: Laurie J. Vertelney, Palo Alto, CA (US); Daniel M. Kohn, Palo Alto, CA (US); Steven C. Wollenberg, Piedmont, CA (US); Brian E. Smartt, Sunnyvale, CA (US); Paul J. Lima, San Jose, CA (US); Eric S. Wels, Boulder Creek, CA (US)

(73) Assignee: BlackBerry Corporation, San Ramon, CA (US)

( * ) Notice: Subject to any disclaimer, the term of this patent is extended or adjusted under 35 U.S.C. 154(b) by 231 days.

(21) Appl. No.: 15/365,552

(22) Filed: Nov. 30, 2016

(65) Prior Publication Data

US 2017/0146357 A1     May 25, 2017

Related U.S. Application Data

(63) Continuation of application No. 14/080,356, filed on Nov. 14, 2013, now Pat. No. 9,518,835, which is a
(Continued)

(51) Int. Cl.
| | |
|---|---|
| *G01C 21/36* | (2006.01) |
| *G08G 1/0968* | (2006.01) |
| *G08G 1/0969* | (2006.01) |

(52) U.S. Cl.
CPC ......... *G01C 21/3617* (2013.01); *G01C 21/36* (2013.01); *G01C 21/367* (2013.01);
(Continued)

(58) Field of Classification Search
None
See application file for complete search history.

(56) References Cited

U.S. PATENT DOCUMENTS 4,388,272 A    6/1983   Gesteland
4,706,086 A  * 11/1987  Panizza ............... G08G 1/0965
                                            180/167
(Continued)

FOREIGN PATENT DOCUMENTS

JP    2002206930 A  *  7/2002
JP    2005292029 A  * 10/2005

OTHER PUBLICATIONS

Amazon.comAdvertisement.Garmin Street Pilot 2610 In-Car GPS receiver with 128MB CompactFlashed. http://www.amazon.com/Garmin-StreetPilot-receiver-128MB-CompactFlashed/dp/B0000An4EG.Accessed Dec. 17, 2007.
(Continued)

*Primary Examiner* — David P. Merlino
(74) *Attorney, Agent, or Firm* — Conley Rose, P.C.; J. Roberts Brown, Jr.; Joseph J. Funston, III

(57) ABSTRACT

A destination from a plurality of destinations is identified. A plurality of routes associated with the destination is calculated. A determination is made that the device is travelling along a route in the plurality of routes without receiving user input selecting the route. Navigational data associated with the route is displayed in response to determining that the device is travelling along the route.

20 Claims, 58 Drawing Sheets

It presents the best routes based on traffic.
Barry simply starts to drive the most efficient route.
The device gives voice prompts to guide him.

Related U.S. Application Data continuation of application No. 11/290,869, filed on Nov. 29, 2005, now Pat. No. 8,606,516.

(60) Provisional application No. 60/631,642, filed on Nov. 29, 2004.

(52) U.S. Cl.
CPC ....... *G01C 21/3626* (2013.01); *G08G 1/0969* (2013.01); *G08G 1/096861* (2013.01); *G01C 21/3697* (2013.01)

(56) References Cited

U.S. PATENT DOCUMENTS

| | | | |
|---|---|---|---|
| 5,220,507 A | 6/1993 | Kirson | |
| 5,467,276 A * | 11/1995 | Tsuyuki | G01C 21/3676 701/410 |
| 5,699,056 A * | 12/1997 | Yoshida | G08G 1/20 340/905 |
| 5,842,142 A | 11/1998 | Murray et al. | |
| 5,919,246 A | 7/1999 | Waizmann et al. | |
| 6,053,584 A | 4/2000 | Schunck et al. | |
| 6,067,502 A | 5/2000 | Hayashida et al. | |
| 6,112,154 A | 8/2000 | Schupfner | |
| 6,202,026 B1 | 3/2001 | Nimura | |
| 6,253,151 B1 * | 6/2001 | Ohler | G01C 21/32 340/990 |
| 6,254,885 B1 | 7/2001 | Cho et al. | |
| 6,278,402 B1 | 8/2001 | Pippin | |
| 6,282,486 B1 | 8/2001 | Bates et al. | |
| 6,289,277 B1 | 9/2001 | Feyereisen et al. | |
| 6,317,685 B1 * | 11/2001 | Kozak | G01C 21/3407 701/414 |
| 6,351,698 B1 * | 2/2002 | Kubota | B60R 16/0231 340/988 |
| 6,351,709 B2 * | 2/2002 | King | G01C 21/3492 340/990 |
| 6,401,034 B1 | 6/2002 | Kaplan et al. | |
| 6,434,482 B1 | 8/2002 | Oshida et al. | |
| 6,484,118 B1 | 11/2002 | Govari | |
| 6,522,958 B1 | 2/2003 | Dwyer et al. | |
| 6,542,814 B2 | 4/2003 | Polidi et al. | |
| 6,591,188 B1 * | 7/2003 | Ohler | G01C 21/3617 701/423 |
| 6,600,994 B1 | 7/2003 | Polidi | |
| 6,615,137 B2 * | 9/2003 | Lutter | G08G 1/0965 340/436 |
| 6,622,087 B2 | 9/2003 | Anderson | |
| 6,636,801 B2 | 10/2003 | Curbow | |
| 6,762,772 B1 * | 7/2004 | Imamura | G01C 21/367 701/409 |
| 6,826,472 B1 * | 11/2004 | Kamei | G01C 21/3605 701/426 |
| 6,862,500 B2 | 3/2005 | Tzamaloukas | |
| 6,925,378 B2 | 8/2005 | Tzamaloukas | |
| 7,058,506 B2 | 6/2006 | Kawase et al. | |
| 7,076,365 B2 | 7/2006 | Tzamaloukas | |
| 7,085,648 B2 | 8/2006 | Ishiguro | |
| 7,188,026 B2 | 3/2007 | Tzamaloukas | |
| 7,225,077 B2 | 5/2007 | Kouchiyama | |
| 7,440,842 B1 * | 10/2008 | Vorona | G08G 1/0104 340/995.12 |
| 7,647,166 B1 | 1/2010 | Kems | |
| 7,869,934 B2 * | 1/2011 | Breitenberger | G08G 1/0104 701/117 |
| 8,606,516 B2 | 12/2013 | Vertelney et al. | |
| 9,518,835 B2 | 12/2016 | Vertelney et al. | |
| 2002/0035430 A1 * | 3/2002 | Yano | G01C 21/3415 701/411 |
| 2002/0045455 A1 | 4/2002 | Spratt | |
| 2002/0052689 A1 * | 5/2002 | Yamashita | G01C 21/3626 701/411 |
| 2002/0082771 A1 | 6/2002 | Anderson | |
| 2002/0156571 A1 | 10/2002 | Curbow | |
| 2002/0161517 A1 * | 10/2002 | Yano | G01C 21/3617 701/420 |
| 2003/0028318 A1 | 2/2003 | Kaji et al. | |
| 2003/0036848 A1 | 2/2003 | Sheha et al. | |
| 2003/0105582 A1 | 6/2003 | Nordsiek | |
| 2003/0132862 A1 | 7/2003 | Kurosawa | |
| 2003/0158655 A1 | 8/2003 | Obradovich et al. | |
| 2003/0182056 A1 | 9/2003 | Nozaki et al. | |
| 2004/0053089 A1 | 3/2004 | Balliet et al. | |
| 2004/0054453 A1 | 3/2004 | Brynielsson | |
| 2004/0073361 A1 | 4/2004 | Tzamaloukas et al. | |
| 2004/0093392 A1 | 5/2004 | Nagamatsu et al. | |
| 2004/0116106 A1 * | 6/2004 | Shishido | H04L 29/06 455/414.2 |
| 2004/0117113 A1 * | 6/2004 | Friedrichs | G08G 1/096811 701/414 |
| 2004/0128066 A1 | 7/2004 | Kudo et al. | |
| 2004/0148095 A1 | 7/2004 | Katou | |
| 2004/0148096 A1 | 7/2004 | Katou | |
| 2004/0172192 A1 | 9/2004 | Knutson | |
| 2004/0215373 A1 * | 10/2004 | Won | G08G 1/161 701/1 |
| 2004/0236507 A1 * | 11/2004 | Maruyama | G01C 21/3626 701/437 |
| 2004/0254723 A1 | 12/2004 | Tu | |
| 2005/0096839 A1 * | 5/2005 | Nakano | G08G 1/0969 701/532 |
| 2005/0125148 A1 | 6/2005 | Van Buer et al. | |
| 2005/0137792 A1 * | 6/2005 | Tsuge | G01C 21/3697 701/414 |
| 2005/0209773 A1 | 9/2005 | Hara | |
| 2005/0273251 A1 | 12/2005 | Nix et al. | |
| 2006/0047420 A1 * | 3/2006 | Tanaka | G01C 21/32 701/450 |
| 2006/0116965 A1 * | 6/2006 | Kudo | G06Q 99/00 705/52 |
| 2006/0178814 A1 * | 8/2006 | Everett | G08G 1/163 701/466 |
| 2006/0241862 A1 | 10/2006 | Ichihara et al. | |
| 2007/0100540 A1 | 5/2007 | Stamper et al. | |
| 2007/0124063 A1 * | 5/2007 | Kindo | G08G 1/09675 701/517 |
| 2007/0135990 A1 | 6/2007 | Seymour et al. | |
| 2007/0150174 A1 | 6/2007 | Seymour et al. | |
| 2008/0027639 A1 | 1/2008 | Tryon | |
| 2009/0106089 A1 | 4/2009 | Parkes et al. | |
| 2014/0336914 A1 * | 11/2014 | Vorona | G08G 1/096791 701/119 |

OTHER PUBLICATIONS

Office Action dated Oct. 3, 2006; U.S. Appl. No. 11/290,869 filed Nov. 29, 2005; 6 pages.

Final Office Action dated Apr. 10, 2007; U.S. Appl. No. 11/290,869 filed Nov. 29, 2005; 7 pages.

Advisory Action dated Jul. 23, 2007; U.S. Appl. No. 11/290,869 filed Nov. 29, 2005; 3 pages.

Office Action dated Jan. 9, 2008; U.S. Appl. No. 11/290,869 filed Nov. 29, 2005; 11 pages.

Office Action dated Aug. 26, 2008; U.S. Appl. No. 11/290,869 filed Nov. 29, 2005; 10 pages.

Office Action dated Sep. 20, 2012; U.S. Appl. No. 11/290,869 filed Nov. 29, 2005; 8 pages.

Notice of Allowance dated Apr. 10, 2013; U.S. Appl. No. 11/290,869 filed Nov. 29, 2005; 6 pages.

Notice of Allowance dated Jul. 25, 2013; U.S. Appl. No. 11/290,869 filed Nov. 29, 2005; 6 pages.

Office Action dated Apr. 29, 2015; U.S. Appl. No. 14/080,356 filed Nov. 14, 2013; 20 pages.

Final Office Action dated Oct. 19, 2015; U.S. Appl. No. 14/080,356 filed Nov. 14, 2013; 19 pages Advisory Action dated Dec. 24, 2015; U.S. Appl. No. 14/080,356 filed Nov. 14, 2013; 4 pages.

Office Action dated Feb. 24, 2016; U.S. Appl. No. 14/080,356 filed Nov. 14, 2013; 18 pages.

(56) References Cited

OTHER PUBLICATIONS

Notice of Allowance dated Aug. 9, 2016; U.S. Appl. No. 14/080,356 filed Nov. 14, 2013; 7 pages.

* cited by examiner

Iterative UI Process

- Research
  - Interview domain experts & target users
  - Literature reviews
  - Competitive analysis

- Design
  - User personas
  - Scenario development
  - Task prioritization
  - System flow diagrams
  - Task based prototypes

- Test
  - Concept tests
  - Form studies
  - Usability tests

- Build
  - Final screen design (TBD)
  - Working code (TBD)

Barry wonders what traffic will be like on the way up the peninsula.

He's got to swing by the office to get ready for his dinner meeting.
(He presses the MENU button.)

His device has learned that he goes to work or the gym at this time of day.
(He selects, "Work")

It presents the best routes based on traffic.
Barry simply starts to drive the most efficient route.
The device gives voice prompts to guide him.

After a few minutes it detects which route Barry has decided to take.

The best routes are constantly being updated.
Barry knows his way. He doesn't need voice prompts.
(He moves the verbosity switch to" Alerts".)

Later, while cruz'n up HWY 101 he receives an alert.

Barry adjusts his speed accordingly.

He pulls Into the office.

The Destination summary ETA lets him evaluate his progress.
"Looks like I made pretty good time."

He's returning to a restaurant he went to earlier in the week.
He selects "MENU" to enter a destination.

He Uses the history list to retrieve the address.

He scrolls the list to find the restaurant.
(Notice that he can sort the list in a variety of ways to easily find the address.)

Portico. There it is.

These are the best routes to Portico at this time of day. Barry is short on cash. Better stop at an ATM before dinner. He presses the MENU button.

He uses the Yellow Pages to find an ATM that's close to Portico

Seems like he's often looking for ATMs! Notice that this list also has several sorting methods. (He selects, "Banks and ATMs")

He's looking for an ATM near the restaurant.
(He selects, "Near destination".)

He wonders which ATM is closest to the restaurant. Viewing the map should make it clear. (He selects, "show on map".)

There's one. He selects the "BofA".

It's possible to add a stopping place along a route.
(He chooses, "add a stop".)

Better get going.

A while later, somewhere near the airport ...

Barry is unfamiliar with the route alternatives.
He turns verbosity to full to hear voice guidance prompts.

He selects the "turns" button for the best route.

Now the device will guide him to his destination.

He's curious what turns are on the route ahead.
At a stop light he presses the "views" button to access the direction list.

The directions list gives him a sense of when and where a specific turn takes place. He quickly switches back for maneuver turns with the back button.

Barry uses this view to guide him to the ATM.

To ensure that his plans haven't changed, the device asks if he'd like to continue to the restaurant. He chooses, "Yes".

He arrives in just a few moments.

Since he likes this restaurant he decides to quickly add it to his favorites list.
He selects the Destination field to get information about his current location.

This shows him the address for the destination.
He selects the "add to favorites" button.

He can use the current name or assign a new one.
He chooses to use the current name by pressing the "Ok" button.

All done, Time to eat!

Barry selects the "MENU" button.

The client tells Barry his address.
Barry chooses, "Addresses" so he can enter the address.

He has several methods to choose from for entering an address.
He decides to start with the street name.

Recently used streets are Initially available as a short cut to familiar places.
Barry starts to enter "Waverley St." W ...

There it is. He can select it from the list or scroll to it and press Ok.
He selects it from the list.

On the way they spot a problem. Barry presses the NOTIFY button to informs others...

Barry drops his client off. Barry offers to stop by Kinkos to complete the presentation before heading home. He selects, "MENU".

He goes to Kinkos often when on the road. A saved search makes finding one that's nearby easy. Saved searches are accessible from either the Favorites or Yellow Pages. He selects Favorites.

Off to Kinkos to finish the presentation.

map

First time use ·Map with you In center

Map zoomed out

Map after panning

Map (after arriving at destination)

Map (zoomed In on where you are parked)

Destination Is a favorite

Before it discovers your route choice

Destinations are POIs

Stop and Destination

After it discovers your route choice

When close to destination

Switches to Map W/ destination summary when you arrive at destination approach at turn

| of America & Portico | Arco Hillsdale |
|---|---|
| W on 380  2min .04mi<br>N on 380<br>N on 101 △ ▽ | ⬐ Potrero Ave  1min .1mi<br>⬐ Center Ave<br>⬐ Bay Cruise Way<br>↱ US 101 S △ ▽ |
| When in motion<br>(you don't have time to read,<br>can't remember too many)<br>FIG. 88a | When not moving<br>(you have time to read)<br>FIG. 88b |

Traffic details

| Arco Hillside | Map |
|---|---|
| ⓘ ⬐ Potrero Ave  1min .1mi<br>ⓘ ⬐ Center Ave<br>ⓘ ⬐ Bay Cruise Way △ ▽ | 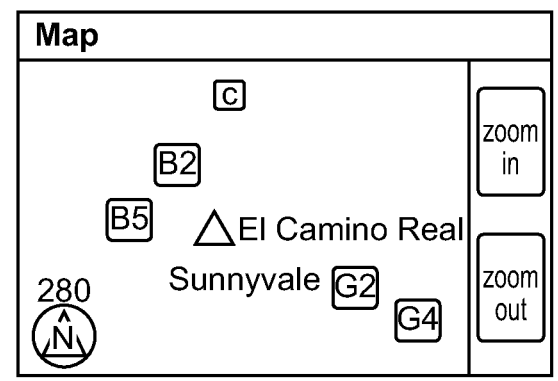 |
| Could be Integrated into direction list<br>FIG. 88c | ... or the map<br>FIG. 88d |

| Traffic info ahead | Traffic detail |
|---|---|
| ⓘ construction<br>ⓘ accident on side | ⓘ CHP: Accident on US S before Oracle Pkwy ( Carlos) 2nd lane from blocked Expect delays<br><br>Est. end time: 10min |
| traffic detail list<br>FIG. 88e | traffic detail<br>FIG. 88f |

New user, no destination 1 recommendation, no destination 2 recommendations, no destination New user, w/ destination 1 recommendation, w/ destination 2 recommendations, w/ destination first time user experience (links from menu)

address entry top menu

POI top menu (sorted alphabetically)

map with you in center new user - no bookmarks

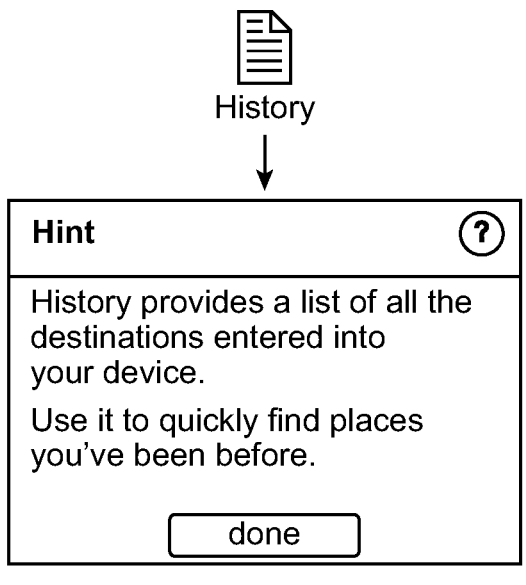
new user - no history
FIG. 91e
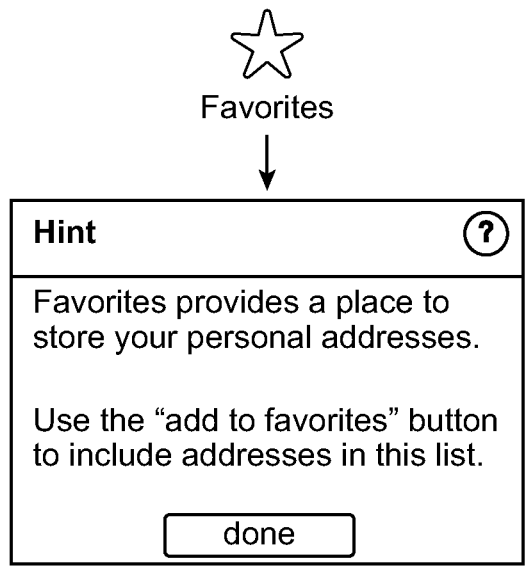
flux - no favorites
FIG. 91g
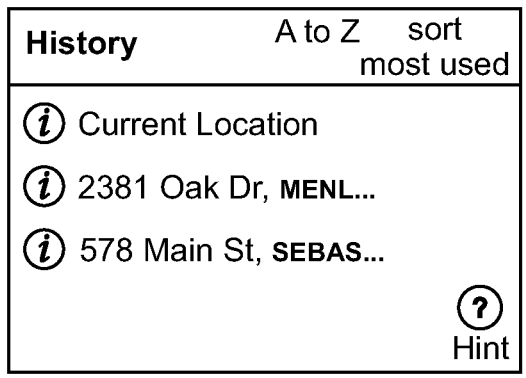
new user before first few
items fill in
Settings
↓
settings index (TBD)
to Arco...
FIG. 91f
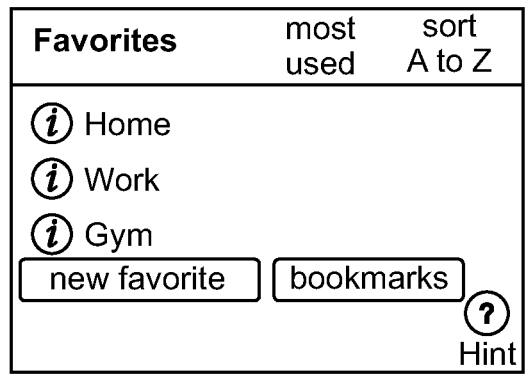
new user before first few
items fill in
Tutorial
↓
tutorial (TBD)
FIG. 91h addresses

| History | most recent |
|---|---|
| 234 scale Blvd n Mateo CA 0 456-7890    92345 | |

[add to favs] [remove] [routes]

history address page
FIG. 92a

| Favorites | |
|---|---|
| School 1400 Waverly St Palo Alto CA    94301 | |

[rename] [remove...] [routes]

favorite address page
FIG. 92b

| Favorites | |
|---|---|
| 3412 Ross Rd Palo Alto CA    93621 | |

[rename] [remove...]

favorite address page
(Current location)
FIG. 92c

| Museum | |
|---|---|
| h Museum of Innovation l Market St n Jose, CA 0 456-7890    92345 | |

[add to favs] [routes]

Yellow page address
FIG. 92d

| Favorites | |
|---|---|
| SFO Intl Airport<br><br>Airport Way San Francisco CA 415 223-7452    94301 | |

[rename] [remove...] [routes]

favorite yellow page address
FIG. 92e

| Favorites | |
|---|---|
| Portico 245 Market St San Francisco, CA 415 777-9950    94105 | |

[rename] [remove...]

favorite yellow page address
(Current location)
FIG. 92f

| Recommendations | |
|---|---|
| o Alto Sowling alley 045 Camino Real o Alto CA    92349 | |

[rename] [remove...] [routes]

recommended address
FIG. 92g

| Destination | |
|---|---|
| Portico 245 S Market St San Francisco CA 415 777-9950    94105 | |

[add to favorites]

destination address page (from map)
FIG. 92h lists

| History | recent  sort A to Z |
|---|---|
| ⓘ Work  [remove] | |
| ⓘ Tom's Office | |
| ⓘ 578 Main St, SEB | |
| ⓘ 2230 Maple Dr. .. | |
| ⓘ 1400 1st Ave. SA.. | ▽ |
| ⓘ Gym | | history list
(sorted by most recent)
FIG. 93a

| History | recent  sort A to Z |
|---|---|
| ⓘ Gym | △ |
| ⓘ Fish Market | |
| ⓘ 2546 Calif Ave.. | |
| ⓘ Work | |
| ⓘ 786 Hobart Ave | ▽ |
| ⓘ Arco Hillsdale | | history list
(sorted by most recent-scrolled)
FIG. 93b

| Favorites | most used  sort A to Z |
|---|---|
| ⓘ Home | |
| ⓘ Work | |
| ⓘ Gym | |
| ⓘ Doctor | |
| ⓘ 1400 1st Ave, SA | ▽ |
| [new favorite] [bookmarks] | | favorites list
(sorted by most used) FIG. 93c

| History | show A to Z  on Map |
|---|---|
| ⓘ Doctor | △ |
| ⓘ Gym | |
| ⓘ Home | |
| ⓘ School | |
| ⓘ Work | ▽ |
| [new favorite] [bookmarks] | | favorites list
(sorted by alphabetically) FIG. 93d

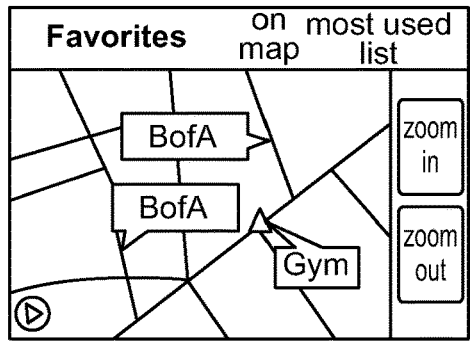

Favorites
(on map) FIG. 93e

| Banks & ATMs | near dest.  show on map |
|---|---|
| ⓘ Bank of America | △ |
| ⓘ Wells Fargo | |
| ⓘ Westamerica B.. | |
| ⓘ California Bank.. | |
| ⓘ Banco Central.. | ▽ |
| ⓘ Wells Fargo | | yellow page category list FIG. 93f
(near destination)

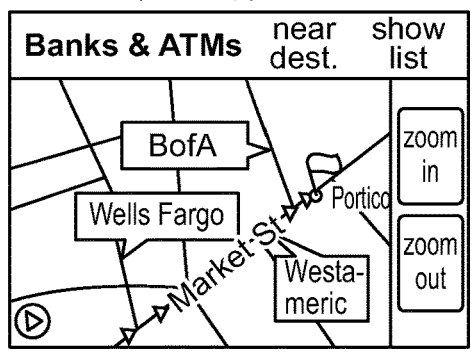

yellow page category
(on map, near destination) FIG. 93g

Yellow Pages

| Yellow Pages | most used | sort A to Z |
|---|---|---|
| ⛽ Fuel | | |
| 🍴 Food | | |
| 🅿 Parking | | |
| ☐ Banks & ATMs | | |
| 🛏 Lodging | | |
| search by name | bookmarks | ▽ | yellow page Index (sorted by most used)
FIG. 94a

| Yellow Pages | 60 A to Z | sort most used |
|---|---|---|
| ☐ Airport | | |
| ☐ Amusement park | | |
| ☐ College / University | | |
| ☐ Company | | |
| ☐ Concert hall | | |
| search by name | bookmarks | ▽ | yellow page Index (sorted alphabetically)
FIG. 94b

| Yellow Pages | 4 most recent | sort A to Z |
|---|---|---|
| 🍴 Chinese | | |
| 🍴 Fastfood | | |
| 🍴 Asian | | |
| 🍴 Italian | | |
| | | ▽ | yellow page subcategory Index
(sorted by most used) FIG. 94c

| Find fuel | sort most used |
|---|---|
| Nearby | |
| On route | |
| Near destination | |
| Specify a city | |
| Specify a name or brand | ▽ |
| set bookmarks.. | cancel | yellow page sub/category FIG. 94d
(find by proximity-dest. specified)

| Find museums | |
|---|---|
| Nearby | |
| Specify a city | |
| Specify a name | |
| | ▽ |
| set bookmarks.. | cancel | yellow page sub/category FIG. 94e
(find by proximity-no dest, specified)

| Banks & ATMs | near dest. | show on map |
|---|---|---|
| ⓘ Bank of America | | |
| ⓘ Wells Fargo | | △ |
| ⓘ Westamerica B.. | | |
| ⓘ California Bank.. | | |
| ⓘ Banco Central.. | | ▽ |
| ⓘ Wells Fargo | | | yellow page sub/category FIG. 94f
list (near destination)

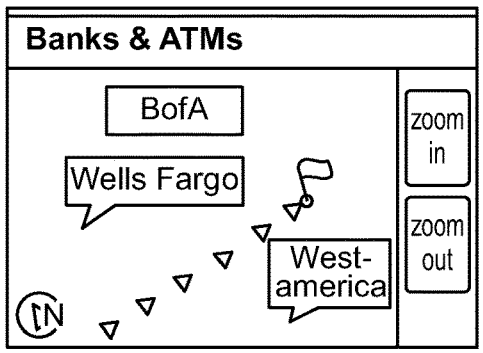

FIG. 94g yellow page sub/category on map (near destination)

Bookmarks

| Bookmarks | most used | sort A to Z |
|---|---|---|
| ○ Find Arco | | |
| ⓟ Find Parking nearby | | |
| ○ Find Kinkos nearby | | |
| 🍴 Find Starbucks nearby | | |
| 🍴 Find Chinese food | | | bookmark Index
(sorted by most used)

FIG. 95a

| Select searches to bookmark |
|---|
| Nearby |
| On route |
| Near destination |
| Specify a city |
| Specify a name or brand |
| [select all] [done] [cancel] | set bookmarks
(none set)

FIG. 95b

| Select searches to bookmark |
|---|
| Nearby |
| On route |
| Near destination |
| Specify a city |
| Specify a name or brand |
| [select all] [done] [cancel] | set bookmarks
(some set)

FIG. 95c address entry

| Select a field to search |
|---|
| Street name |
| City |
| Zip code | address entry (top)

FIG. 96a

| Street found |
|---|
| Number   Anywhere   Intersection |
| Waverly St |
| Palo alto, CA |
| [add to favorites] [routes] | address entry
street found

FIG. 96b

| Street address found |
|---|
| 1400 |
| Waverly St |
| Palo alto. CA |
| 94301 |
| [add to favorites] [routes] | address entry
address found

FIG. 96c

| City found |
|---|
| Street name |
| San Jose, CA |
| Zip |
| [add to favorites] [routes] | address entry city found

FIG. 96d

| Current position |
|---|
| 3412 |
| Ross Rd |
| Palo Alto, CA |
| 93621 |
| [add to favorites] | address entry
(current position-from map)

FIG. 96e keyboards

| Specify a street name |
|---|
| ant St △ |
| El Camino Real ▽ |
| k Blvd |
| A B C D E F G H |
| I J K L M N O P |
| Q R S T U V W X |
| Y Z space ◁ ▷ 123 OK | specify a street name
(upon entry-recent streets In list)
FIG. 97a

| Specify a street number |
|---|
| 140 |
| 1 2 3 4 5 |
| 6 7 8 9 0 |
| ◁ OK | specify a street number
FIG. 97b

| Type a favorite name |
|---|
| Portico |
| A B C D E F G H |
| I J K L M N O P |
| Q R S T U V W X |
| Y Z space ◁ cancel OK | specify a name for a favorite
FIG. 97c

| Specify a street name |
|---|
| Waverly St PALO ALT △ ▽ |
| A B C D E F G H |
| I J K L M N O P |
| Q R S T U V W X |
| Y Z space ◁ ▷ 123 OK | specify a street name
(once user starts typing)
FIG. 97d

| Specify a listing by name |
|---|
| San Francisco Modern Art... △ |
| Tech Museum of Innovation ▽ |
| Palo Alto Junior Museum |
| A B C D E F G H |
| I J K L M N O P |
| Q R S T U V W X |
| Y Z space ◁ ▷ 123 OK | specify a listing by name
(POI name search)
FIG. 97e

| Specify a city |
|---|
| Mountain View CA △ |
| San Jose CA ▽ |
| Palo Alto CA |
| A B C D E F G H |
| I J K L M N O P |
| Q R S T U V W X |
| Y Z space ◁ ▷ 123 OK | specify a city
FIG. 97f messages notify traffic ahead safety alert notice sent confirmation

USER INTERFACE SYSTEM AND METHOD FOR A VEHICLE NAVIGATION DEVICE

CROSS REFERENCE TO RELATED APPLICATIONS

This application is a continuation of U.S. patent application Ser. No. 14/080,356, filed Nov. 14, 2013, now U.S. Pat. No. 9,518,835, which is a continuation of and claims priority from U.S. patent application Ser. No. 11/290,869, filed Nov. 29, 2005, now U.S. Pat. No. 8,606,516, which claims the priority and benefit of Provisional Application Ser. No. 60/631,642, filed 29 Nov. 2004, each of the applications is incorporated herein by reference in its entirety. This application is also related to U.S. patent application Ser. Nos. 10/272,039; 10/436,967, now U.S. Pat. No. 7,188,026; Ser. No. 10/436,926, now U.S. Pat. No. 6,862,500; Ser. No. 10/437,205, now U.S. Pat. No. 6,925,378; and Ser. No. 10/436,691, now U.S. Pat. No. 7,076,365, the disclosures of which are incorporated herein by reference.

BACKGROUND OF THE INVENTION

1. Field of the Invention

The present invention relates generally to the field of user interfaces (UI) for vehicle navigation devices. Specifically, the invention relates to a UI for a device that provides real-time traffic information and navigation guidance based on that information. The device may also include numerous additional features such as for example those discussed in greater detail below in regards to the attached illustrative figures.

2. Summary of Related Art

Presently available vehicle navigation devices suffer from several limitations. While many are quite feature rich, the features are often presented in a very non-intuitive manner. Common features aren't easily accessible. Additionally, the devices are generally not "intelligent" or adaptable to the use patterns of a particular user. Far too much data entry is often required to suit the average "non-technophile" user. In general, these devices offer a single method for accomplishing a given task, and correction of mistakes is often challenging. Furthermore, suppression of voice prompts may be difficult, and customization of the user interface to suit a given user is either not available or very difficult to implement. Address lists are not generally easy to organize, and the devices are prone to what appears to be somewhat unpredictable behavior. For this reason and others, an improved user interface and navigation device are desirable.

SUMMARY OF THE INVENTION

In one embodiment, the present invention provides a vehicle navigation user interface method. The method comprises the steps of storing a user's favorite visited destinations with contextual information and later retrieving and displaying a selection of most probable destinations from the stored favorite destinations based on a current position and time.

In an alternative embodiment, a vehicle navigation user interface method is provided. The method comprises the steps of receiving user input regarding a selected destination, calculating one or more routes between a present location and the selected destination, displaying an icon representing each route on a screen, and calculating and displaying an estimate travel time between the present location and the selected destination for each of the calculated routes.

In further embodiments, the present invention provides a vehicle navigation device comprising a storage device that stores code for executing a user interface as described in one of the preceding paragraphs. The device further comprises one or more hard input buttons and a touch sensitive screen for displaying information and receiving context-relevant user input.

BRIEF DESCRIPTION OF THE DRAWINGS

Other objects and advantages of the present invention will become apparent upon reading the detailed description of the invention and the appended claims provided below, and upon reference to the drawings, in which:

FIG. 88a to FIG. 88f are screen shots showing various examples of displaying turn-by-turn data of various embodiments of the present invention.

FIG. 91a to FIG. 91h are screen shots showing a tutorial/help feature of various embodiments of the present invention.

FIG. 92a to FIG. 92h are screen shots showing interface screens for managing destination/location data of various embodiments of the present invention.

FIG. 93a to FIG. 93g are screen shots showing list screens comprising different types of information of various embodiments of the present invention.

FIG. 94a to FIG. 94g are screen shots showing directory search screens of various embodiments of the present invention.

FIG. 95a to FIG. 95c are screen shots showing bookmark screens of various embodiments of the present invention.

FIG. 96a to FIG. 96e are screen shots showing address entry screens of various embodiments of the present invention.

FIG. 97a to FIG. 97f are screen shots showing an adaptive keyboard of various embodiments of the present invention.

DETAILED DESCRIPTION OF EXEMPLARY EMBODIMENTS

Figure 1:
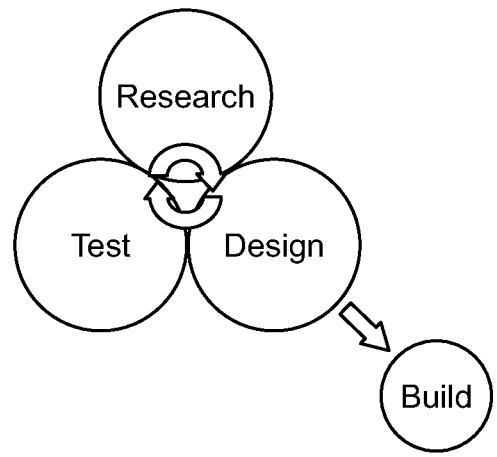
FIG. 1 is a flow chart illustrating the steps of UI development according to one aspect of the present invention.

The present invention provides an improved user interface and system and method for a vehicle navigation device.

Among other advantages of the invention that are described in greater detail with regards to the example presented below, the present invention includes one or more of the following features.

Key features are readily "at hand." For example, traffic information and driving tasks are primary and most readily accessible. Updated destination ETA and "distance to go" are conveniently displayed on most screens. The device features History, Favorites, and Recommendations screens and lists such that the user is readily prompted with options that are more likely to be those he or she will wish to select. Data entry may be accomplished via an efficient keyboard that intelligently responds to data entry and highlights possible future entries based on matches to other information in the database. The unit's verbosity may be readily controlled from full turn-by-turn driving direction to alerts only or even mute merely be moving a single toggle switch.

The device and interface are also adaptive, providing hints, dialogs and tutorials that are intelligently tailored to the tasks a user is doing or about to do. Based on location, time of day, day of week and/or other factors, the device and interface provide recommendations for destinations or types of destinations that the user has driven to in the past. They also automatically calculate alternative routes that include realistic ETA values based on currently prevailing traffic conditions.

Customization is available when and where a user want and/or needs it. This includes features like address views and management of a favorites list. The device is flexible, in other words, there are multiple modes for entering street addresses, finding points of interest, managing and sorting address lists, adding waypoints or intermediate destinations to a trip, and the like. The device and interface are predictable and forgiving, providing customizable views, and a "back" button for quickly accessing previously viewed screens without requiring exiting to a main menu. Selected features of the device are described in the remainder of this section in general terms. Then, in the following section, a detailed example based on a hypothetical user of the device and interface is provided to illustrate additional possible features of the invention and its many possible embodiments.

1. Saved Search

Various search parameters established by a user may be saved as a "favorite" or shortcut by pressing an appropriate button or otherwise entering a command through the onscreen menus. In practice, a "search" may include one or more criteria for selecting a destination or route. These criteria are applied to a database to return location-appropriate selections meeting the criteria. The database may contain information regarding locations of restaurants, fuel stations, hotels, and other points of potential interest, as well as map data, and/or traffic data including current speeds and locations of potential disruptions/slowdowns/safety issues. In one example of this embodiment, the user may create and save searches for one or more types of point of interest ("POI") and "proximity to me." POIs may include, but are not limited to, fuel, food, parking, banks/ATMs, aid, lodging, services, landmarks, shops, attractions, entertainment, freeway on/off ramps, transportation. "Proximity to me" may include one or more criteria such as straightline spatial proximity, on or within a present threshold distance of the current route, proximity to the current destination, in a specific city or community, and the like.

The saved searches may be categorized in a number of ways. For example, the name or a description of the type of destination may be used. Searches may be specific, such as, for example, "Starbucks™" or "Chevron™" or "McDonald's™." The system may also support more generic search such as, for example, "coffee" or "service station" or "fast food." When viewing one of the saved searches, the device separately shows at least the nearest location meeting the search criteria. If the device is currently en route to a destination, it may also show the closest location that lies a reasonable distance from the route, and the location closest to the destination. The search results may be displayed with travel time and driving distance estimates that may be updated continuously, semi-continuously, or periodically, as described in the next section.

2. Recommendations

In a further option, the system may automatically record the types of locations visited by the vehicle and thereby prepare and display lists of potentially desirable locations. This may be accomplished in any suitable manner, such as for example similarly to how a digital video recorder such as for example that by TiVo™ might estimate user preferences based on a record of past actions by a user. A device according to the present invention may suggest a list of destinations that the user is likely to want to select based on the current usage context. The device may create this list by keeping track of the device's current location, time of day, day of the week, and the like and by correlating these data to destinations that the device has driven in the past from a similar location under similar conditions. For example, if the device is in a vehicle parked within, for example, a quarter of a mile (or some other pre-programmed distance) from a frequently visited destination such as for example "home" and is being started between 7 and 9 in the morning on a weekday, the device may suggest the most common destinations selected in the past from a similar location under similar circumstances. In this example, the recommendations may include "gym," "work," "coffee," and/or the like. In the evening, when the device is relatively close to Work, the two most likely destinations it suggests could be, for example, "home" and "grocery store." These recommendations may be presented in a List View as described above.

3. Estimated Time of Arrival—Multiple Destinations

An Estimated Time of Arrival and a Distance to each of several potential destinations (e.g. "nearest Chevron™" service station, "nearest Baja Fresh™" restaurant location, etc.) are calculated dynamically as the vehicle moves. A location/destination scrolls off the list as the vehicle passes the decision point for navigation to that location. For example, if a vehicle is traveling southbound on US 101 through Mountain View and one of the listed destinations is the Arco service station at Arastradero and San Antonio, this destination may be eliminated from the list as the vehicle passes the San Antonio Road exit. A new suggested destination will be added to the bottom of the list. In this manner, the list of destinations, accompanied by the driving and/or straight-line distance to each destination from the current vehicle location, is continuously and dynamically updated to provide contextually relevant suggestions for potential points of interest. Alternatively, destination entries may scroll up the list but remain on the display for a certain period of time and/or distance even after the vehicle has passed the decision point. In this manner, if the user changes his/her mind and/or decides to reverse direction to navigate to the destination, the necessary selection and navigation information remain available. This feature may be implemented by an algorithm that determines how long the entry needs to stay in the list after the driver passes it based on one or more of travel time, distance, and the like.

The system may use one or more preferences set by the user to determine the number and types of suggested destinations to display. The system may also develop one or more user profiles based on driving and usage patterns similar to what is described in "Recommendations" above. In this way, the system may identify the type of driving situation based on starting point and ultimate destination as well as time of day and/or previous driving patterns.

Whenever the user interface supports an ETA element, the screen may be rendered immediately with either the straight line distance (which is a simple calculation since the lat/long of both the current location and the destination are known) or a placeholder such as " . . . ." Then, after having displayed these initial results, the device calculates in the background the best route to each and all of the ETAs on the screen. Full access to the user interface is available while these background calculations are taking place. These route calculations optionally take into account any historical or real-time traffic information that the device has access to, such as for example via a communications network as described in co-pending U.S. patent application Ser. Nos. 10/272,039; 10/436,967; 10/436,926; 10/437,205; and Ser. No. 10/436,691, the disclosures of which are incorporated herein by reference. As each route calculation is completed, the results of that calculation may replace or supplement the straight-line value or placeholder. The calculation results may be presented as minutes and/or distance to the destination along, for example, the fastest route or the most direct route. The results of these calculations may be continuously, semi-continuously, or otherwise periodically updated (as a background computation) as the location of the device/vehicle changes. The ETA user interface element may be presented on any screen where one or several specific destinations are shown, such as a list of points of interest, a list of favorites, a list of recent locations, a list of addresses matching a search criteria, a detailed contact card, etc.

4. Integrated Countdown Timer

Rather than have a "timer" or other graphic displaying distance and/or time to the next navigation event (turn, stop, etc.), the on-screen arrow may change in size and/or shape to indicate progress. For example, as the vehicle approaches a turn, the tail of the arrow indicating the turn may shorten until it reaches the turn point. Then, the entire display may rotate as the vehicle negotiates the turn such that the navigation direction arrow continues to point in the same direction that the vehicle is traveling.

DETAILED DESCRIPTION OF AN EXEMPLARY EMBODIMENT

The UI and navigation device system and method described here were developed through extensive research, testing, and analysis. FIG. 1 summarizes the process by which a user interface (UI) according to present invention may be developed. In short, development involves an iterative process involving a research phase, a design phase, and a testing phase. Researching comprises interviewing domain experts and target users for the UI, reviewing literature, and analyzing competitor products and UI implementations. Designing comprises creating one or more "user personas" to represent the theoretical actions and usage of the UI by one or more hypothetical target users under one or more hypothetical scenarios. Designing also comprises considerations of how users might expect or desire the UI to allow task prioritization as well as development of system flow diagrams and task-based prototypes. Testing comprises both concept and form studies as well as usability tests by one or more "alpha" testers. Based on the results of the iterative development process, a UI is built.

Figure 2:
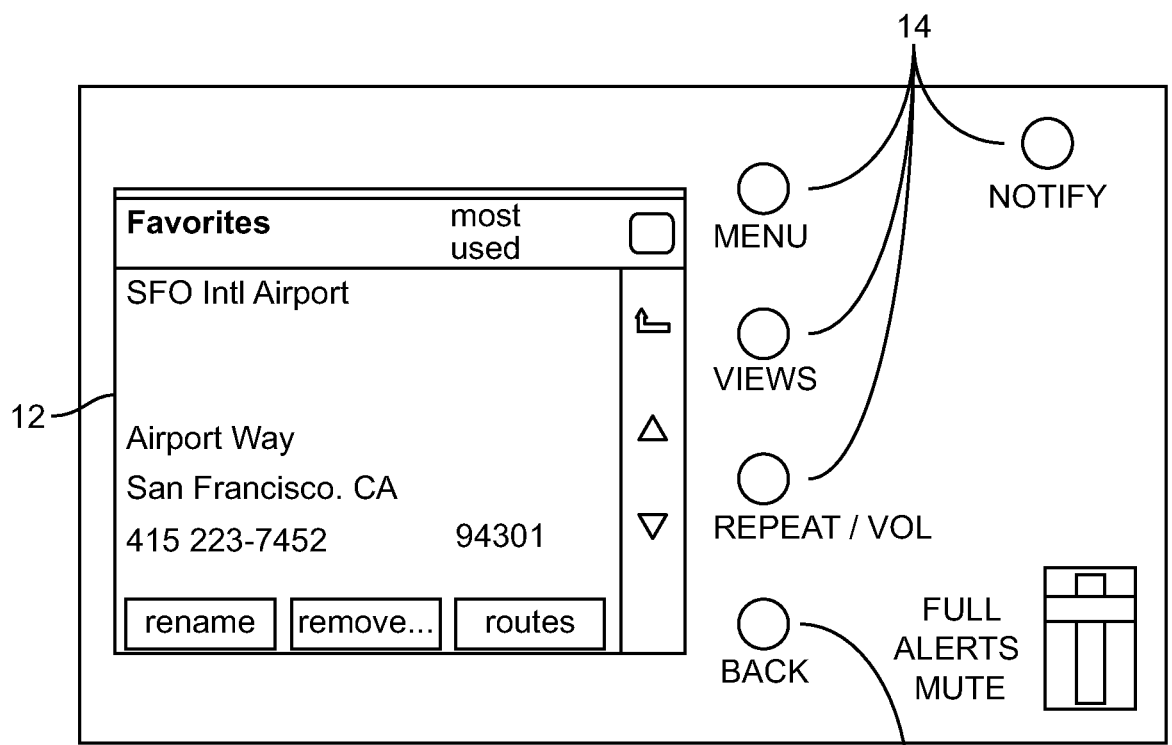
FIG. 2 to FIG. 84 are screen shots of an example of a user interface according to one embodiment of the present invention.

FIG. 2 shows an example of a system comprising a UI according to one embodiment of the present invention. In this embodiment, the device comprises a screen 12 and several input buttons 14. The buttons 14 are shown in all of FIG. 2 to FIG. 82 and are therefore labeled only in FIG. 2. The screen 12 may be a touch sensitive screen that allows selection of options from an onscreen menu by touching the screen with a finger, a stylus, or some other instrument. In an alternative embodiment, the present invention may include a voice recognition and feedback system for entering user commands without directly touching the device or screen. The input buttons pictured in FIG. 2 include a "Menu" button, a "Views" button, a "Repeat/Vol" button, a "Back" button, a "Notify" button, and a verbosity toggle switch. "Menu" is used to select a menu screen. "Views" changes the display reading between, for example, a map display, one or more menus for potential destinations or other navigable points of interest, data entry screens that may be used to manually enter a destination address or to name a selected destination to be saved for later reference, turn-by-turn directions either from a driver's perspective or as a list, and the like. The "Repeat/Vol" button allows the user to prompt the device to repeat the last verbal command. This button may be optionally set to replay the repeated command at a louder volume. "Back" allows the user to quickly return to the previous screen without having to navigate back to it via a main menu. The toggle switch allows selection of the alert mode via which the device communicates with the user. For example, this control may include the options "Full," "Alerts," or "Mute." "Mute" is self-explanatory. In "Full" mode, the device communicates all driving directions, such as for example each turn, the names of roads, and the like as well as traffic or emergency notifications. "Alerts" mode suppresses audible driving directions but delivers traffic, emergency, and similar alerts as in "Full" mode. In alternative embodiments, the hard buttons may also or alternatively include "nav" which provides a direct link to navigation information via the UI, "traffic" which provides links to traffic congestion and alert information, "volume" and "mute" which allow on-screen adjustments of some or all of the device volume controls.

Figure 3:
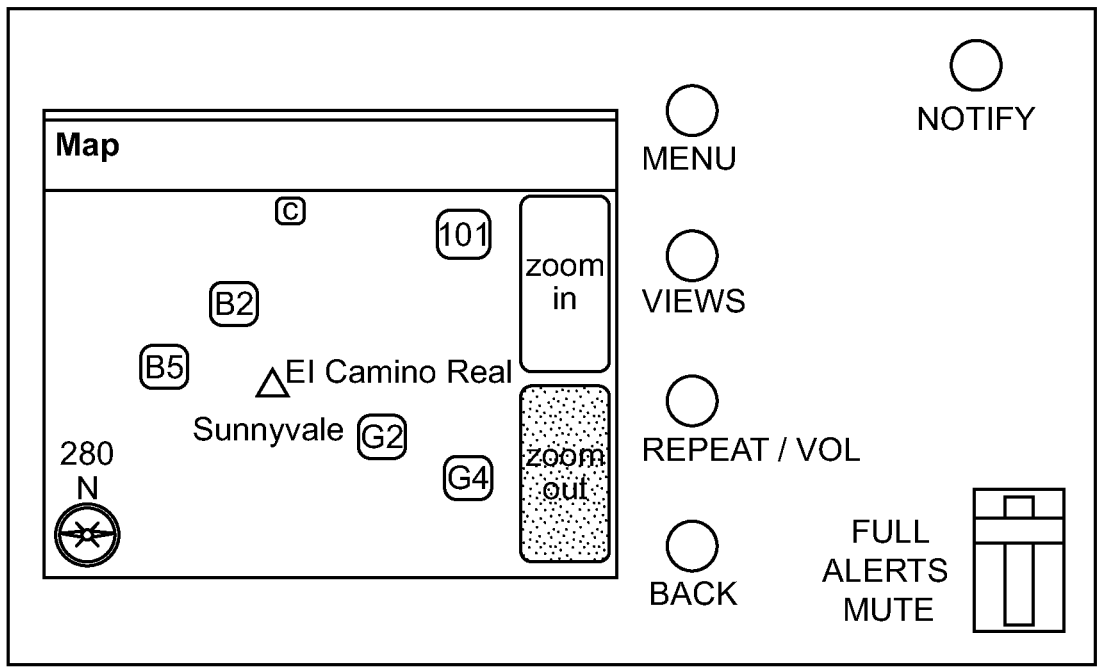
Figure 82:
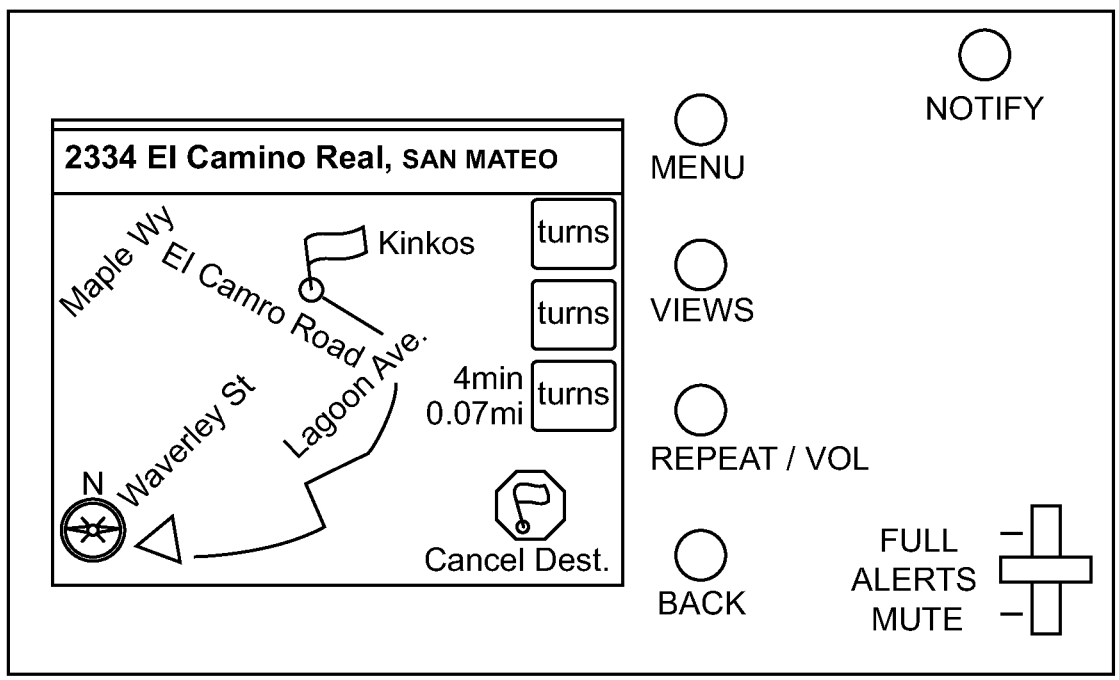

FIG. 3 to FIG. 82 are a series of views of a UI according to one embodiment of the present invention. In this series of views, a hypothetical user (the hypothetical user in this example is named "Barry") employs many of the features of the present invention to assist in traveling throughout the San Francisco Bay Area counties of Santa Clara, San Mateo, and San Francisco. The views and features shown here are intended merely as an illustration of some of the advantages and functions of the present invention and should not be construed to limit the scope of the invention in any way. The hypothetical trip begins at 4 pm at a client's office in Sunnyvale, Calif. Barry needs to drive from the client's office to his office in Palo Alto, Calif. He then plans to travel to a restaurant in San Francisco where he will eat dinner.

Figure 4:
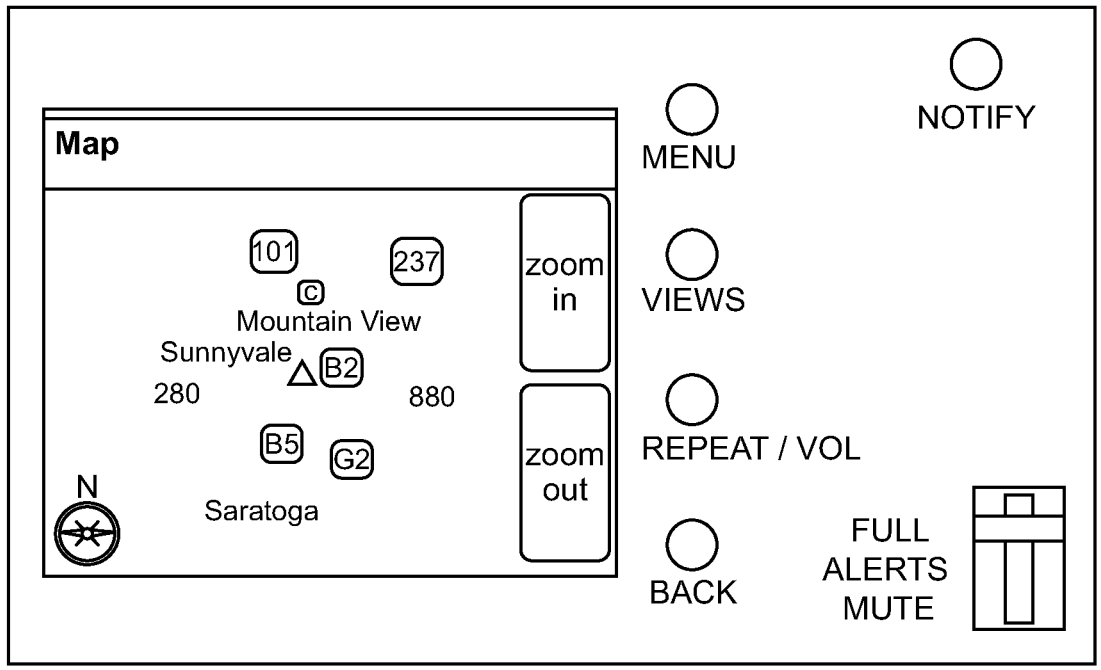
Figure 5:
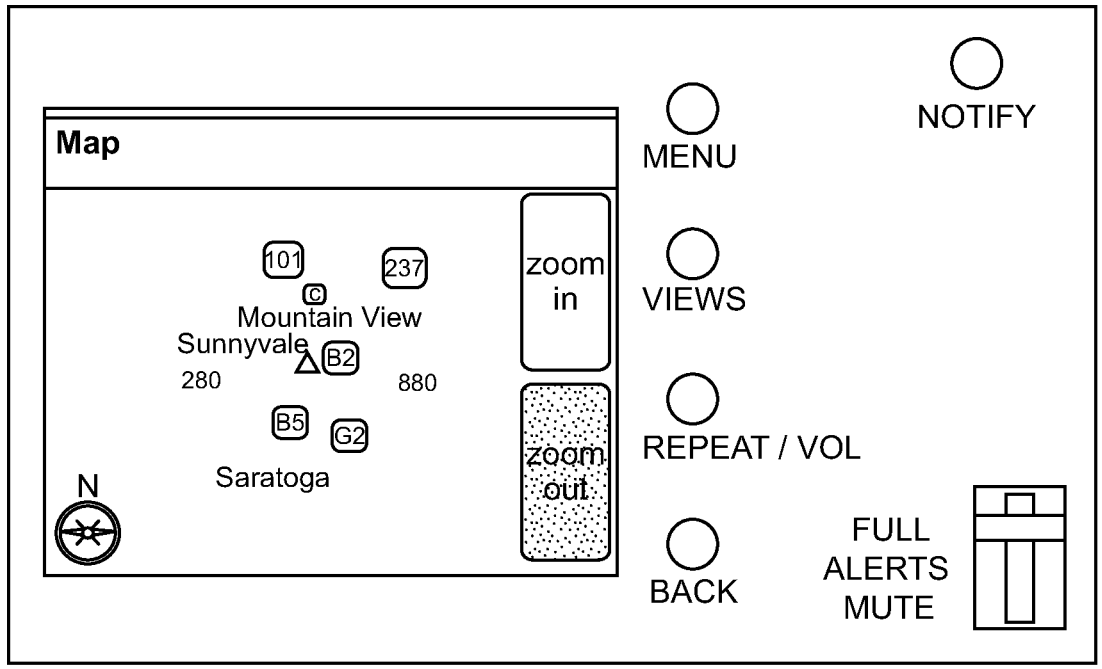
Figure 6:
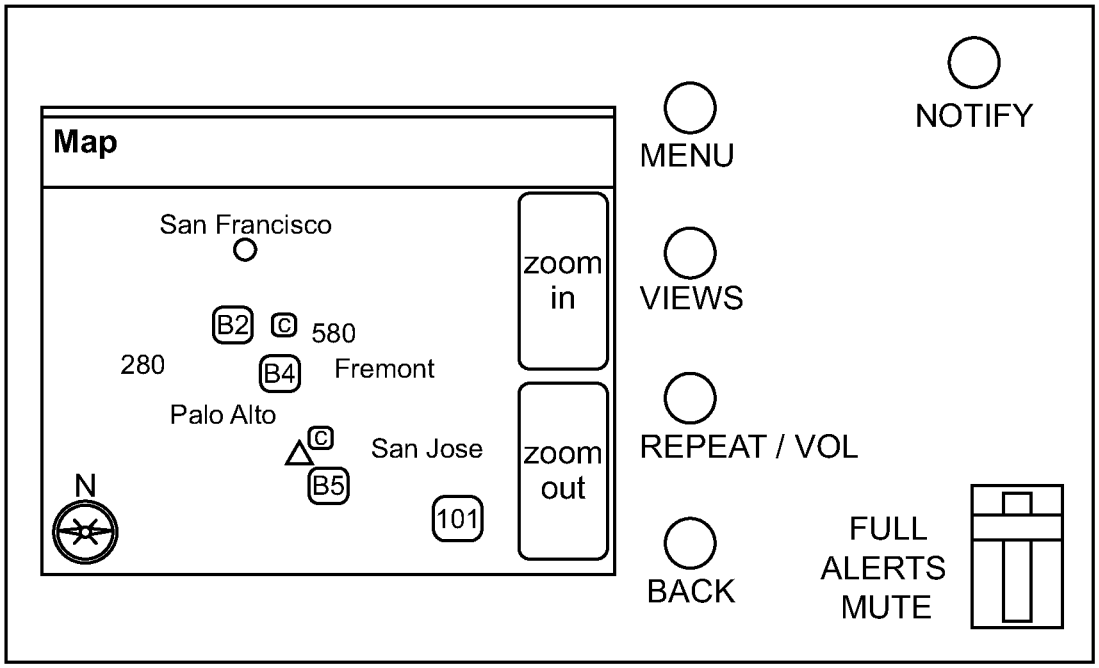

FIG. 3 shows a UI display according to one embodiment of the present invention. Upon pressing the "view" button, a map of the major freeways in the vicinity of Barry's location is displayed. A compass icon is displayed to orient the driver. Two touch-sensitive buttons for zooming the map in and out are also provided. FIG. 4 shows the resultant map after Barry presses the "zoom out" button once, FIG. 5 shows the resultant map after Barry presses "zoom out" twice, and FIG. 6 shows the resultant map after Barry presses "zoom out" a third time. In FIG. 6, the map is now zoomed out sufficiently to show the major freeways between Sunnyvale and Barry's ultimate destination in San Francisco. In each of FIG. 3 through FIG. 6, areas of slower traffic are indicated in yellow on the corresponding roads while area of stopped traffic or other potential emergencies are indicated in red. In one embodiment, the map may be "panned" such that the user's position is not centered on the screen. Though not shown in the present example, Barry may pan the map by pressing a soft or hard arrow key on the appropriate side of the map screen. When he does so, a new UI element appears giving him the option to have the map "track me." This option allows Barry to select having the map remain in its current position (showing the car moving across the mapped area) or to track his movements and remain centered on his position as he drives. Either option may be made the default by user command.

Figure 7:
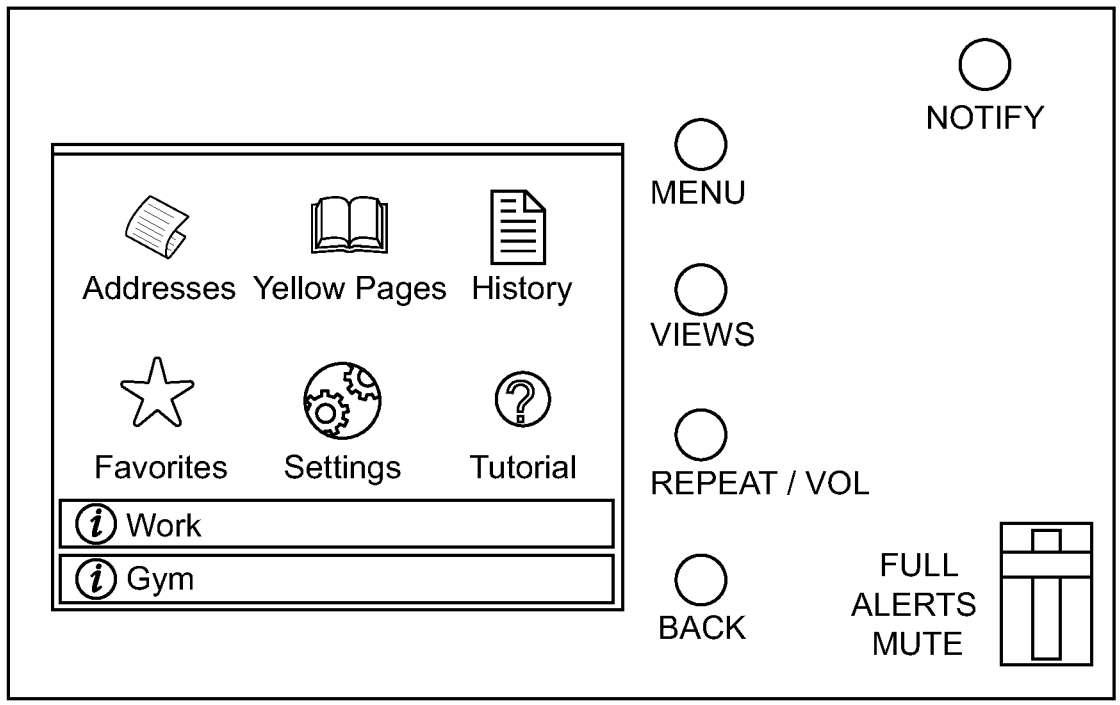

After reviewing the zoomed out map in FIG. 6, Barry presses the "Menu" button to display a selection screen for possible destinations. As shown in FIG. 7, the device displays general choices such as "addresses," yellow pages," "history," "favorites," "settings," or "tutorial." "Addresses" links to a screen for manually entering a destination address. "Yellow pages" allows the user to look up a specific type of destination, optionally searching by proximity to the present location, a destination location, or the route being traveled. "History" links to a listing of previously visited and/or searched destinations. "Settings" links to a device configuration screen or screens, and "Tutorial" provides an online guide to device features. Also as shown in FIG. 7, the device may display a listing or suggested destinations when the "menu" button is pressed. These suggested destinations may be tailored by time of day, day of the week, location, and/or other parameters. The device includes a memory and adaptive software that records and analyzes past activities of Barry (the user) in order to produce a list of suggested or proposed destinations. Because it is approximately 4:00 PM, the device suggests two potential destinations (work, and the gym) that Barry has visited previously at similar times and from similar starting points. Barry had previously entered the labels for the destinations. If he had not done so, the device may have displayed them in other descriptive terms, such as for example the street address, city, etc.

Figure 8:
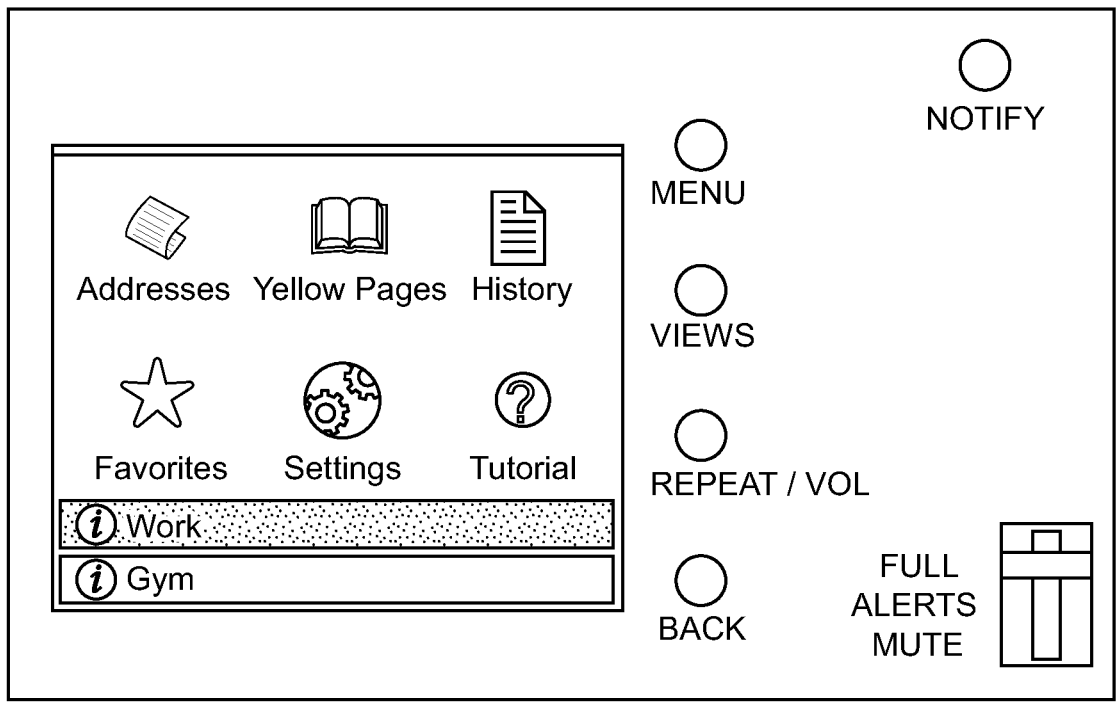
Figure 9:
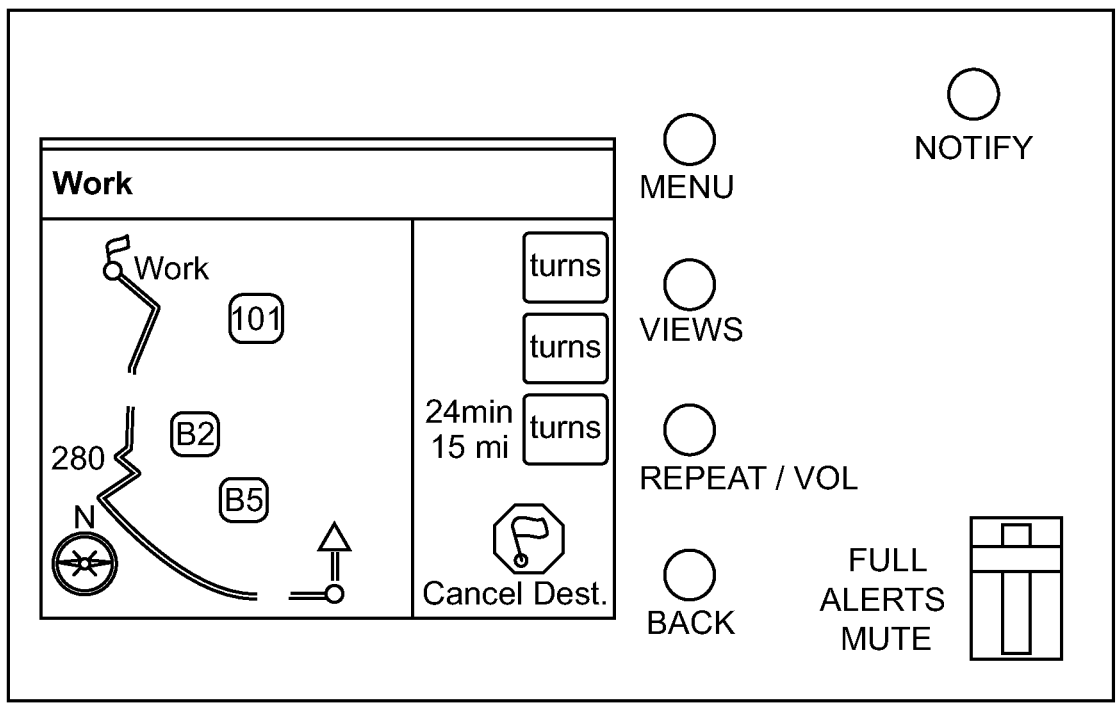

After Barry selects "work" from the list by touching the screen (FIG. 8), the device switches to a map screen showing several (in this example three) potential routes from his current location to his office. An example of this display is shown in FIG. 9. Each potential route is drawn in a different color. The screen also displays an estimated travel time and driving distance for each route as a touch-selectable region on the screen. The estimated travel times are advantageously determined based on real-time traffic information that is transmitted to the device by some communication means, such as for example an enhanced wireless network as described in co-pending U.S. patent application Ser. Nos. 10/272,039; 10/436,967; 10/436,926; 10/437,205; and 10/436,691, the disclosures of which are incorporated herein by reference. Other communication means, such as for example cellular phone or longer-distance radio based networks are also possible. Barry may select a route by touching the appropriate area on the screen.

Figure 10:
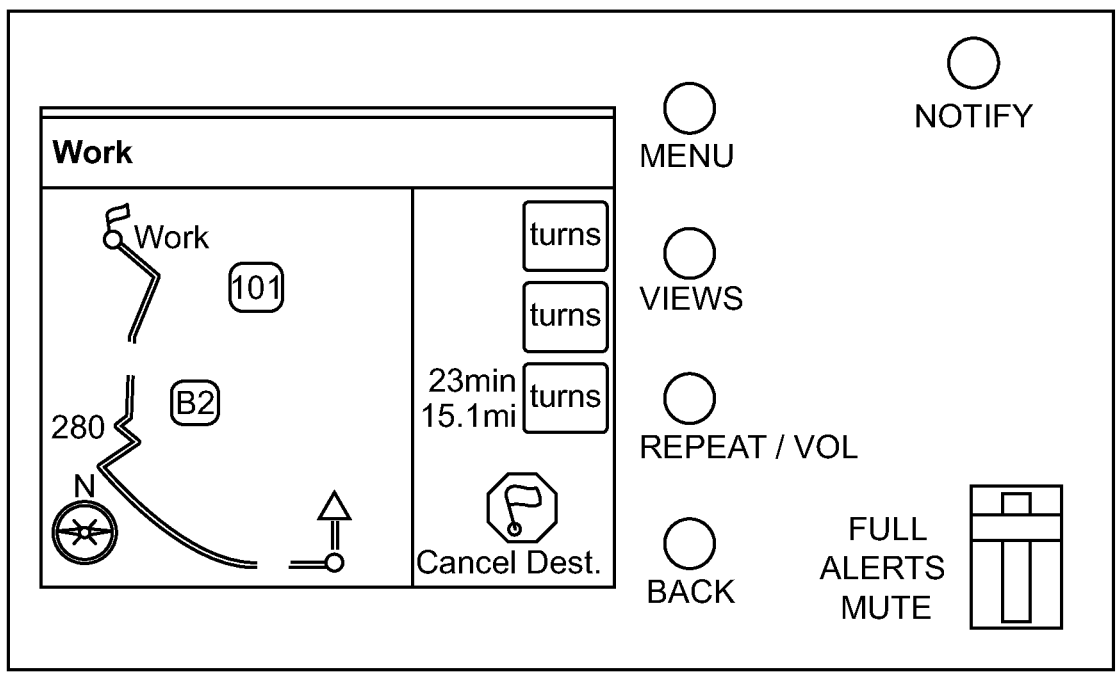
Figure 11:
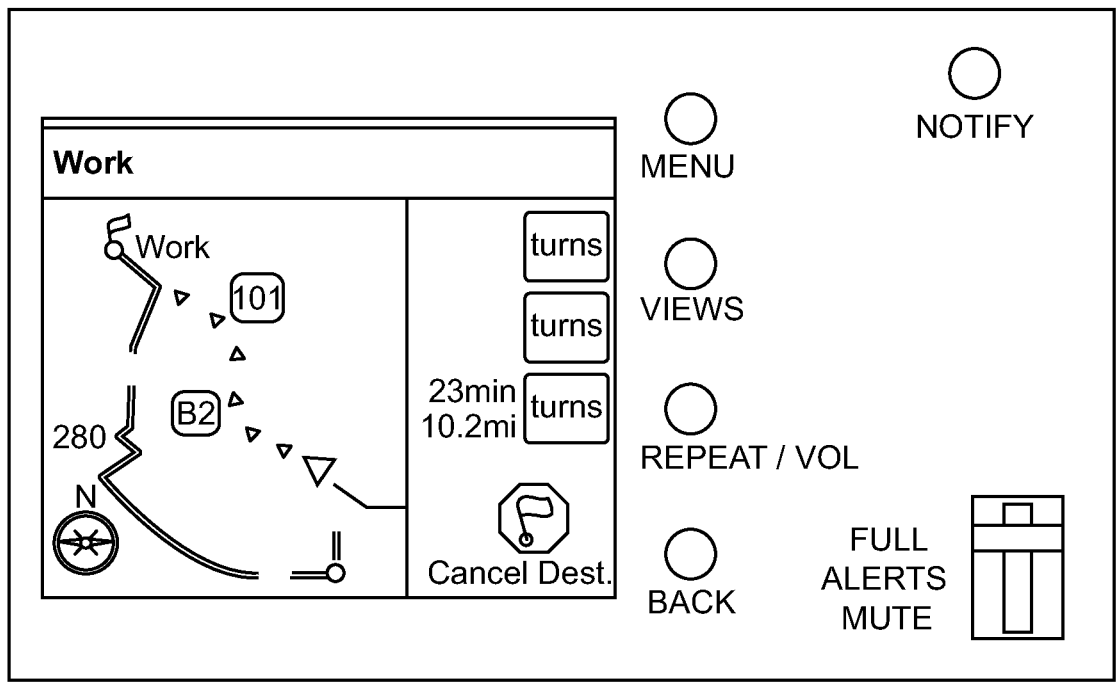

Alternatively and more conveniently, he may simply begin driving one of the routes as shown in FIG. 10. The device detects that he is following the selected route and begins to provide driving directions accordingly as shown in FIG. 11. Once the device detects that Barry is following the first suggested route—in this case Highway 101 north toward Palo Alto—the touch-screen "buttons" change slightly. The first suggested route (now the chosen route) button changes to "ETA"—Barry may select this to provide an accurate estimated time of arrival based on his position, speed, and current traffic conditions along the route. The second and third suggested route buttons change to read "turns"—Barry may select either of these options if he decides to deviate from the first route to follow one of the other routes. The device would then immediately provide turn-by-turn directions for reaching the newly selected route from Barry's current position. An additional selection (in this case an icon resembling a finish flag in a red stop sign) may be provided to allow the user to cancel the previously selected destination.

Figure 12:
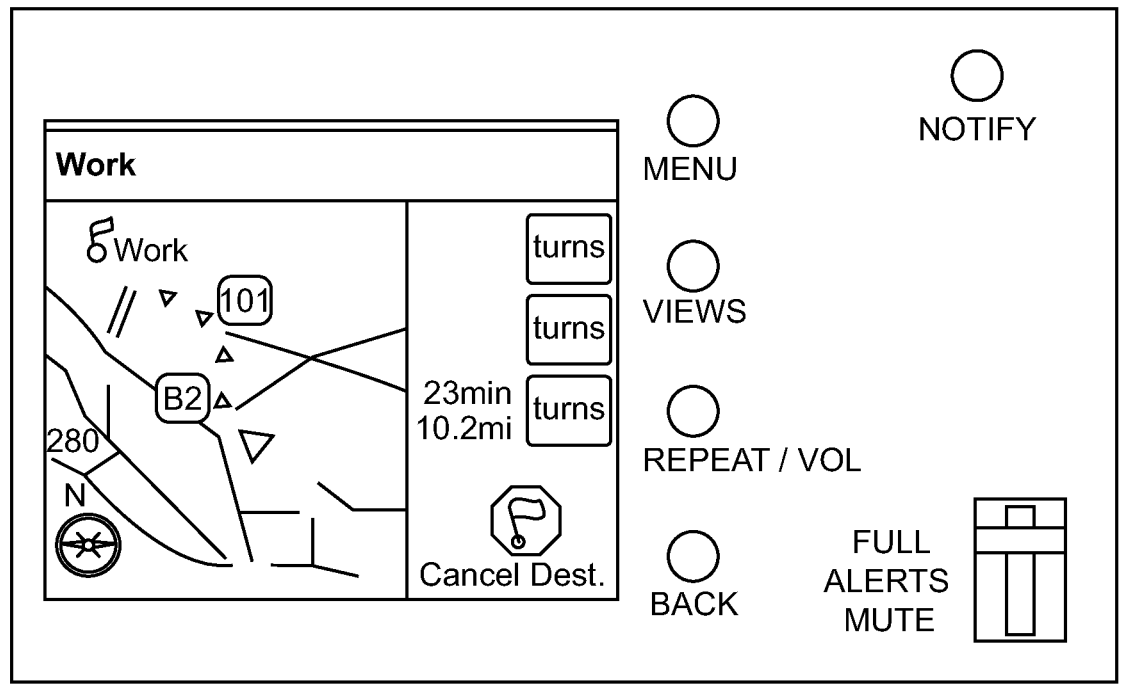
Figure 13:
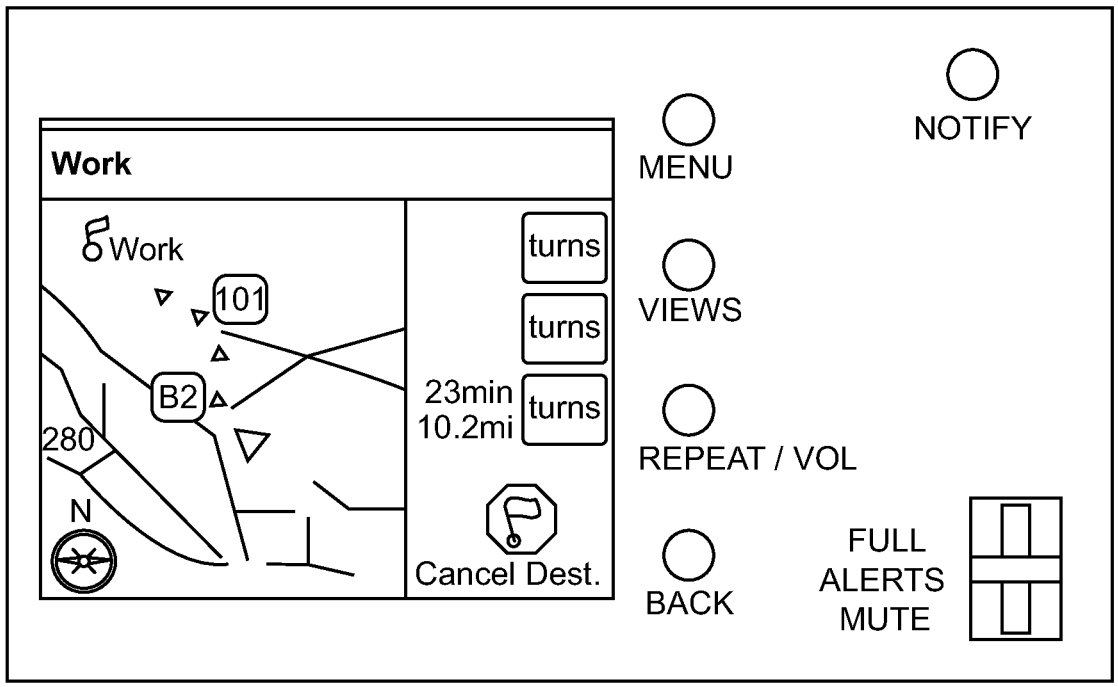

As Barry drives, the available routes between his instant location and his selected destination are continuously updated based on his location and any traffic information received by the device. The device may provide turn-by-turn driving directions. These directions may be provided verbally through the device's external speaker or through the car's sound system. Alternatively, if Barry has selected "Alerts" or "Mute" from the three-way selector, turn-by-turn directions are provided only on the screen, not verbally. In the example shown in FIG. 12, Barry is familiar with the route to his office from the client's office, so he selects "Alerts" as shown in FIG. 13. The device therefore only notifies him audibly if new information about traffic disturbances or other emergencies is received.

Figure 14:
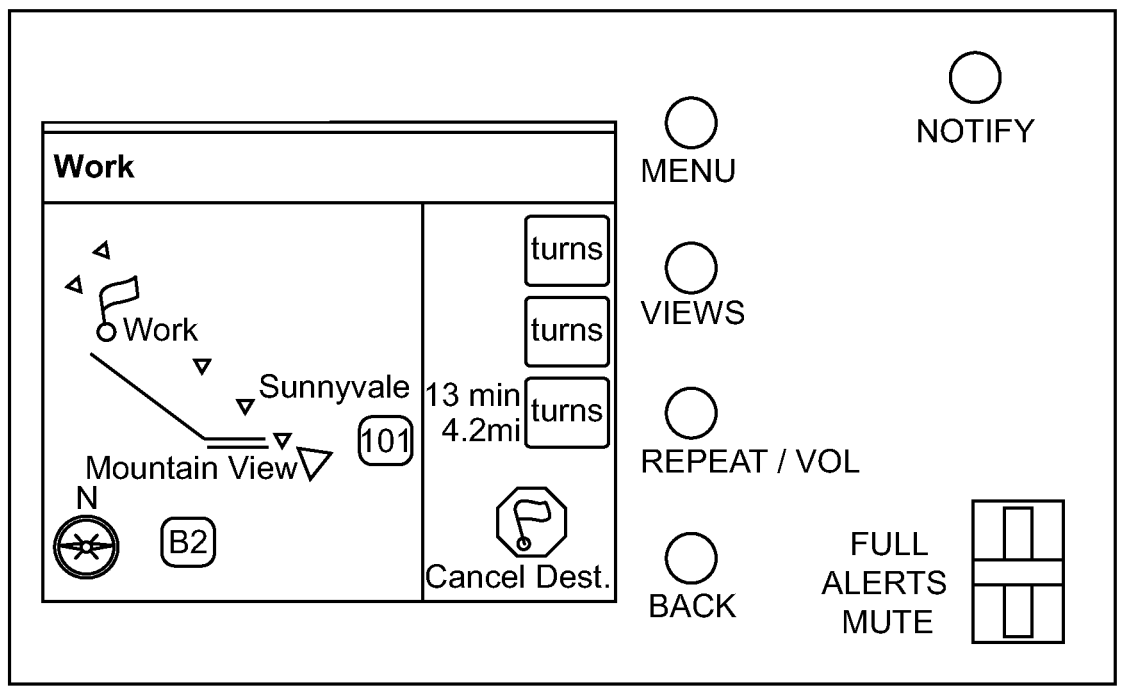
Figure 15:
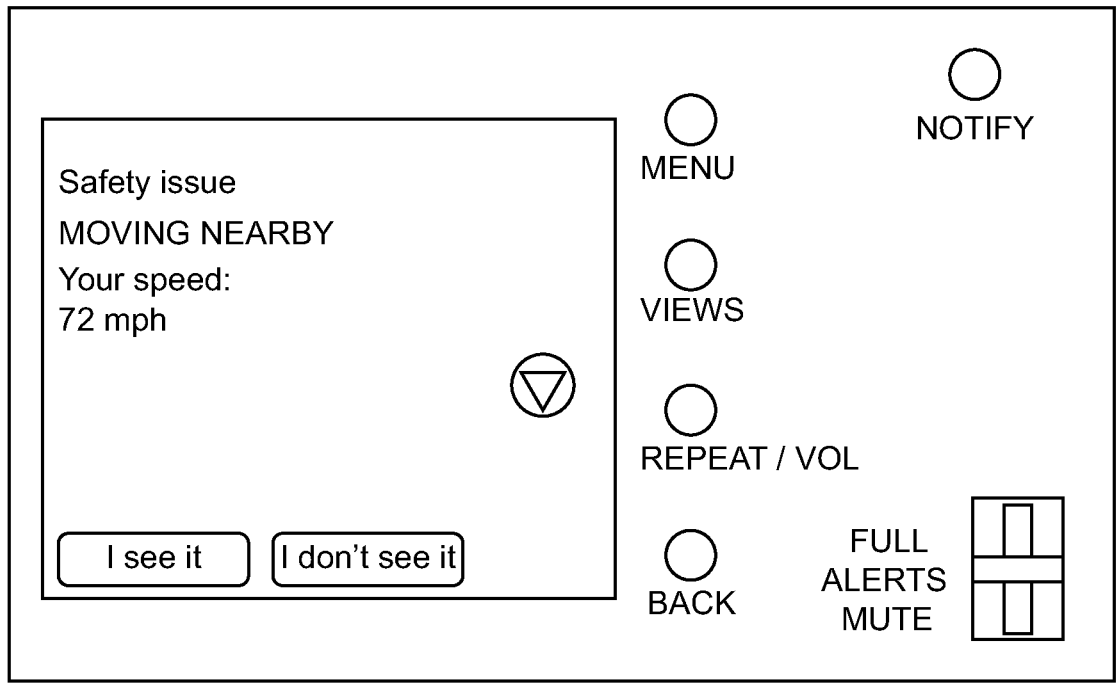
Figure 16:
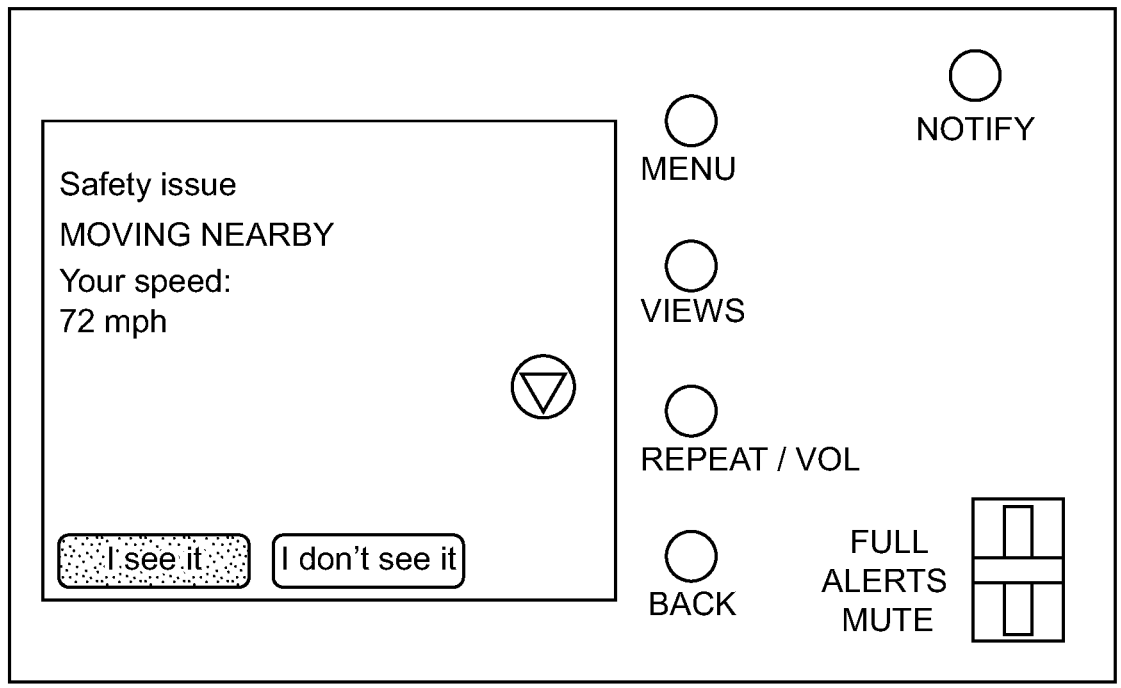
Figure 17:
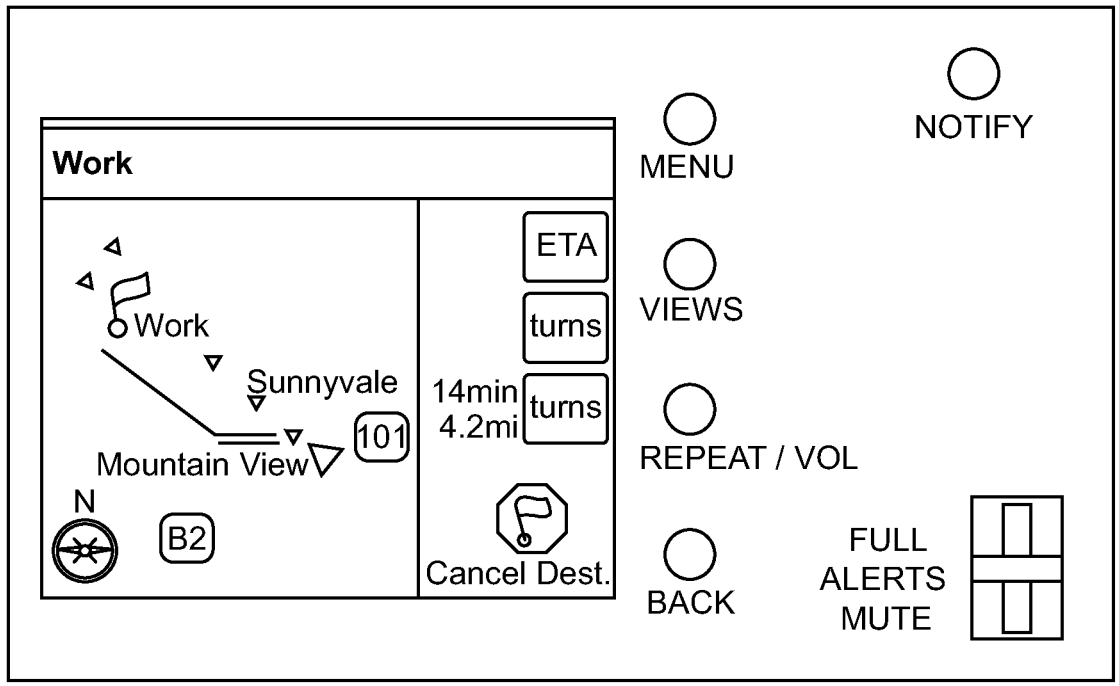

FIG. 14 shows the map changes as Barry progresses on Highway 101 north toward Palo Alto. At a point during his trip, the device notifies Barry of a potential issue with an alert as shown in FIG. 15. Alerts are displayed on the screen when the device is notified via the communication network that a traffic disturbance or other concern lies on the route Barry is currently following. In this instance, the device has received information that a "moving" safety issue is nearby Barry's immediate location. This safety issue could be an emergency vehicle such as for example an ambulance or fire department vehicle. Alternatively, the safety issue could be a law enforcement vehicle. The device notifies Barry of his current speed (in this case 72 miles per hour) and also reports the number of times (3) the issue has been reported by other users of devices in communication over the communication network. The UI screen also provides two input selections that Barry may use to confirm or not confirm the safety issue. If Barry sees the issue and chooses to enter his own confirmation, he need only touch the appropriate screen button as shown in FIG. 16. If Barry does not hear the audible report provided by the device, he may press the "repeat" button to hear the alert again. Barry may wish to reduce his speed in response to the alert (FIG. 17).

Figure 18:
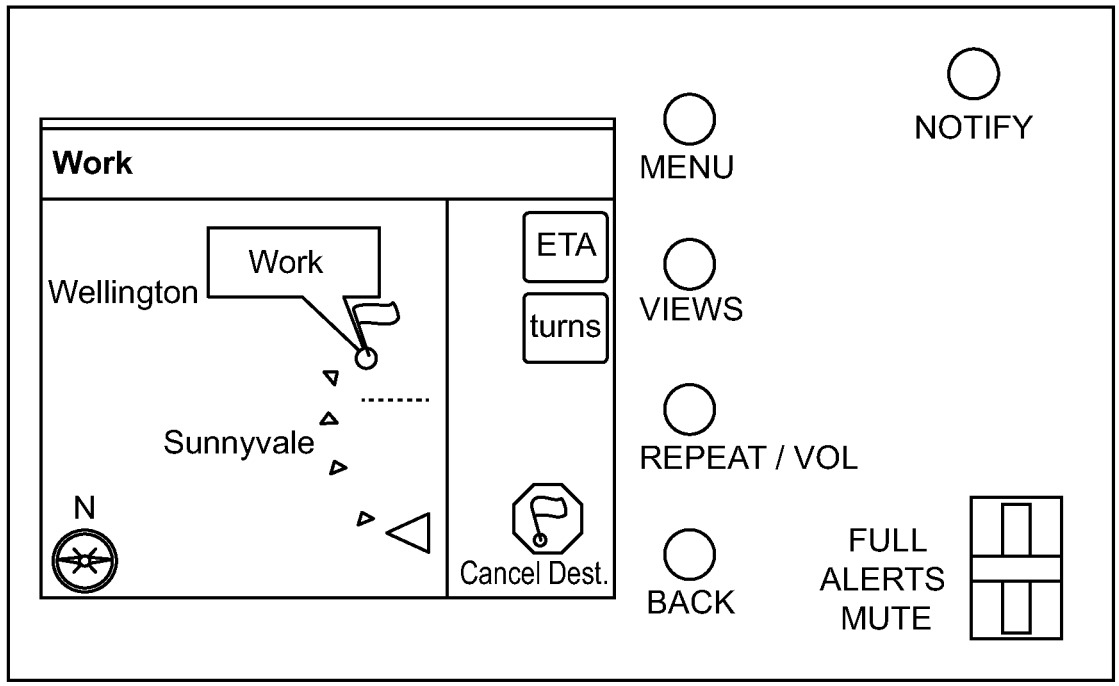
Figure 19:
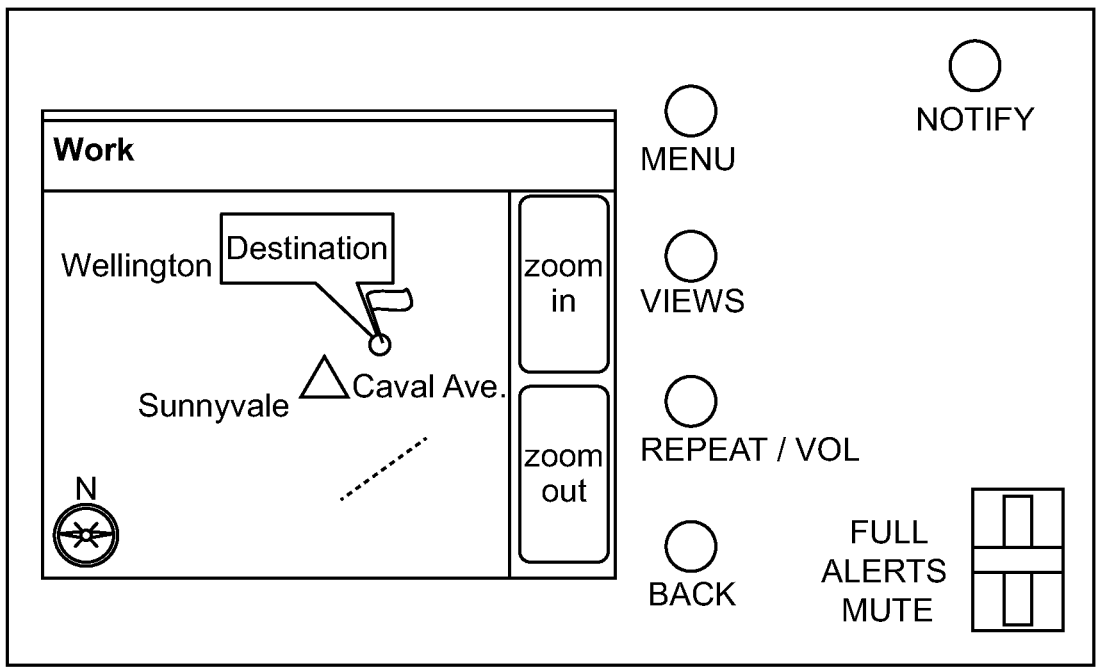

Barry reaches his office as shown in FIG. 18. The devices recognizes the he has arrived and switches to a summary screen that shows a map with the zoom in and zoom out selections available. Barry's actual travel time from his starting point is displayed, as is his travel distance. Other statistics may optionally be displayed, such as for example average, maximum or minimum speed.

Figure 20:
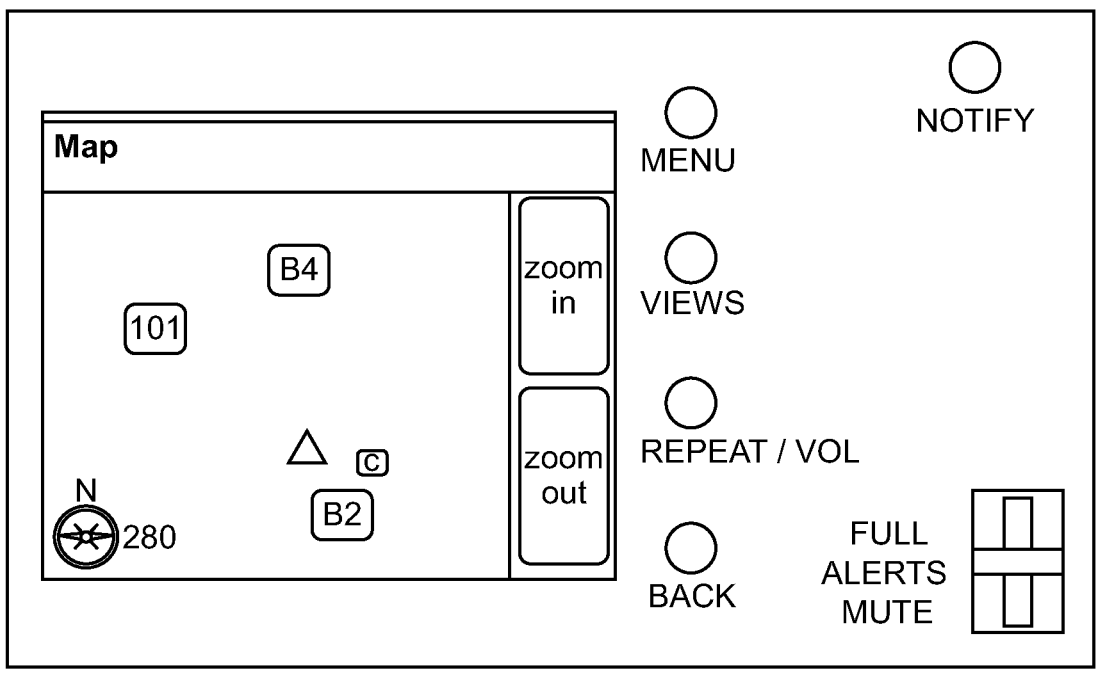
Figure 21:
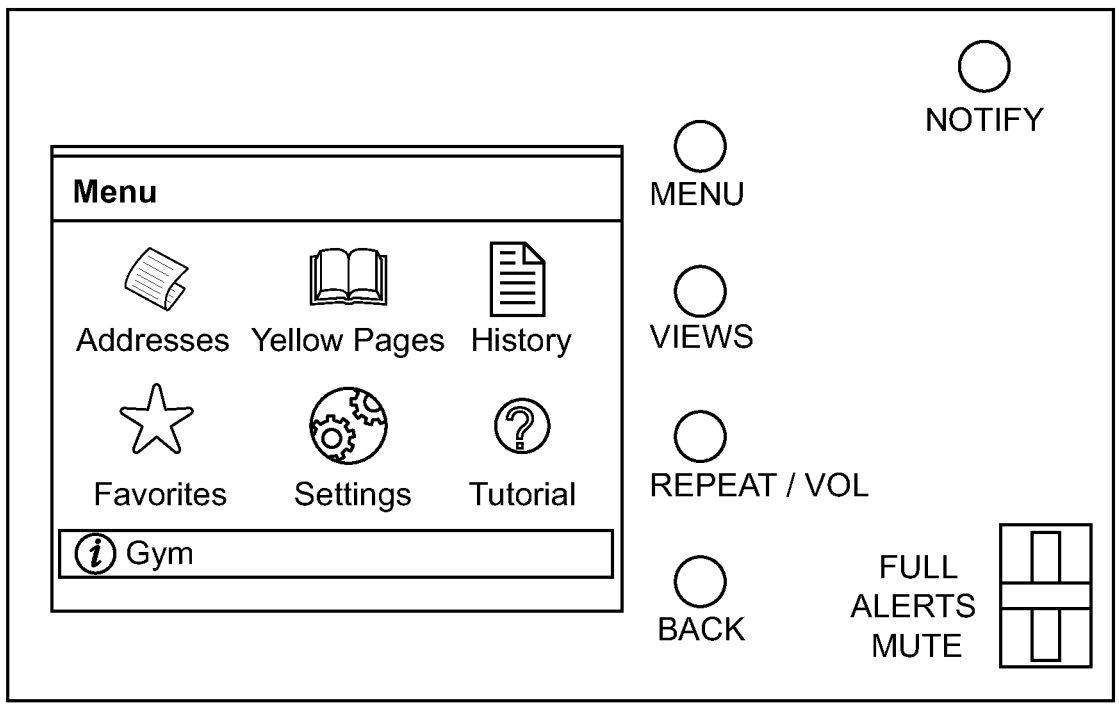
Figure 22:
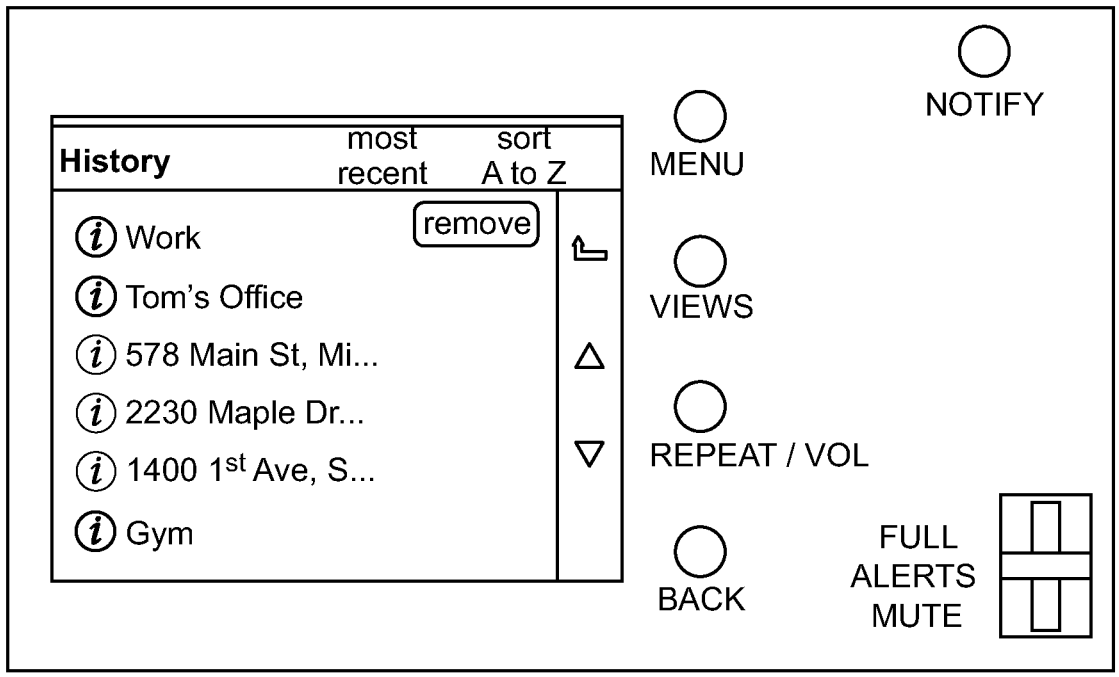
Figure 23:
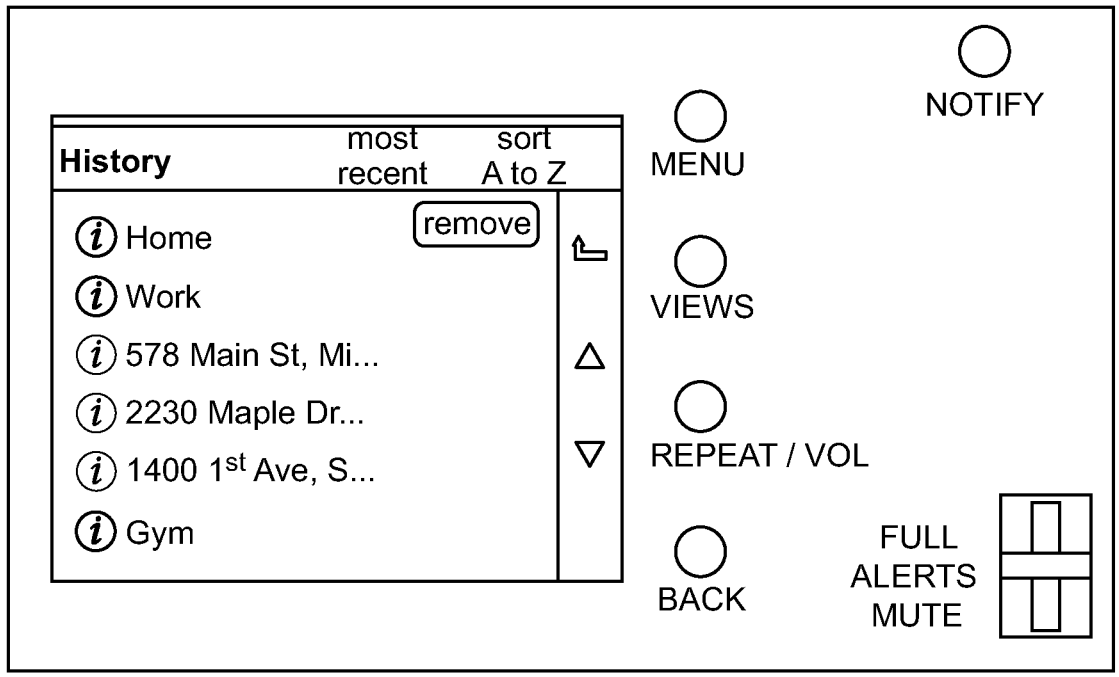
Figure 24:
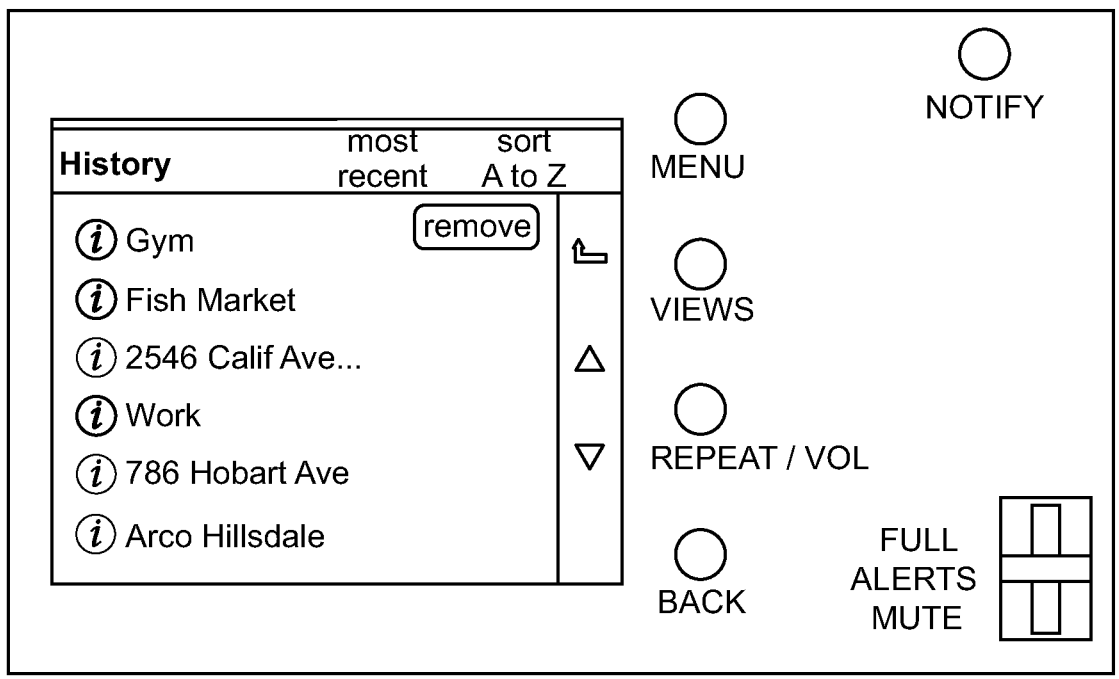
Figure 25:
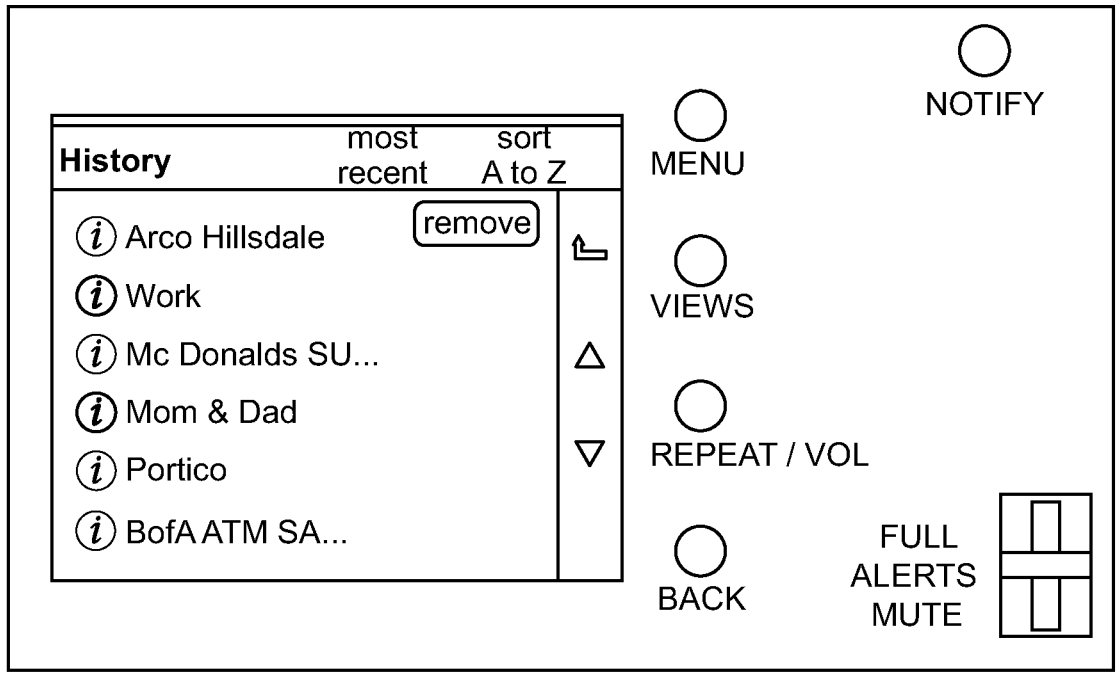

In FIG. 20, it is now 6:00 pm on the same day, and Barry is preparing to leave his office in Palo Alto to drive north to San Francisco to have dinner with another client. The UI display is currently a map of the area around Barry's office. By pressing the "Menu" button, Barry retrieves the menu screen as seen previously in FIG. 7 and FIG. 8. As it is now later in the evening and Barry is presently at his office, the device displays only "Gym" as a suggested destination as shown in FIG. 21. If Barry less regularly goes to the gym after work, the device may also provide a suggestion for "home." In this instance, since Barry plans to travel to a restaurant he visited recently, he selects "History" on the menu screen. The device then displays the screen shown in FIG. 22. This display includes a listing of recently visited locations. Each destination includes an estimated travel time and distance as well as an input touch sensitive selection for sorting the destinations. In various embodiments, lists may be sorted in a variety of ways. For example, sorting may be by distance from the user's present location, alphabetically by name (location names may be entered in a screen as explained in further detail below), by time since last visited, or the like. An "i" next to each location may be selected to provide additional information, such as for example the street address, phone number, notes, or other useful information. Barry uses the scroll down button as shown in FIG. 23 and FIG. 24 to scroll to the entry for "Portico" (the name of the restaurant that he had entered after visiting the restaurant previously) as shown in FIG. 25.

Figure 26:
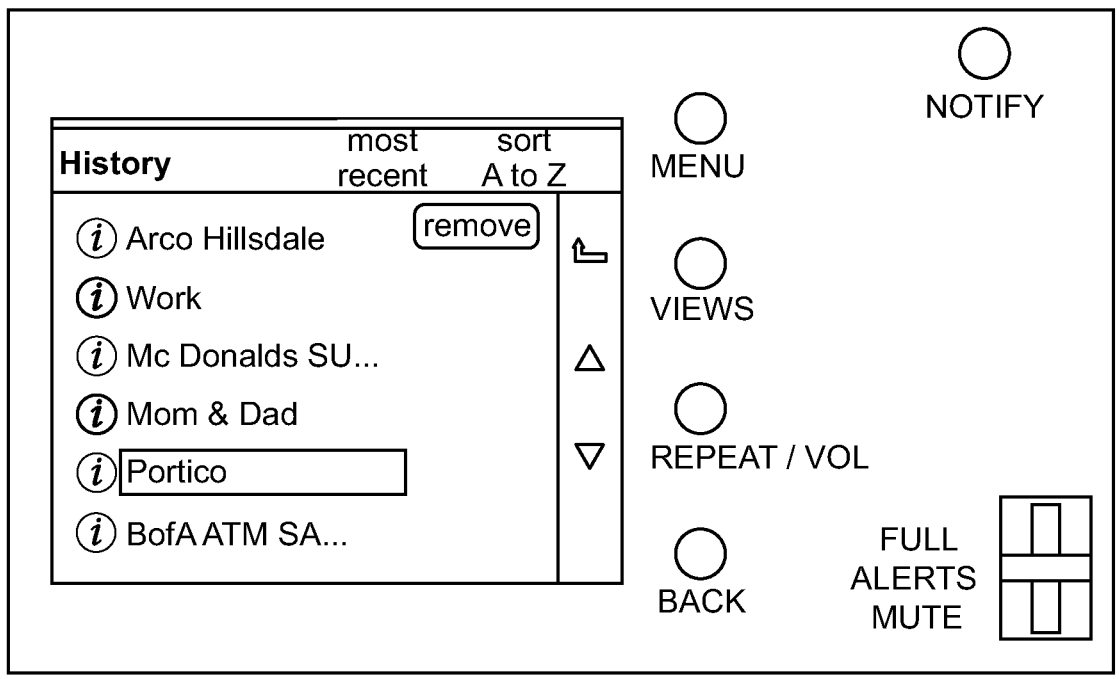
Figure 27:
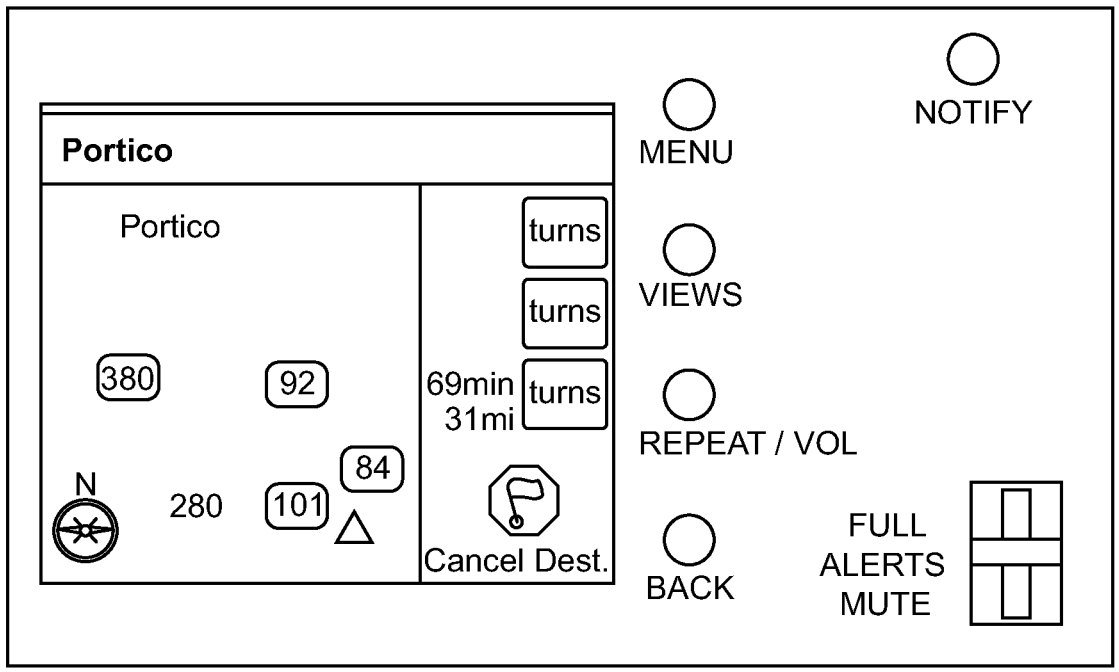
Figure 28:
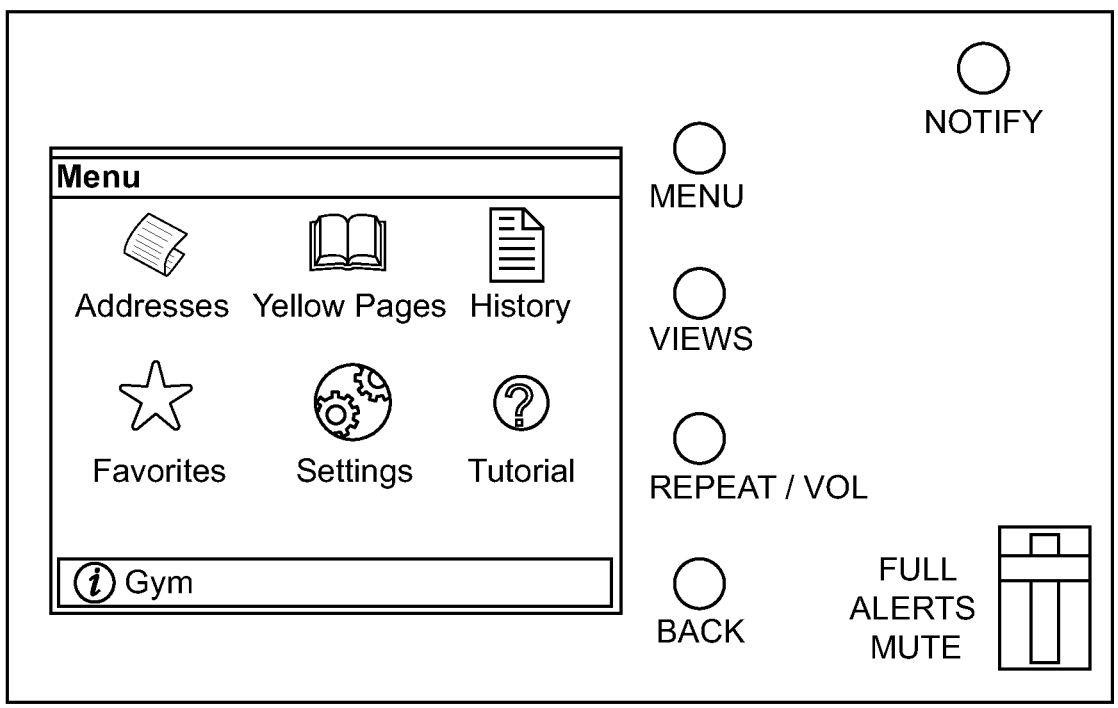
Figure 29:
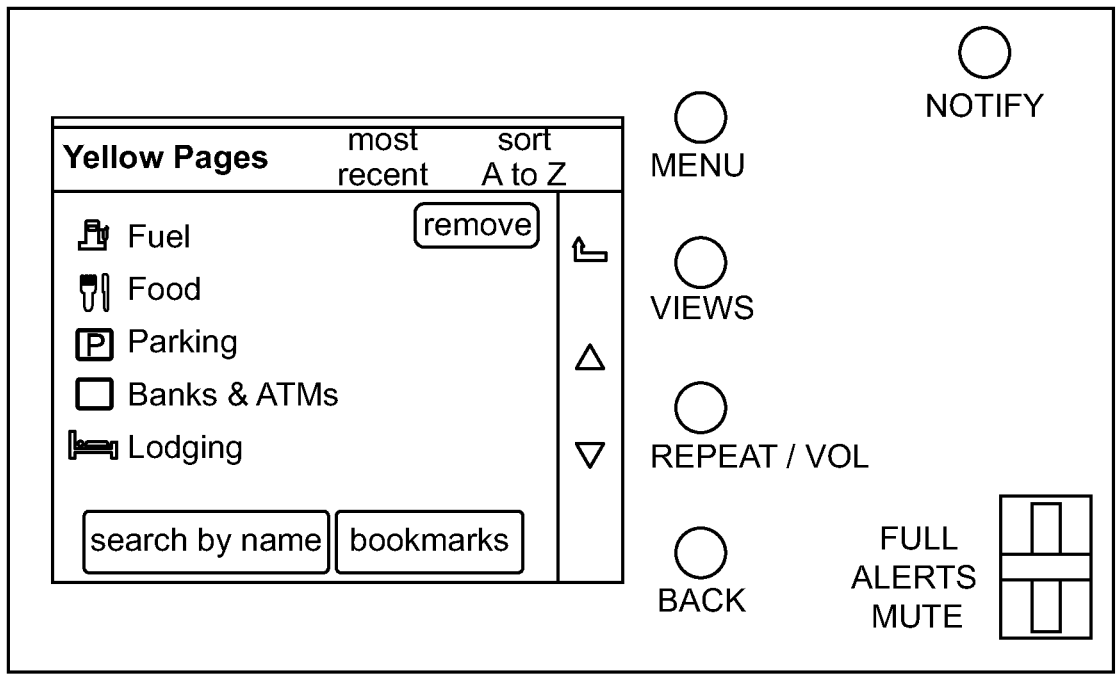
Figure 30:
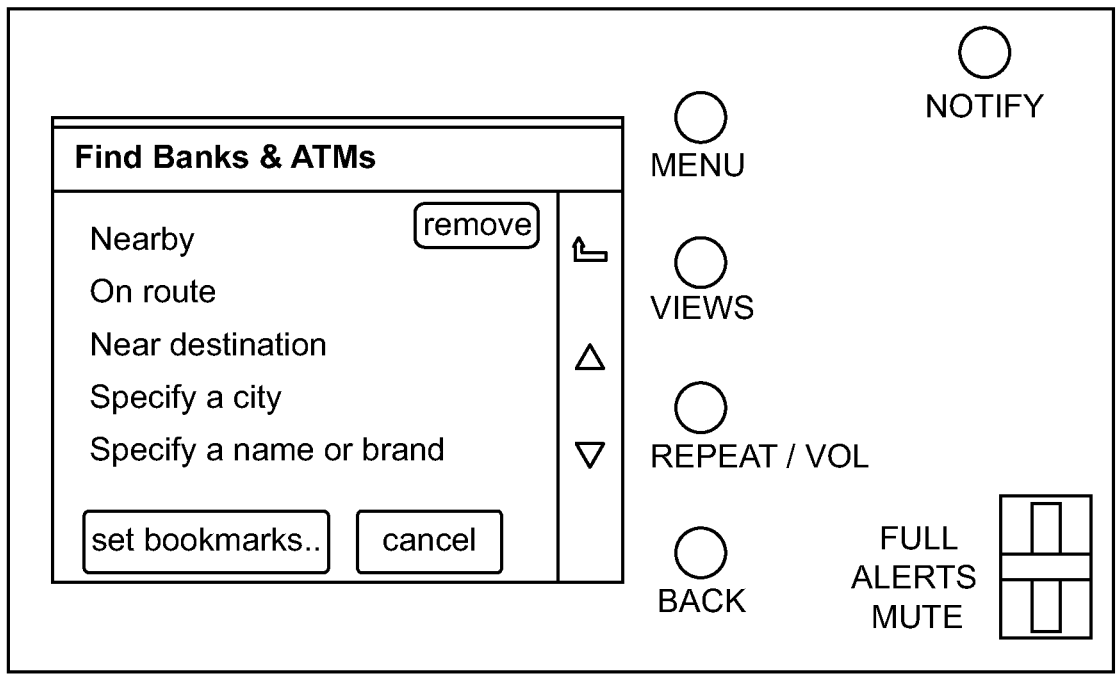

In FIG. 26, Barry selects "Portico" from the onscreen menu. The device then displays the route screen as shown in FIG. 27. Three potential routes from Barry's office to the restaurant are shown, each with a color-coded estimated travel time and driving distance. As noted in FIG. 27, Barry also realizes that he will need some cash prior to reaching the restaurant. He therefore presses the "Menu" button to find a convenient automated teller machine (ATM) where he can stop. From the menu screen (FIG. 28), Barry selects "Yellow Pages." The yellow pages screen shown in FIG. 29 is sorted by 'most used" types of businesses. It may also be sorted alphabetically, by proximity to the present location or some other location, or any other options typically provided by online directory databases. After Barry selects "Banks and ATMs," he is provided with a list of options as shown in FIG. 30. The UI allows Barry to specify where he would like to search for a bank or ATM. For example, he may choose to find one near his present location, along his route to the restaurant, near the restaurant (destination), or in a specific city or town. Alternatively, if Barry chooses to look only for a specific brand or name (for example "Bank of America™"), he may indicate that choice as well. For potential options nearby, on the route, or near the destination, the device displays estimated driving time and distance based on traffic information received from the communication network.

Figure 31:
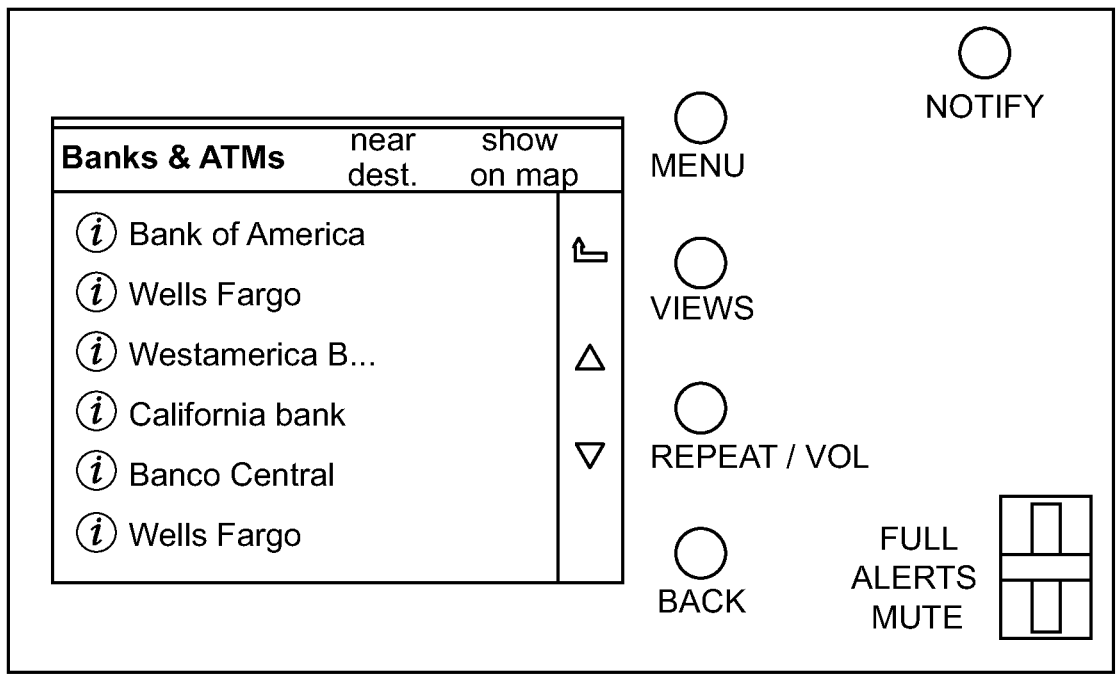
Figure 32:
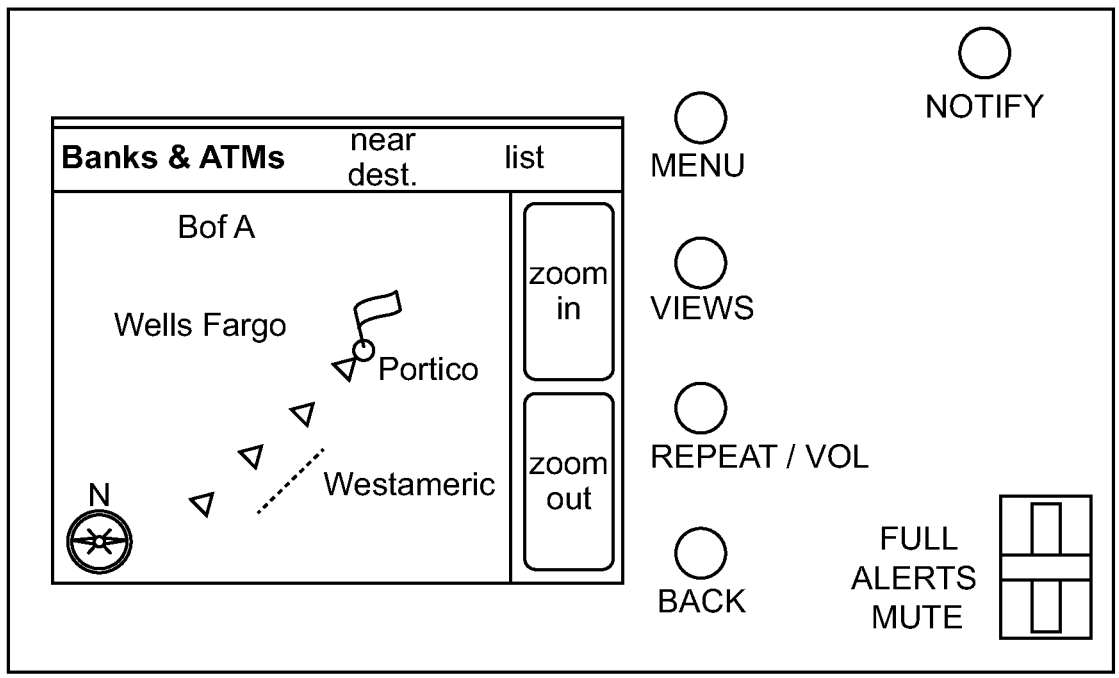

After Barry chooses the "near destination" option—he has decided that it would be wisest to get close to the restaurant as soon as possible to avoid potential worsening rush hour traffic—he is shown the menu in FIG. 31. Here, a listing of ATM or bank locations is provided, each with a distance and estimated driving time form his present location. To make an informed decision about which is closest to the restaurant, Barry selects the "show on map" option. The resultant map, shown in FIG. 32, is zoomed in near the destination in San Francisco. Each potential ATM or bank location is indicated with a summary name ("B of A" for Bank of America™, etc.) along with estimated driving time and distance from Barry's current location. As Barry is a Bank of America™ customer, he selects that location by touching the screen in the appropriate place.

Figure 33:
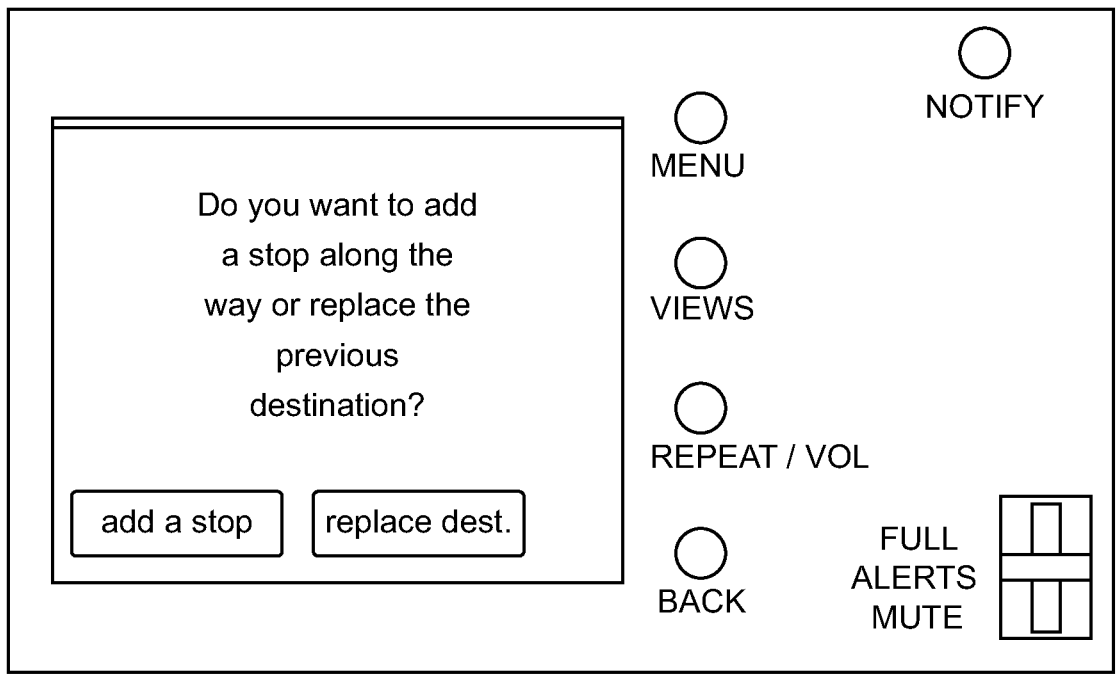
Figure 34:
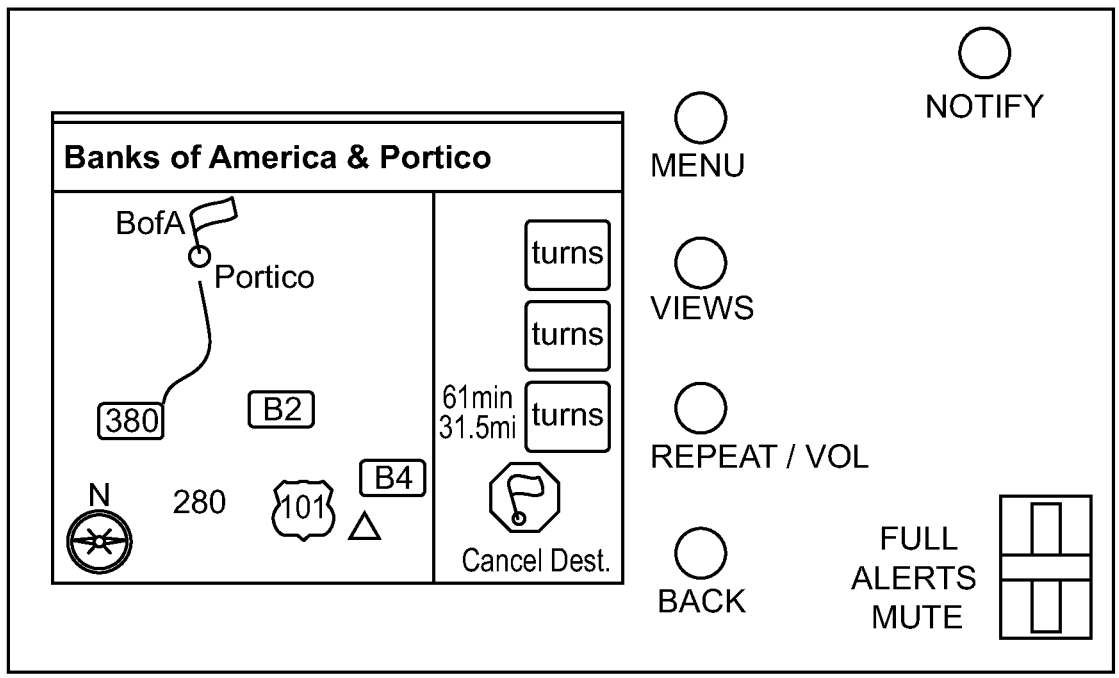
Figure 35:
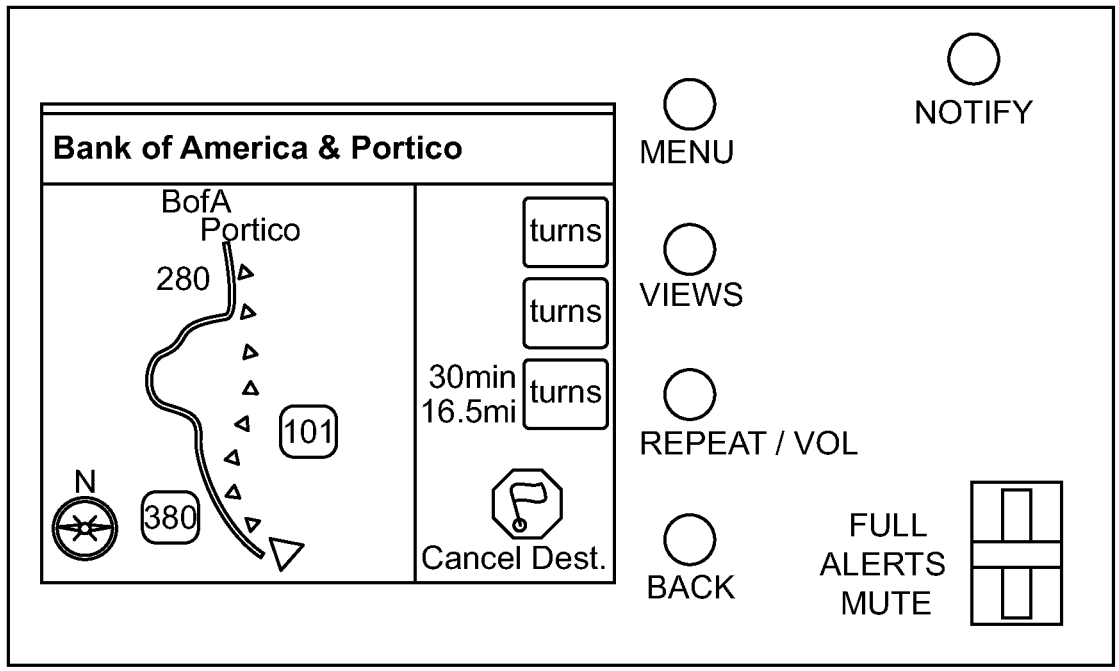

As shown in FIG. 33, the device then asks Barry whether he would like to add the ATM/bank location as a new destination (replacing the restaurant) or as a stop along the way to the restaurant. Once Barry selects the "add a stop" option, the display switches back to a map of the available suggested routes as shown in FIG. 34. As Barry begins to drive on the route following Highway 101 north (indicated in green), the display changes to read "ETA" next to that route as shown in FIG. 35. The alternative routes are shown below with a "turns" option next to them. If Barry decides to divert onto one of the alternate routes, pressing "turns" next to the selected route will provide him with turn-by-turn driving directions for reaching and following the new route. The current route ETA and mileage remaining for the current route and the estimated travel time and distance for each of the routes Barry did not select are periodically updated with information received via the communication network.

Figure 36:
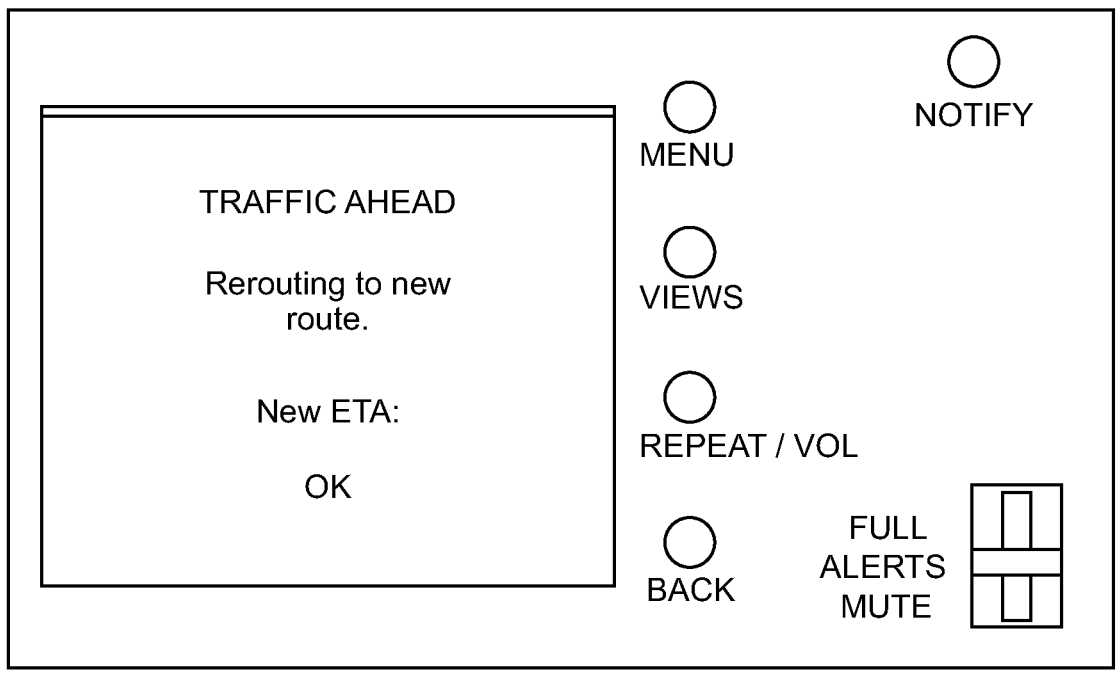
Figure 37:
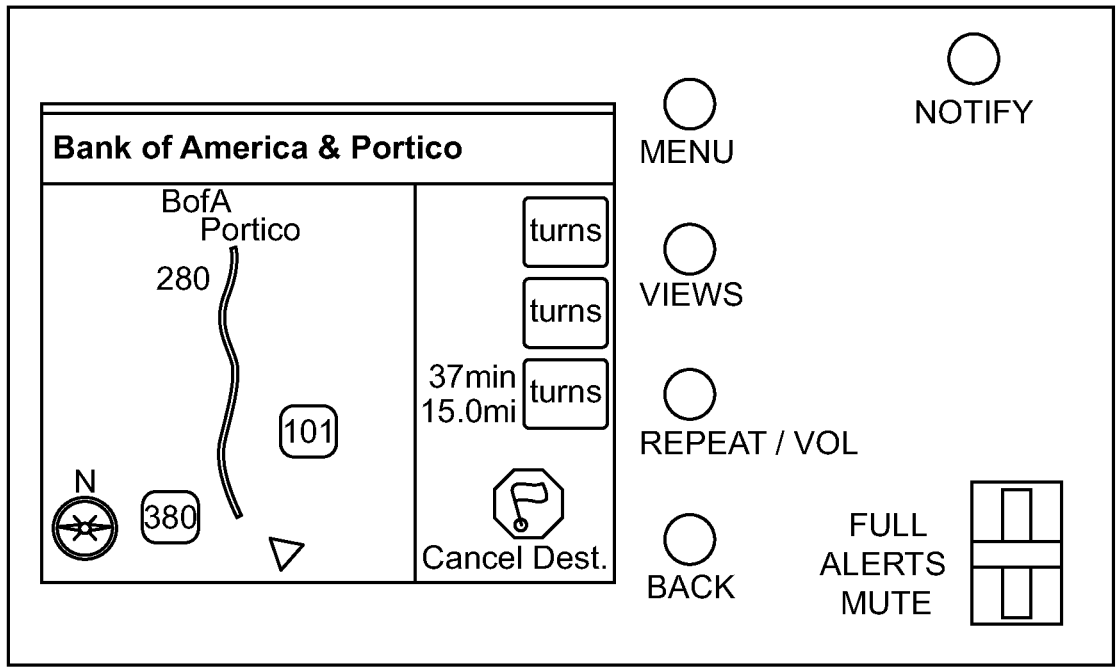
Figure 38:
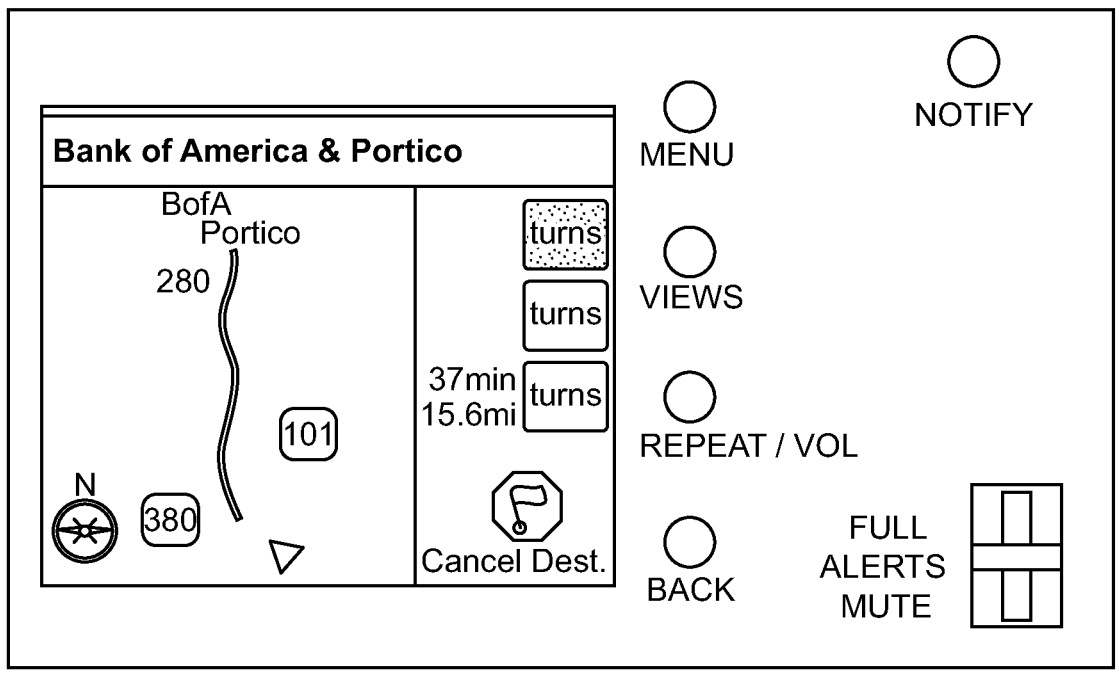
Figure 39:
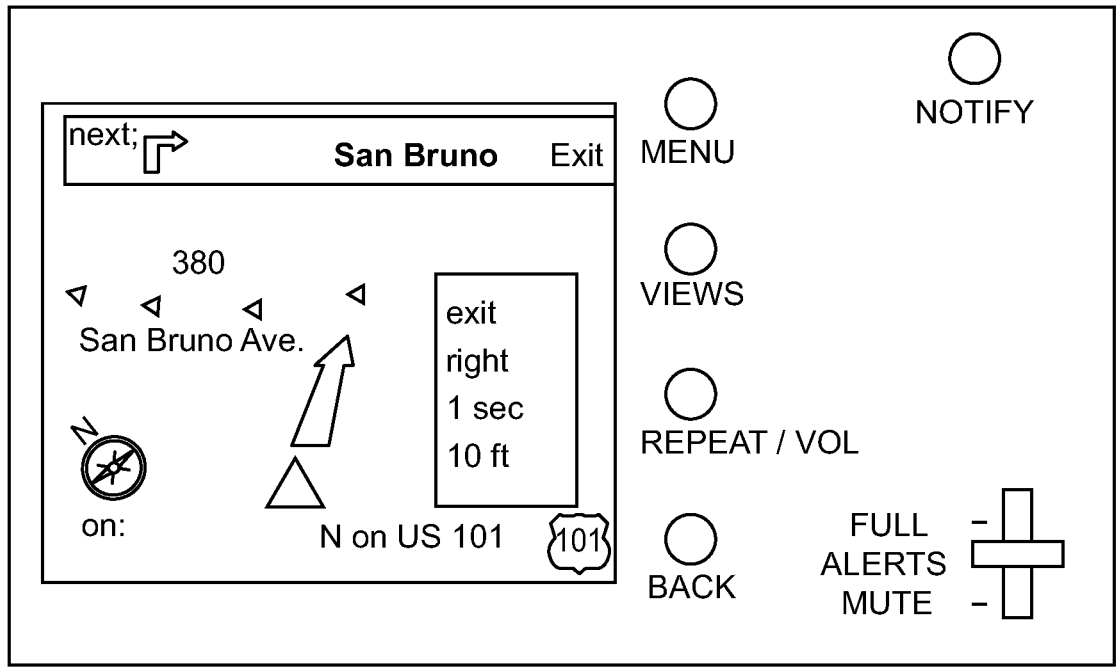
Figure 40:
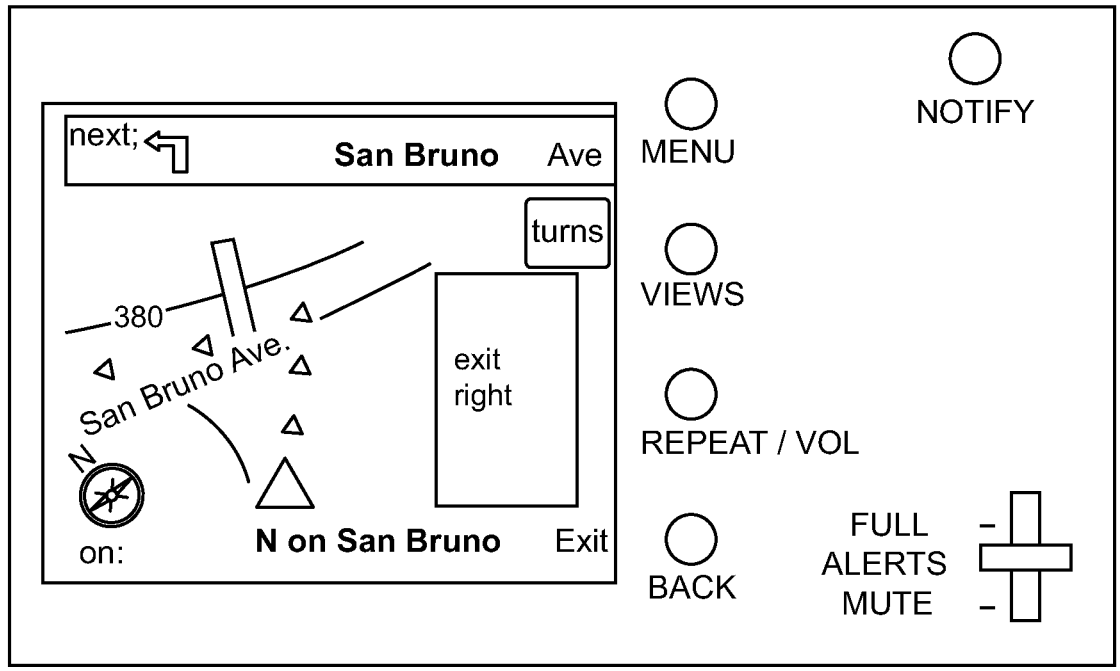
Figure 41:
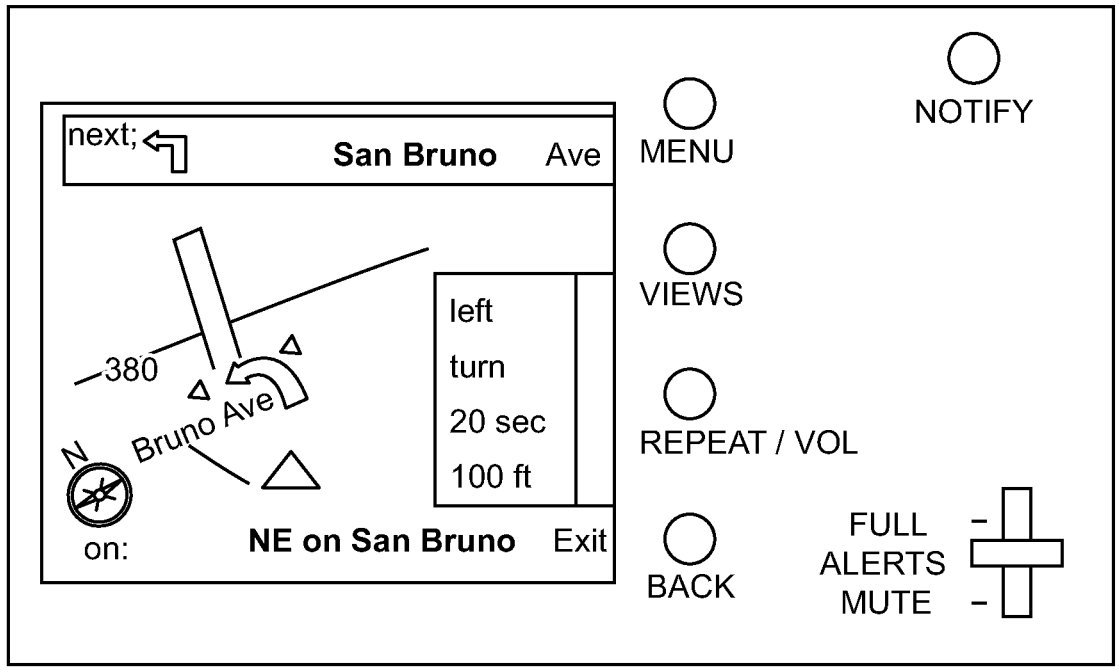
Figure 42:
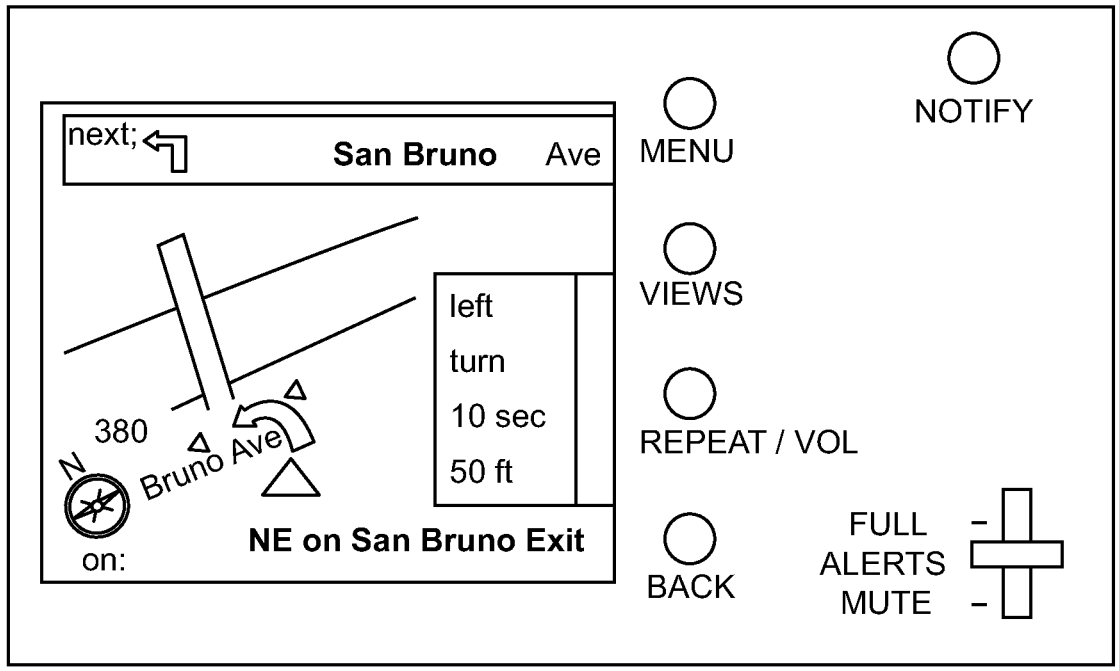
Figure 43:
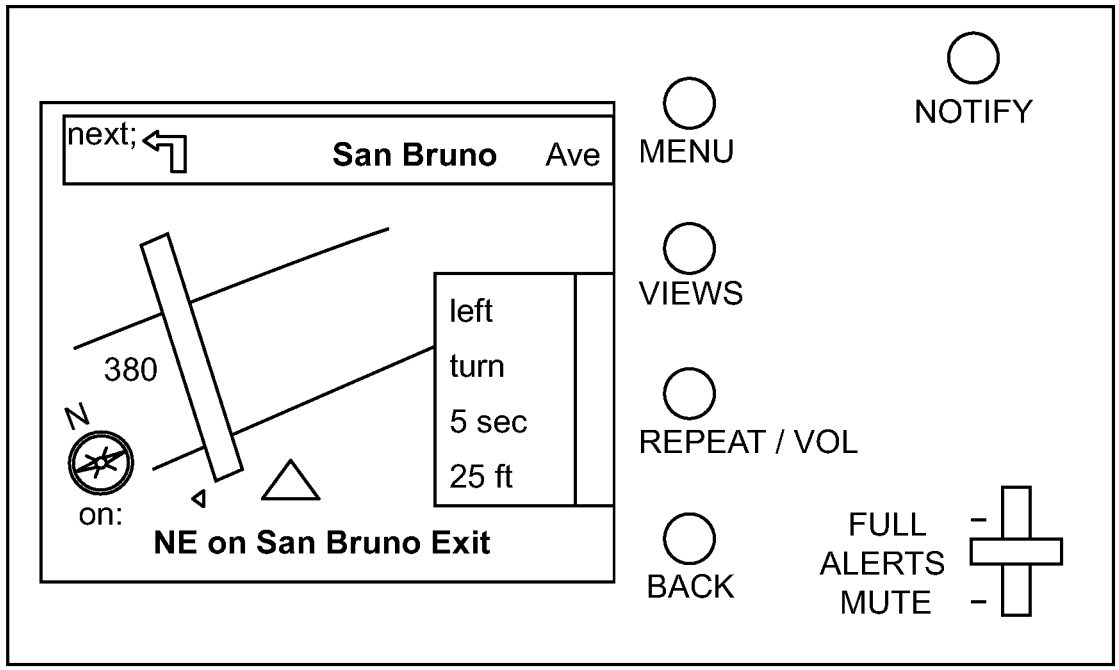
Figure 44:
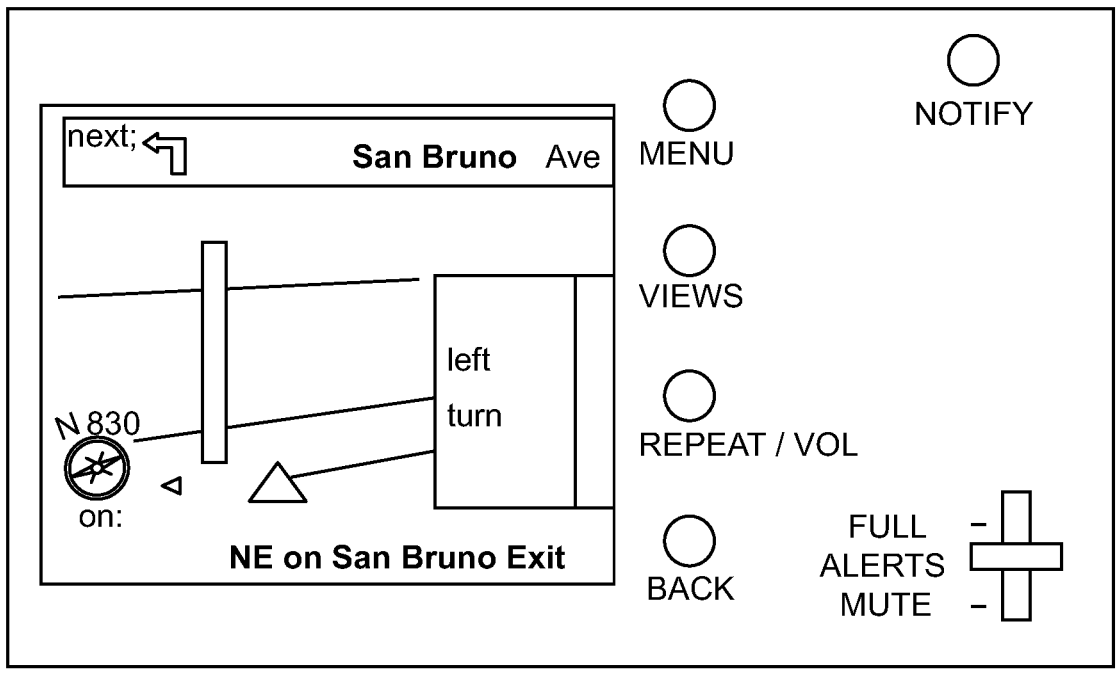
Figure 45:
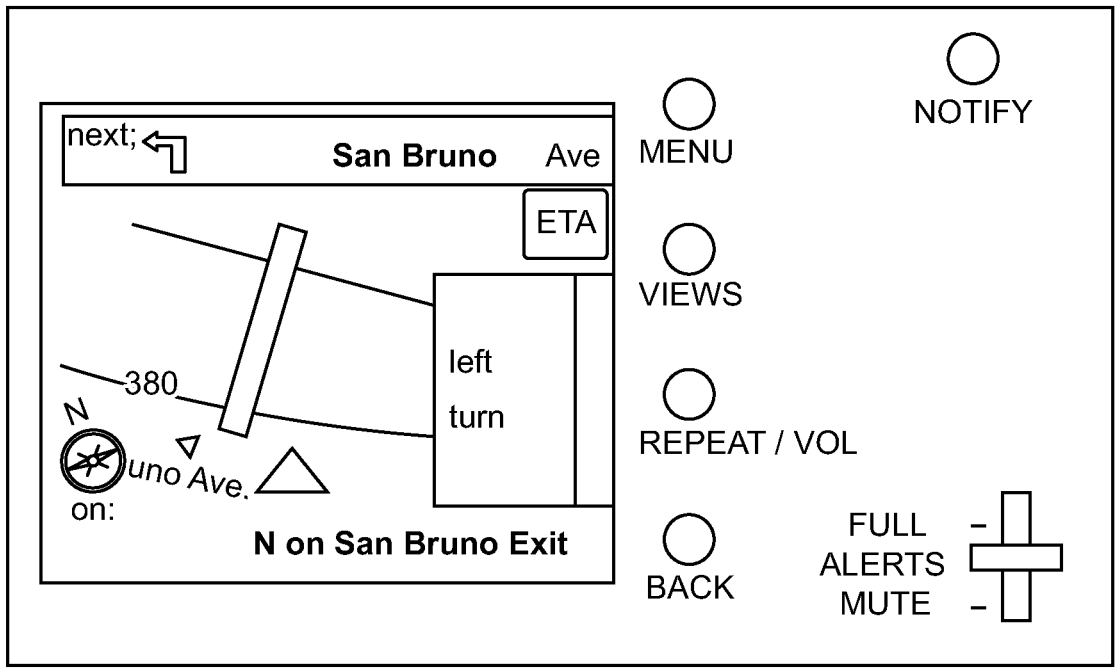
Figure 46:
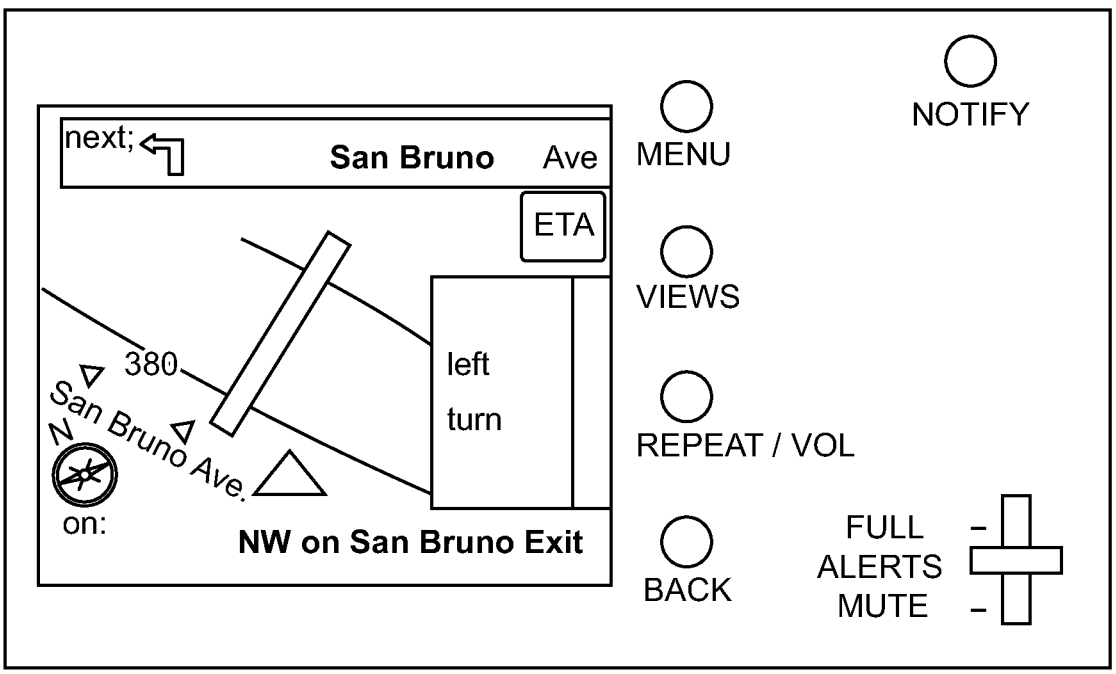
Figure 47:
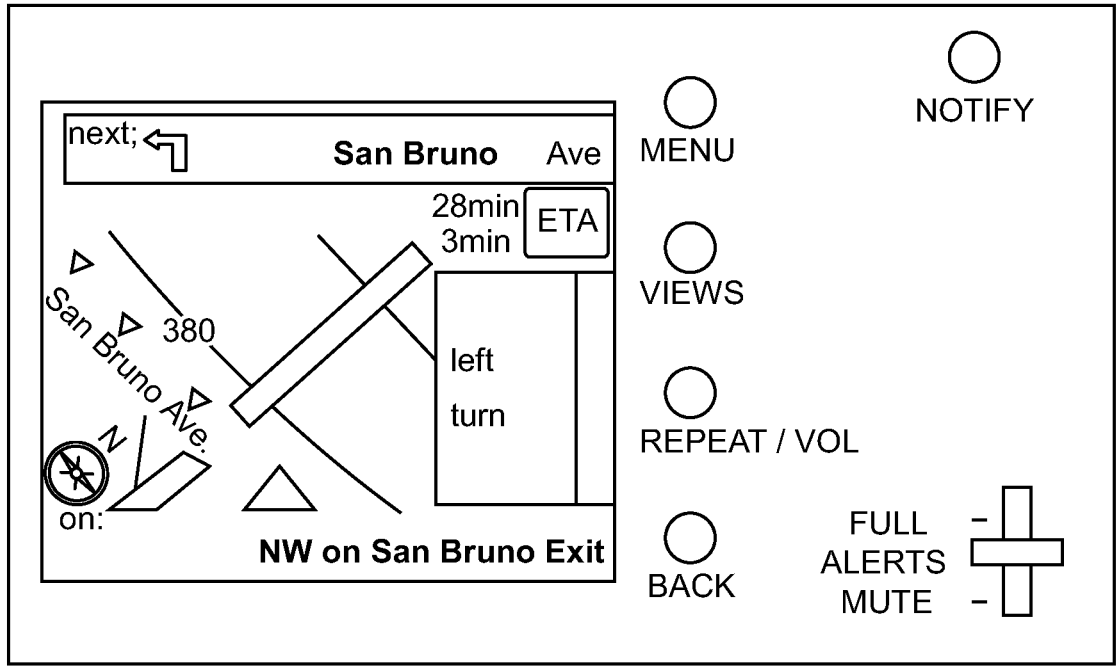
Figure 48:
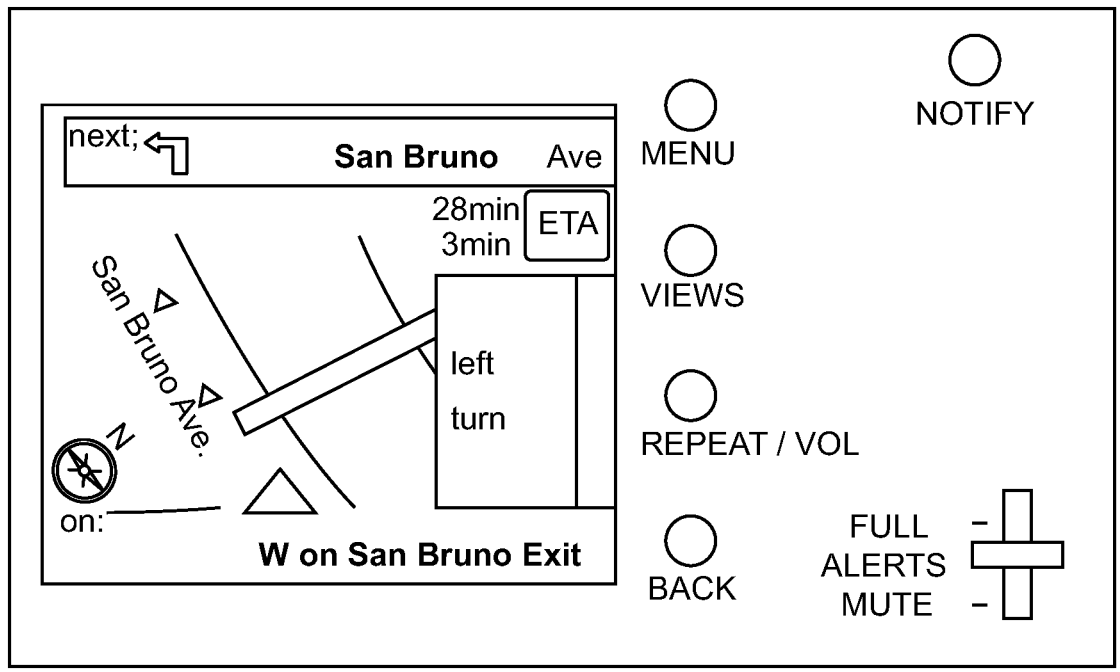
Figure 49:
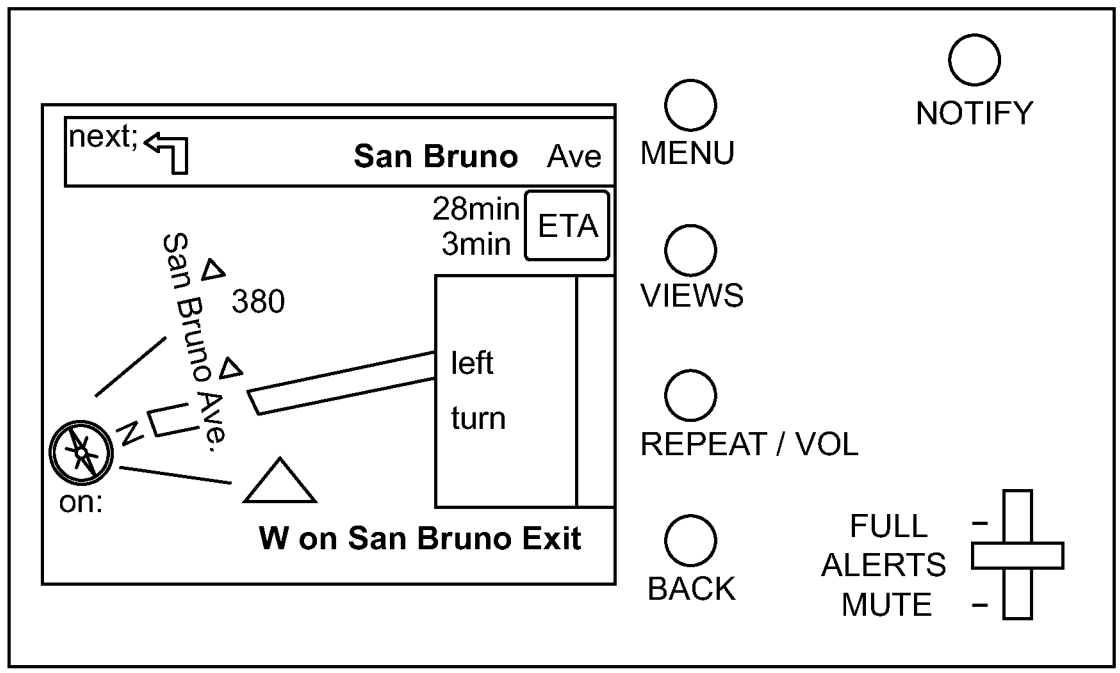
Figure 50:
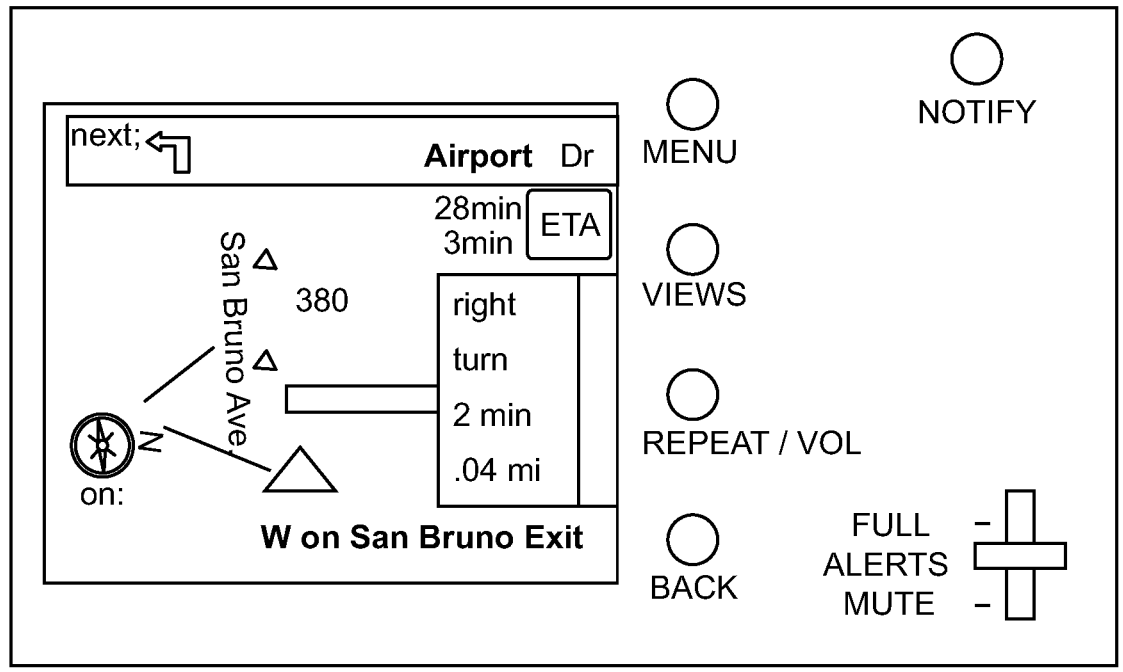
Figure 51:
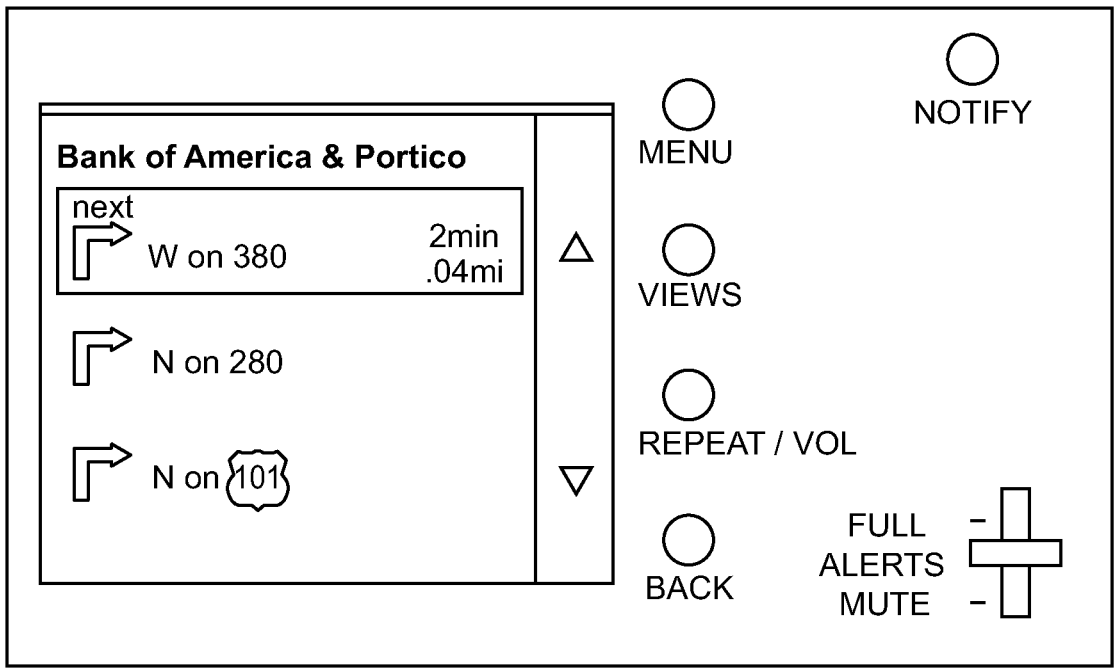
Figure 52:
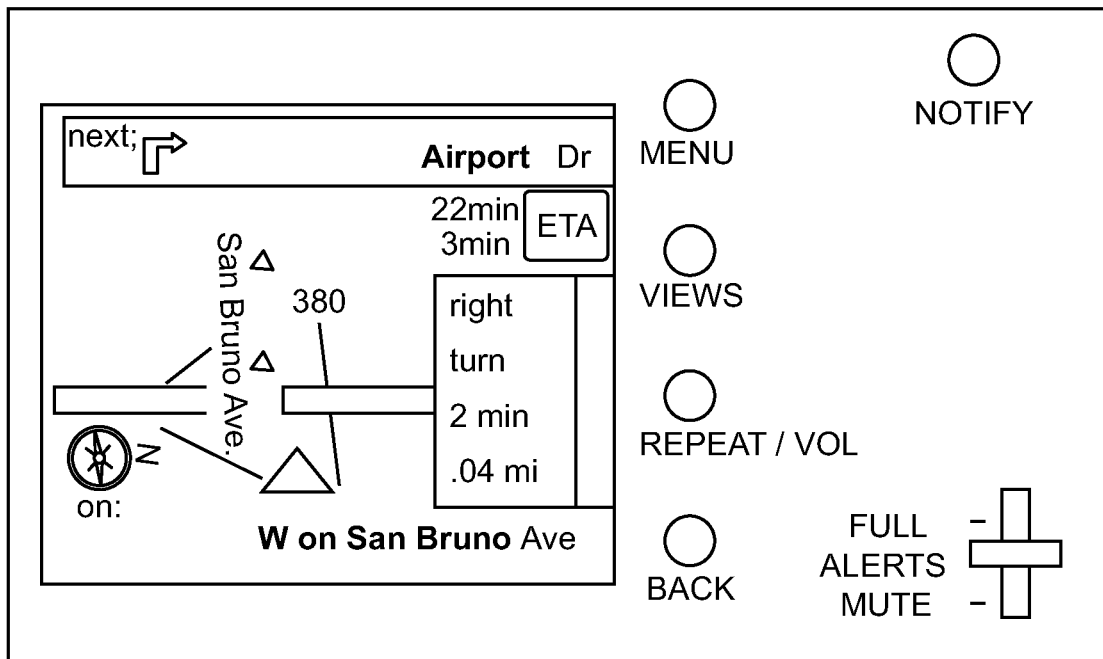

As Barry reaches the vicinity of San Francisco International Airport along Highway 101 in San Mateo County, the device provides him with an alert as shown in FIG. 36. This alert may be visual as shown in FIG. 36, auditory, or both. If the auditory control is set to "mute" the device will only show the visible alert. The alert notifies Barry that there is an area of slow traffic ahead of him on his route. It also provides an updated ETA based on information received via the communication network. The new ETA and distance are based on a suggested alternate route that is predicted to be faster than Barry's current route. Once he presses "OK" on the screen, the display shows a revised route, as shown in FIG. 37, that follows Interstate 380 to Interstate 280 north. Because Barry is not as familiar with the new route or the route necessary to reach the alternate freeways, he decides to switch the verbosity control to "Full." The device then provides turn-by-turn auditory prompts. Barry selects the green route that follows Interstates 380 and 280 by pressing the appropriate "turns" button on the screen as indicated in FIG. 38. The display then switches to a "cockpit-like view" that shows the route and upcoming turns form the driver's perspective as shown in FIG. 39 through FIG. 50. As indicated in FIG. 50, if Barry wishes to see a listing of the upcoming turns, he may press the "views" button to see a display such as that shown in FIG. 51. Pressing the "back" button brings him back to the previous screen (FIG. 52) which shows the driver's perspective for each required turn. Barry uses this screen to guide him to the previously selected ATM machine. Note that the device remembered his original destination and the selected stops and recalculated the appropriate routing based on traffic information, Barry's choice of new route, etc.

Figure 53:
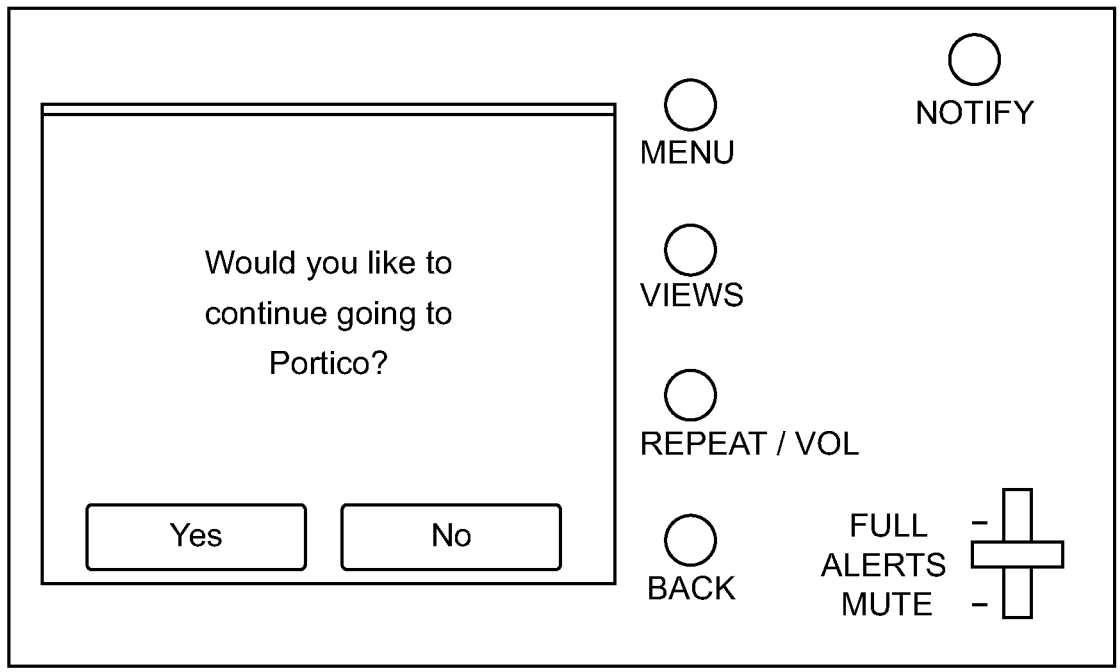
Figure 54:
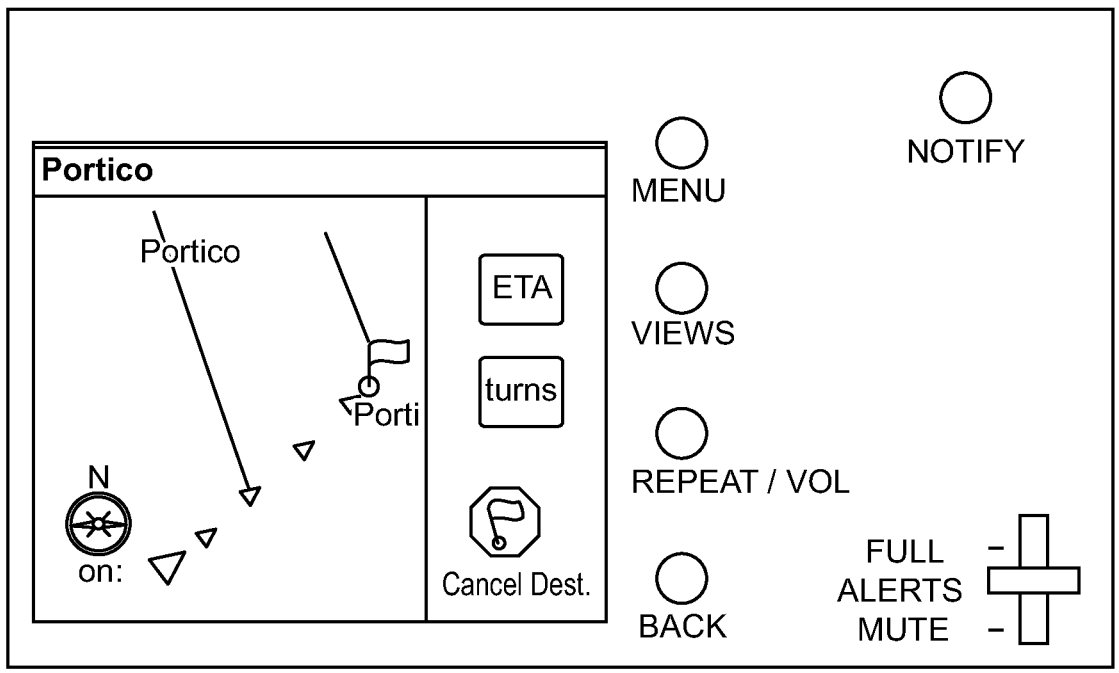

At approximately 6:55 PM, Barry reaches the ATM and completes his business there. As he resumes driving, the device inquires whether his plans remain the same—for example, does he still wish to proceed to the restaurant, as shown in FIG. 53. Once he selects "yes," the display reverts to a map showing possible routes to the restaurant as shown in FIG. 54. Because he is quite close to the destination, Barry follows the most direct route (indicated in green).

Figure 55:
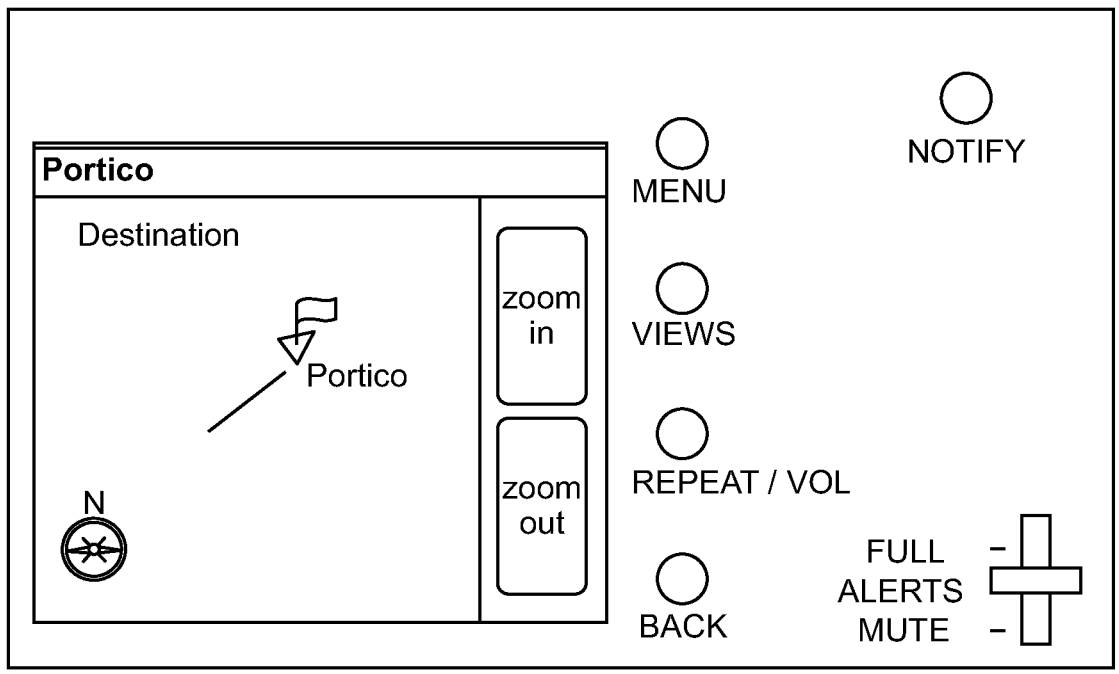
Figure 56:
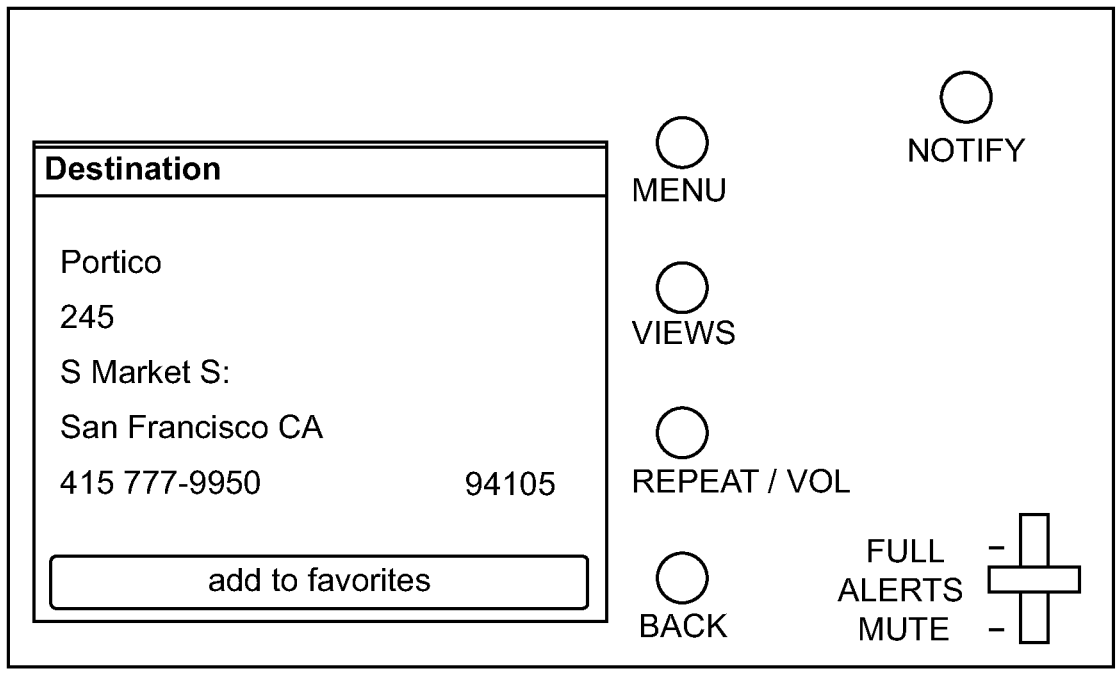
Figure 57:
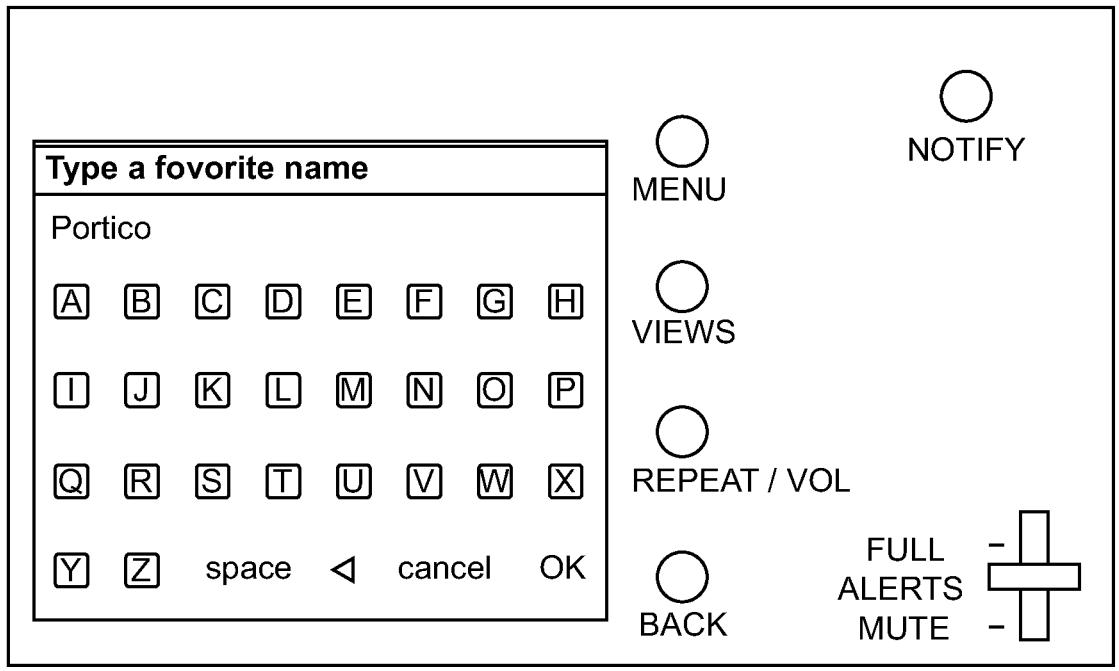
Figure 58:
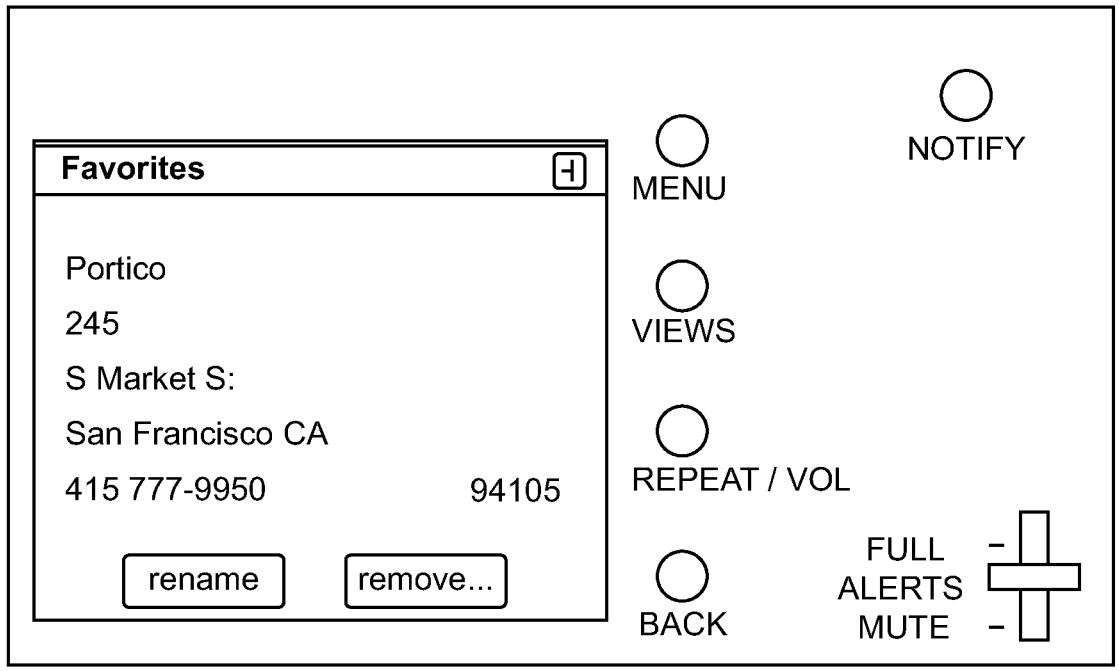

Once Barry reaches the restaurant, he decides to take a quick moment to add it to his favorites list since he enjoys eating there and may visit again soon. By pressing the "destination" field on the screen (shown in FIG. 55), Barry is shown details about the destination location as shown in FIG. 56. Pressing "add to favorites" yields a data input screen (FIG. 57) that includes a touch keypad for data entry. The name "Portico" may have been previously entered via the yellow pages or by Barry doing an earlier manual entry. Barry may now use the current name for his favorites (by selecting "OK") or assign a new one using the touch keypad. It should be noted by one of ordinary skill in the art that any type of data entry method or system, for example voice recognition, an external keypad, handwriting recognition, etc.) may be employed. Once Barry selects "OK" the name an location are entered as a favorite as shown in the confirmation screen in FIG. 58.

Figure 59:
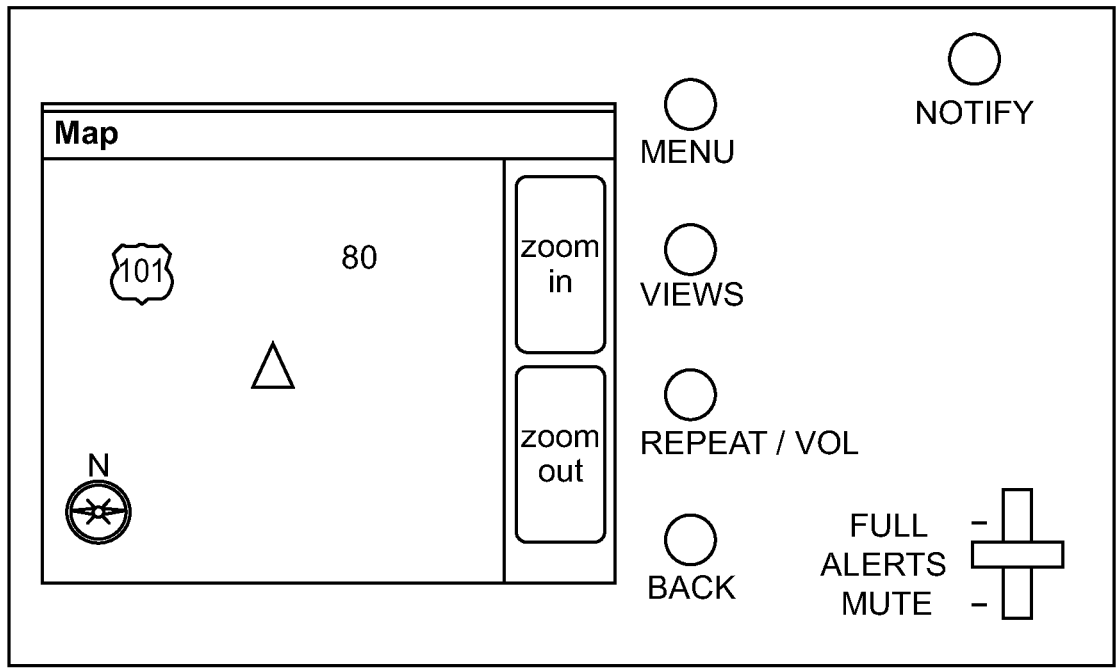
Figure 60:
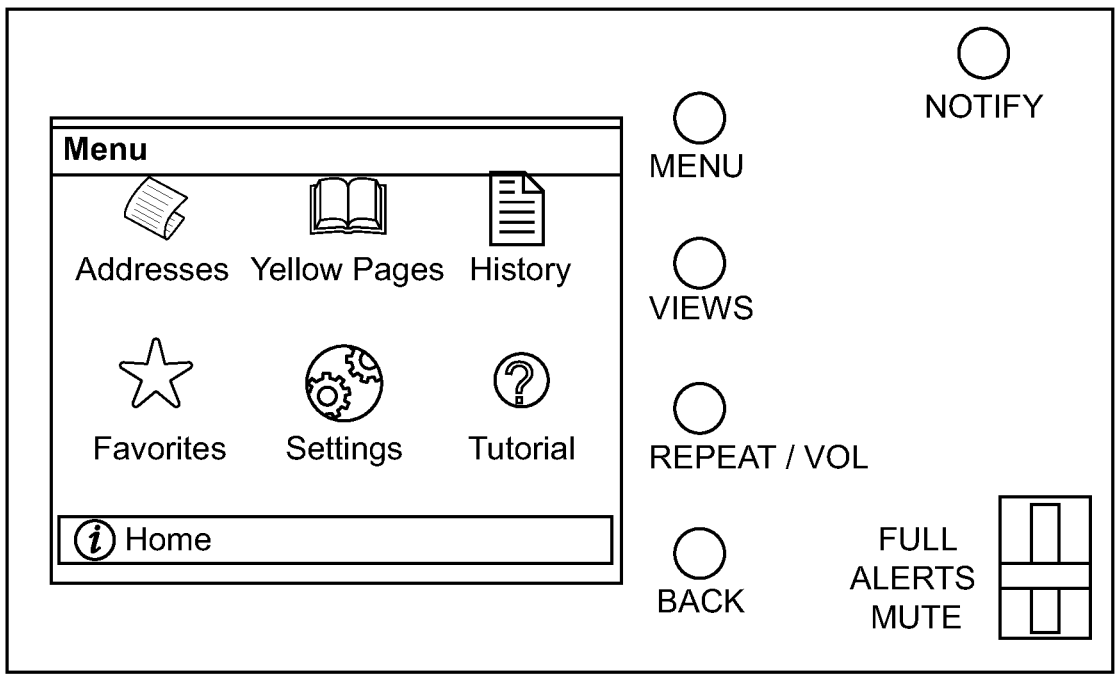
Figure 61:
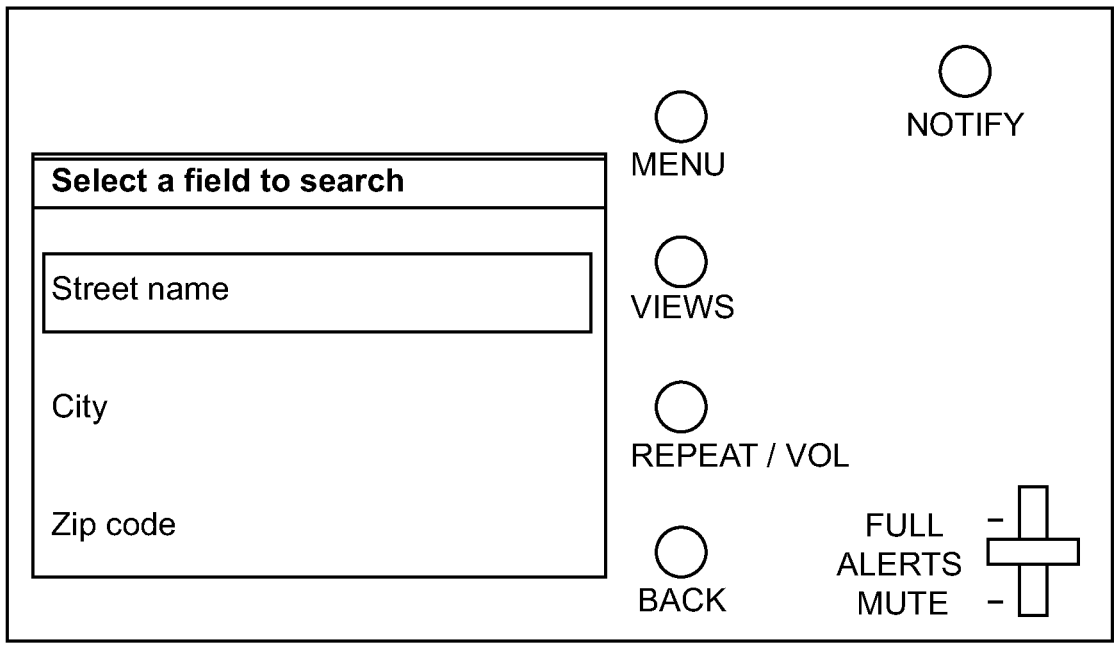
Figure 62:
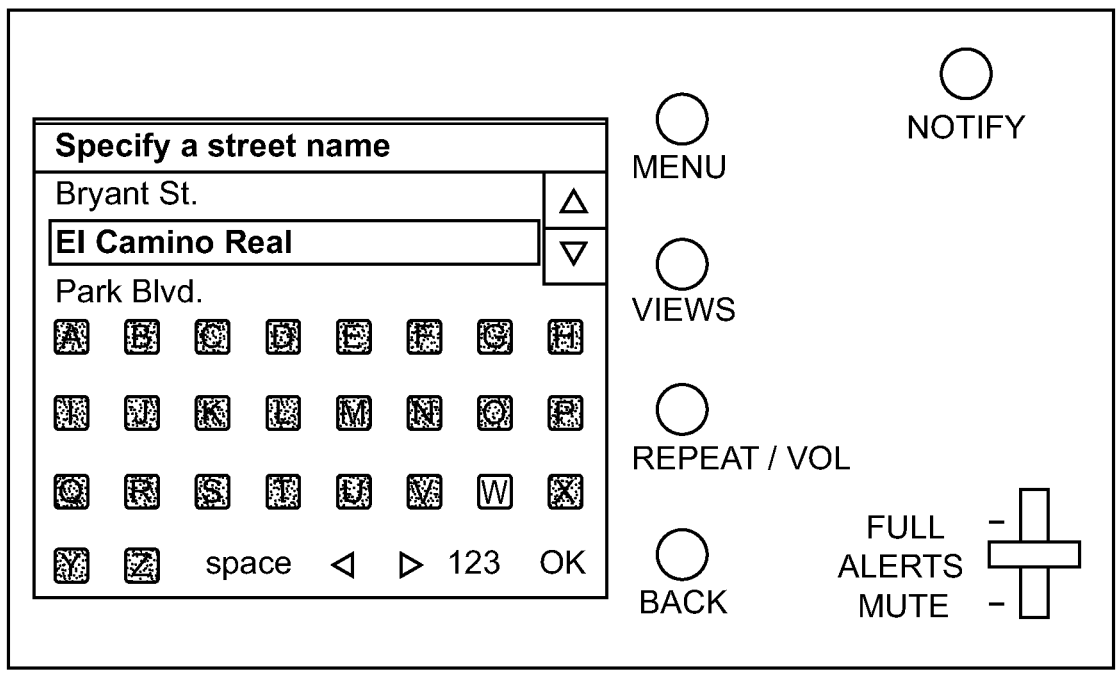
Figure 63:
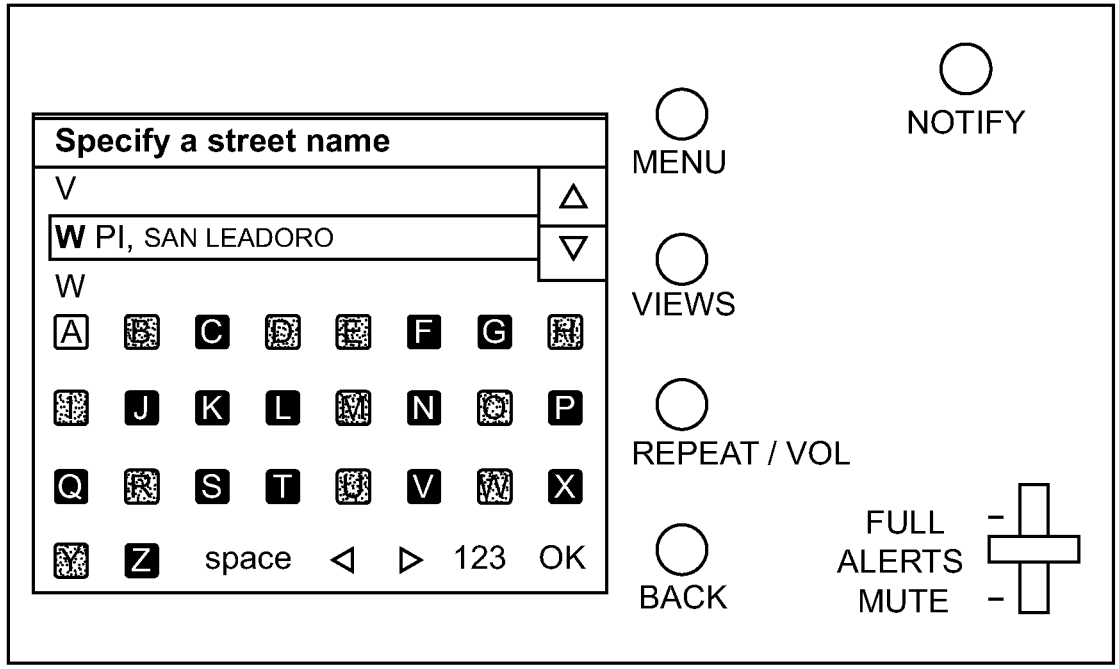
Figure 64:
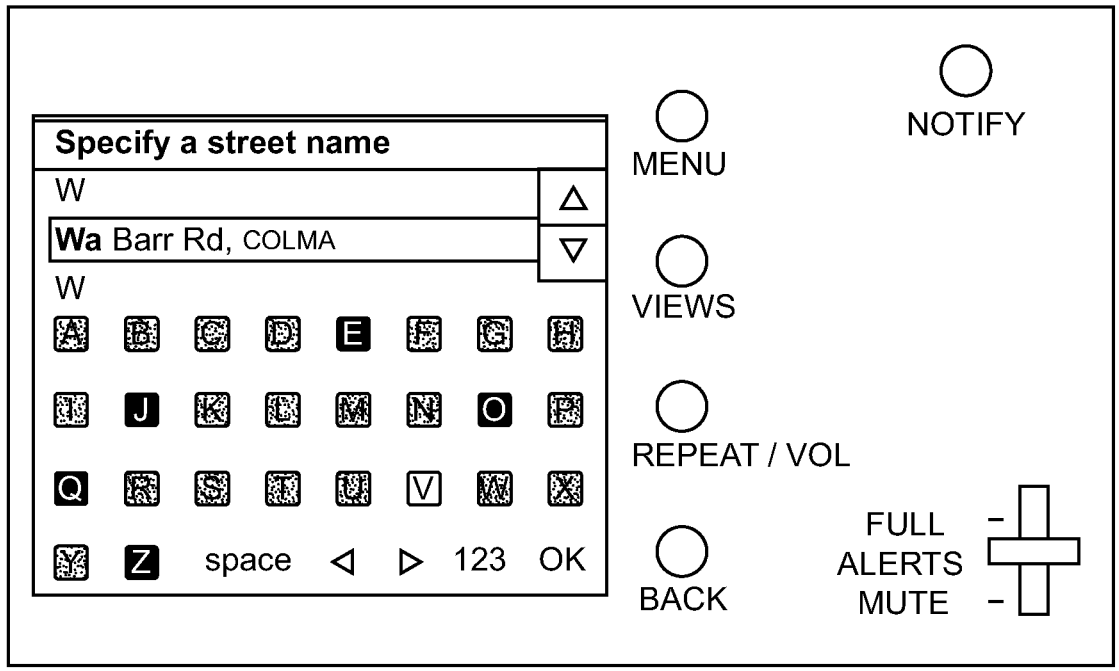
Figure 65:
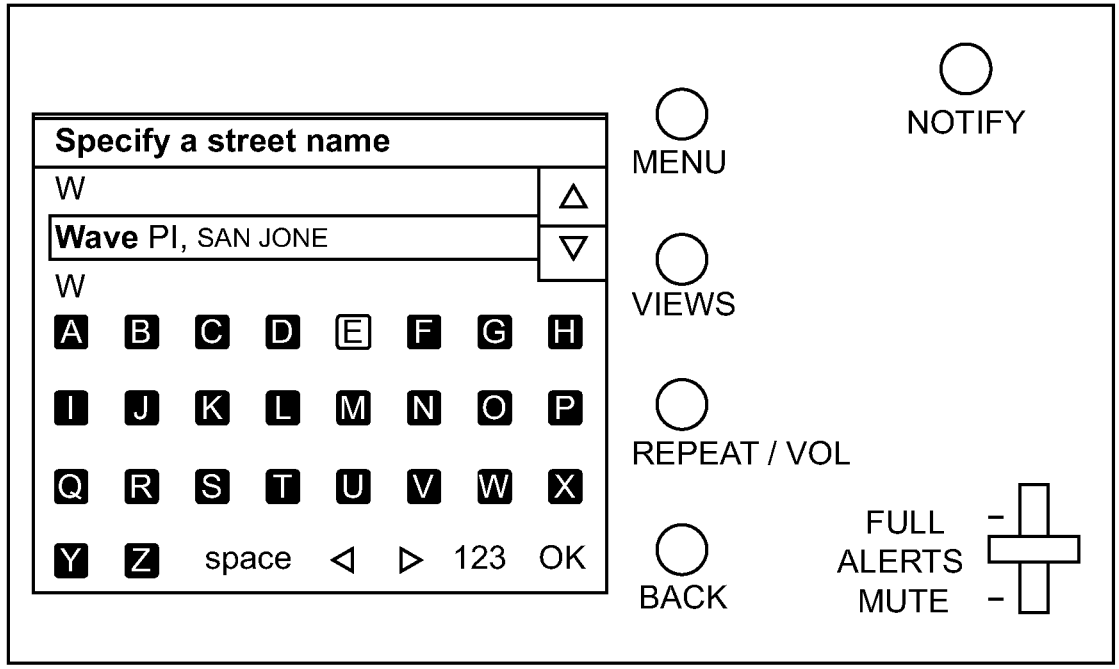
Figure 66:
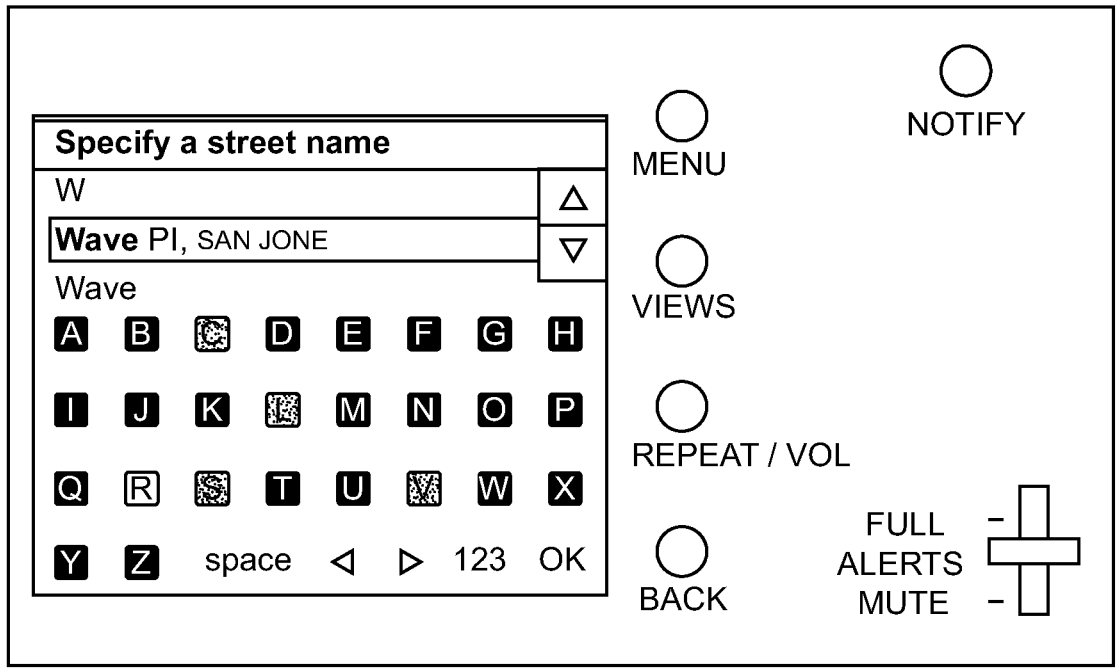
Figure 67:
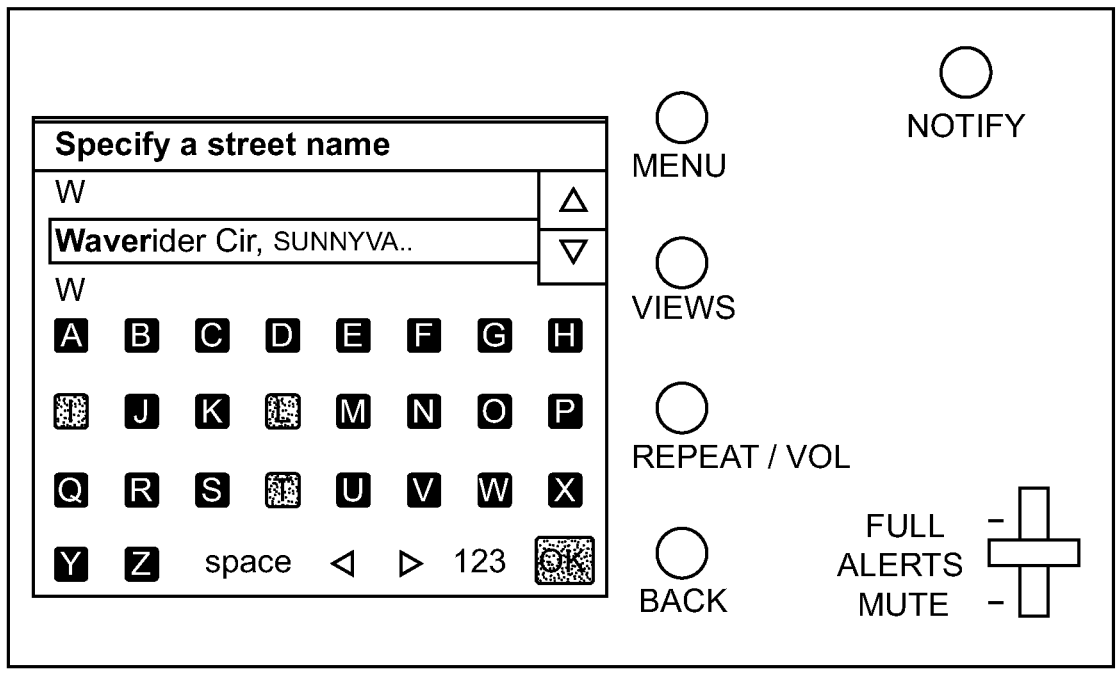
Figure 68:
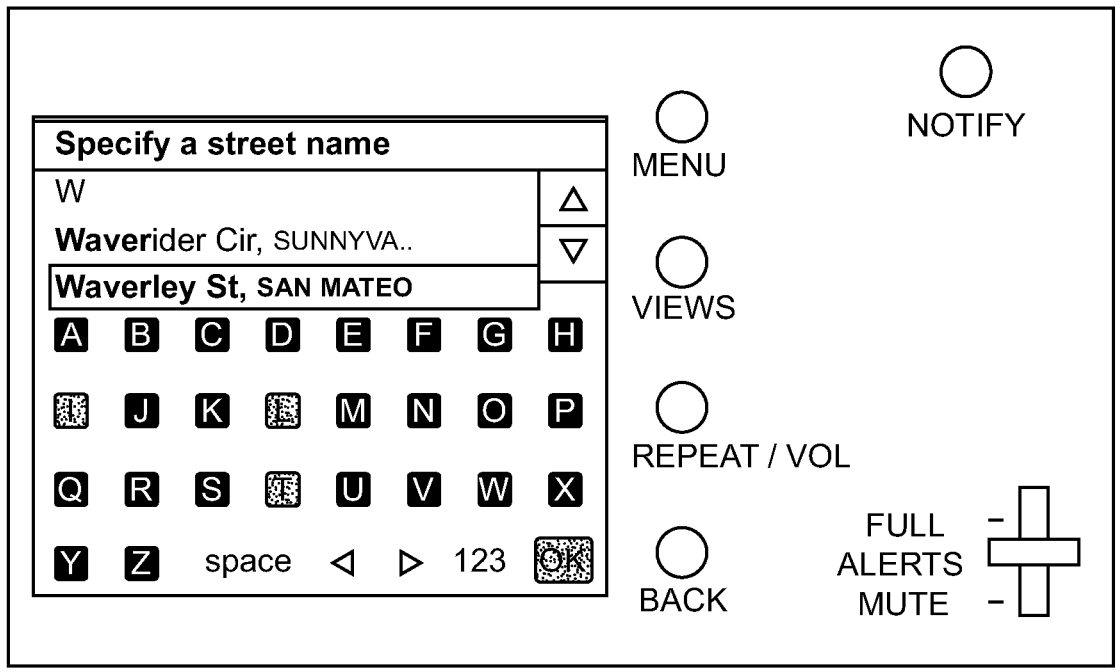
Figure 69:
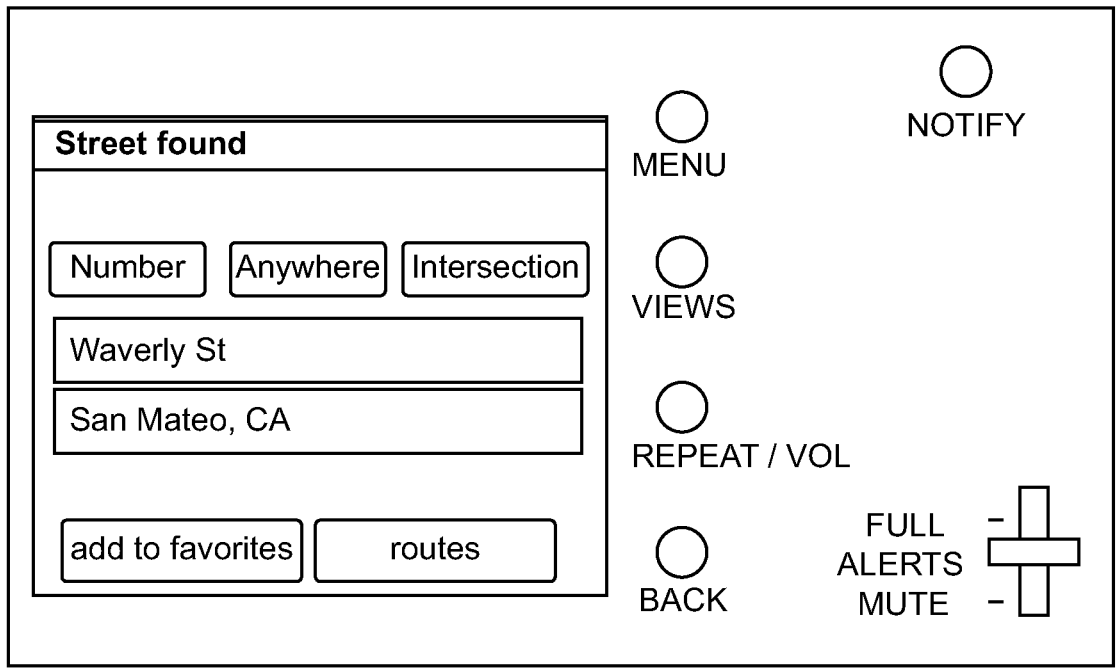

After dinner at approximately 8:45 PM, Barry and his client complete their dinner. Barry offers to give the client a ride to his home in San Mateo (south of San Francisco) to find the quickest route to this unfamiliar destination, Barry selects the menu button as shown in FIG. 59. The client tells Barry his address, so Barry selects "addresses" to allow manual entry of the destination address in FIG. 60. Note that in FIG. 60, the device has recognized that it is late in the evening and has therefore suggested "home" as a possible destination. Pressing "address" in FIG. 60 yields the screen shown in FIG. 61 that gives Barry options for how to enter the address. He decides to begin by entering the street name. As a shortcut, the device may default to entry of the last address entered in this manner, for example "El Camino Real" as shown in FIG. 62. The client lives on Waverley Street in San Mateo, so Barry presses the "W." The device quickly scans its database for all possible streets beginning with a "W" and then highlights only those letter options that are compatible with that subset of street names as shown in FIG. 63. After Barry enters "A," the screen highlights only those letters that would appropriately follow "WA" for streets in the database as shown in FIG. 64. This continues as shown in FIG. 65 after Barry enters "V," FIG. 66 after he enters "E," and then FIG. 67 after he enters "R." Upon entering the "R," the list of available streets is narrowed sufficiently that "Waverley St" is shown in the list at the top of the screen. If Barry had so chosen, he could have used the up or down arrow keys shown in FIG. 62 through FIG. 67 to find Waverley Street at any point at which he felt that the list was sufficiently narrowed to make that option quicker than keyed entry of the name. After Barry selects "Waverley St" from the list as shown in FIG. 68, the display allows him to select "number" entry in FIG. 69. Note that in FIG. 68 the device has already filled in "San Mateo" based on the selection of Waverley St."

Figure 70:
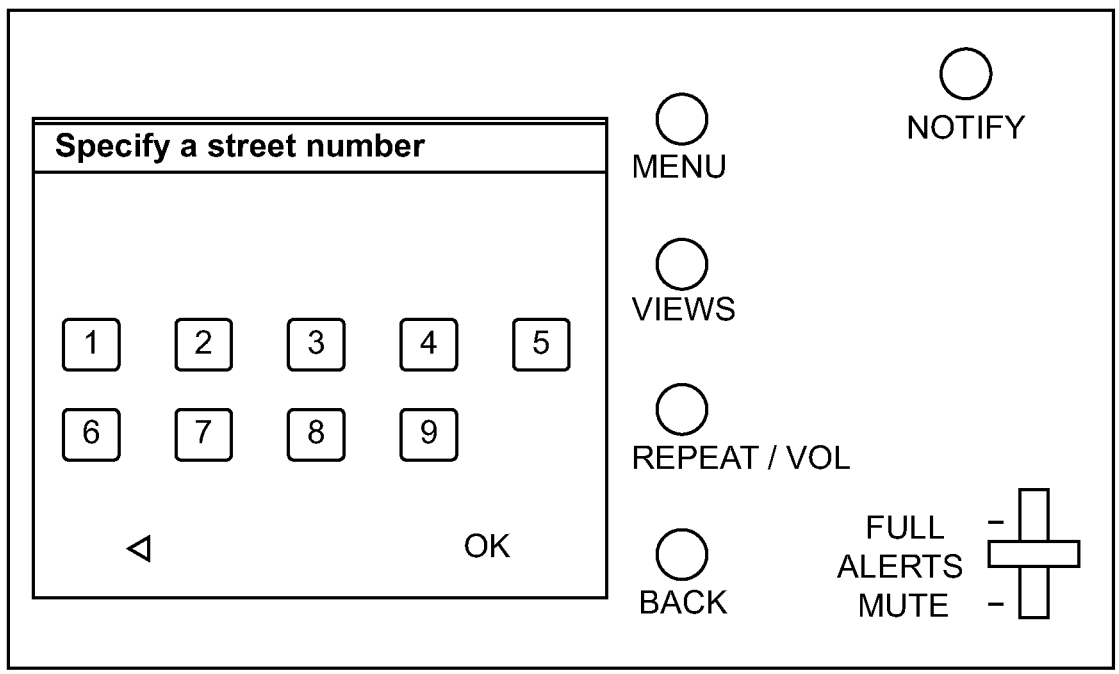
Figure 71:
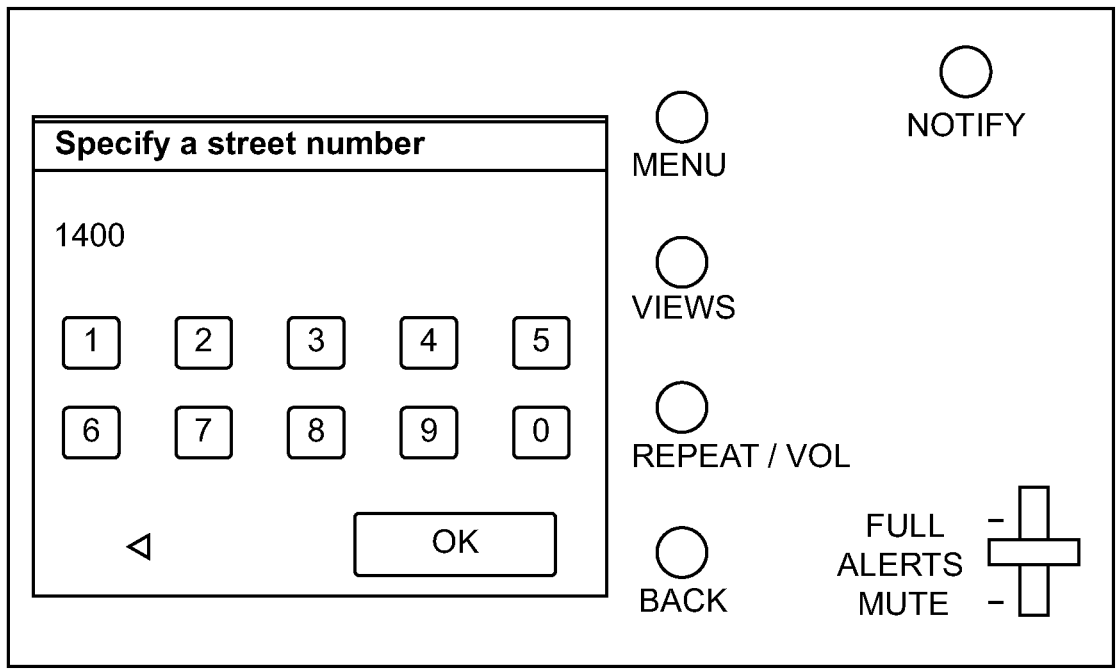
Figure 72:
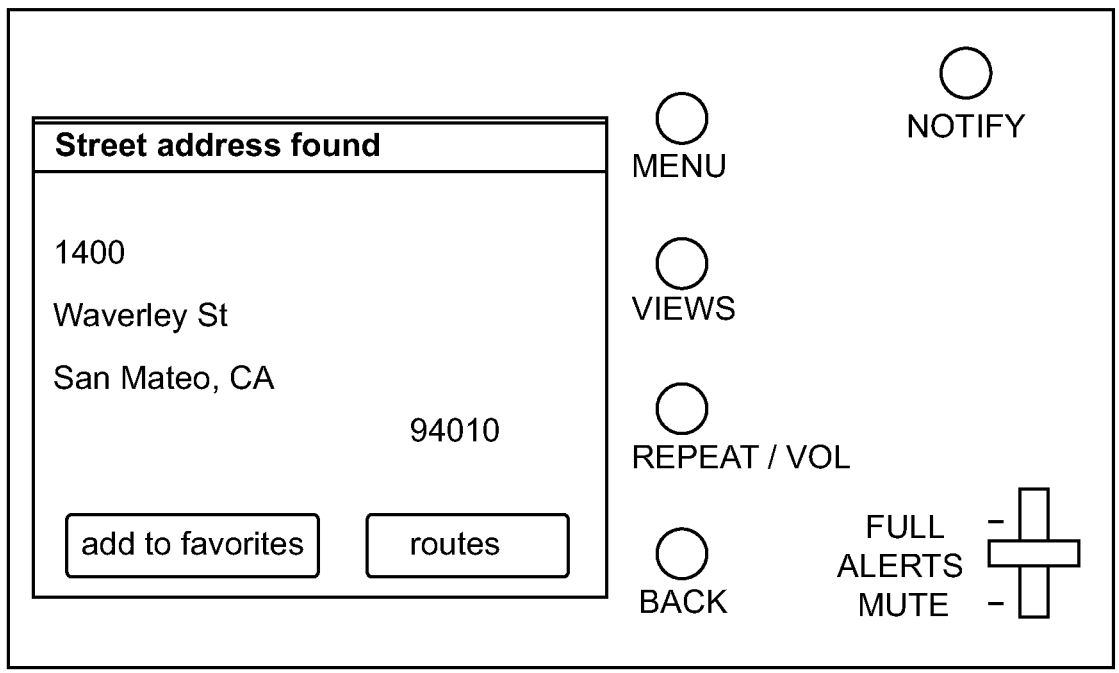
Figure 73:
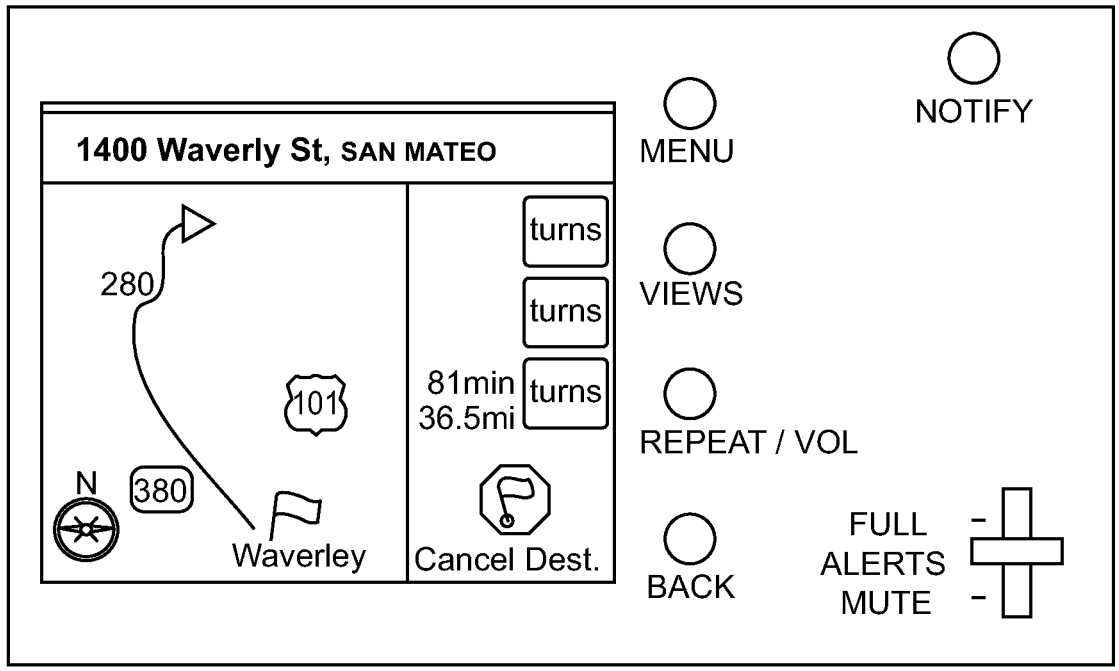

A touch sensitive number pad is then shown as in FIG. 70. Again, the touch sensitive screen is only one of many possible embodiments for the data entry portion of the present invention. Other options, such as those previously discussed, may be used. As with the street name, the device may access its database to determine available street numbers and thereby highlight only the keys corresponding to numbers that are possible based on the already entered information. After Barry enters "1400," he selects "OK" as shown in FIG. 71. With the complete address entered as shown in FIG. 72, Barry may choose to add the address to his favorites or to proceed to routes. He selects "routes" and the device displays a map showing suggested routes between his present location (the restaurant) and the client's house (FIG. 73). As before, the routes are color coded to provide information regarding estimated travel time and distance for each route.

Figure 74:
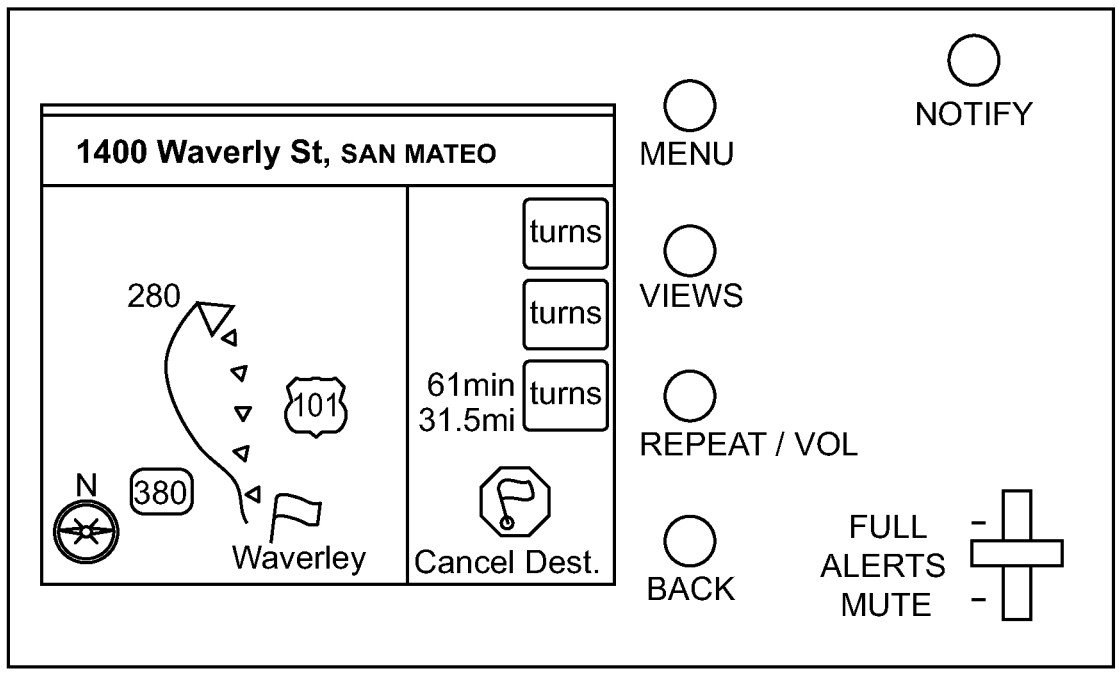
Figure 75:
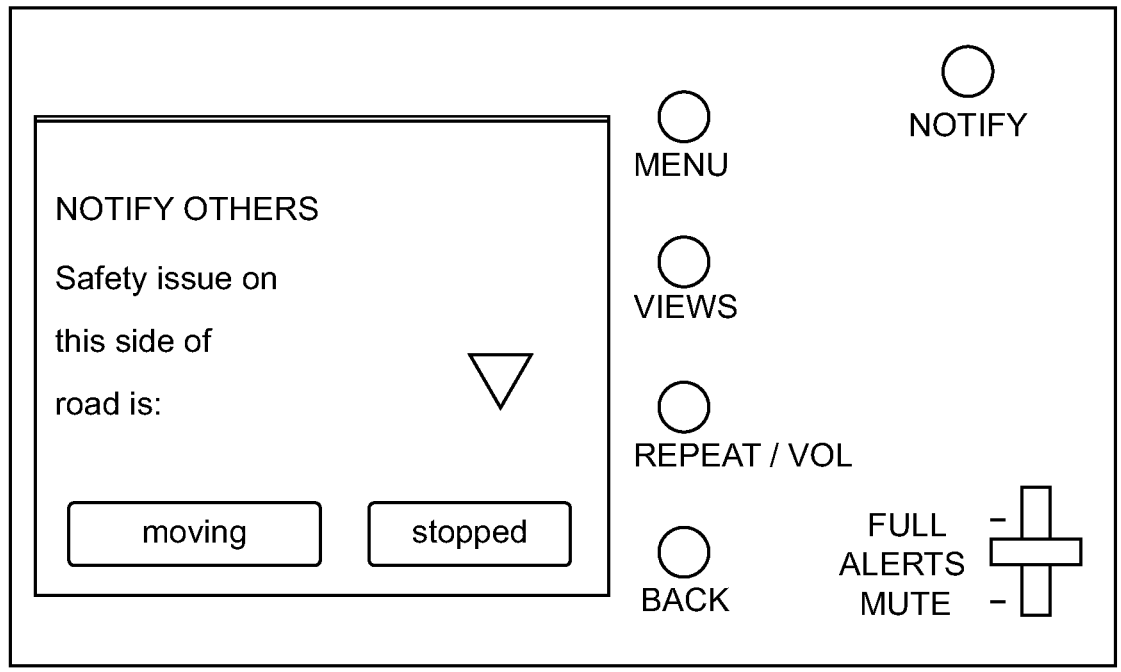
Figure 76:
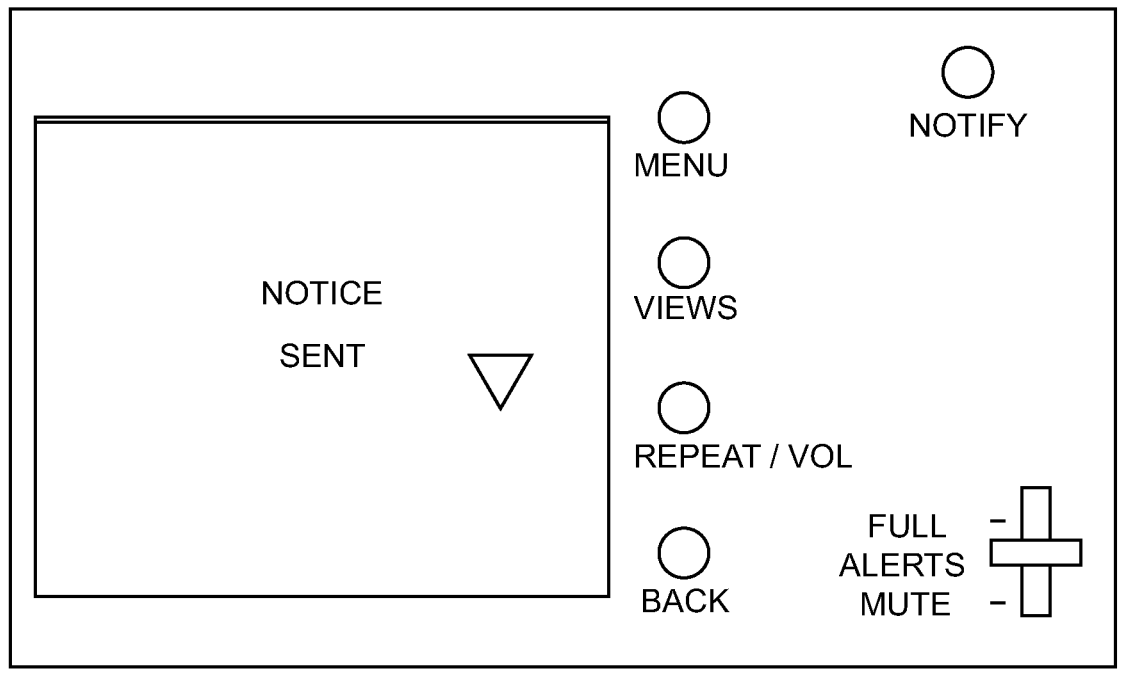

As Barry proceeds southbound on Highway 101 (the green route in FIG. 74), he notices a potential safety issue. To notify other users communicating via the communication network, he presses the "notify" button. As shown in FIG. 75, the device responds by inquiring whether the safety issue is moving or stopped. In the embodiment pictured in FIG. 75, the device assumes that the safety issue is on the same side of the road that Barry's vehicle is traveling. Alternatively, the device could provide a prompt asking whether the safety issue was on this or the opposite side of the road. After Barry presses the "moving" field, the display confirms that a notice has been sent as shown in FIG. 76. As noted above, safety issues may include erratically moving vehicles, law enforcement or emergency vehicles moving with traffic, and the like. Stopped safety issues may include stationary law enforcement or other emergency vehicles, vehicle accidents, debris in or near the roadway, an animal or animals in or near the roadway, or any other occurrence that might merit more cautious driving and/or a slower speed than normal.

Figure 77:
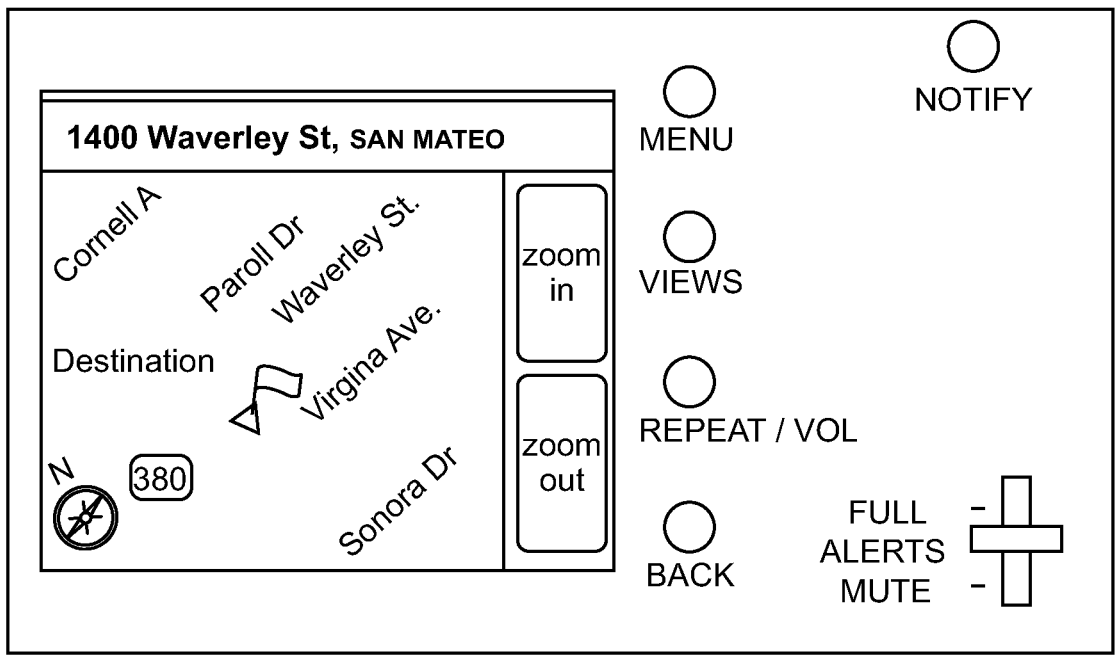
Figure 78:
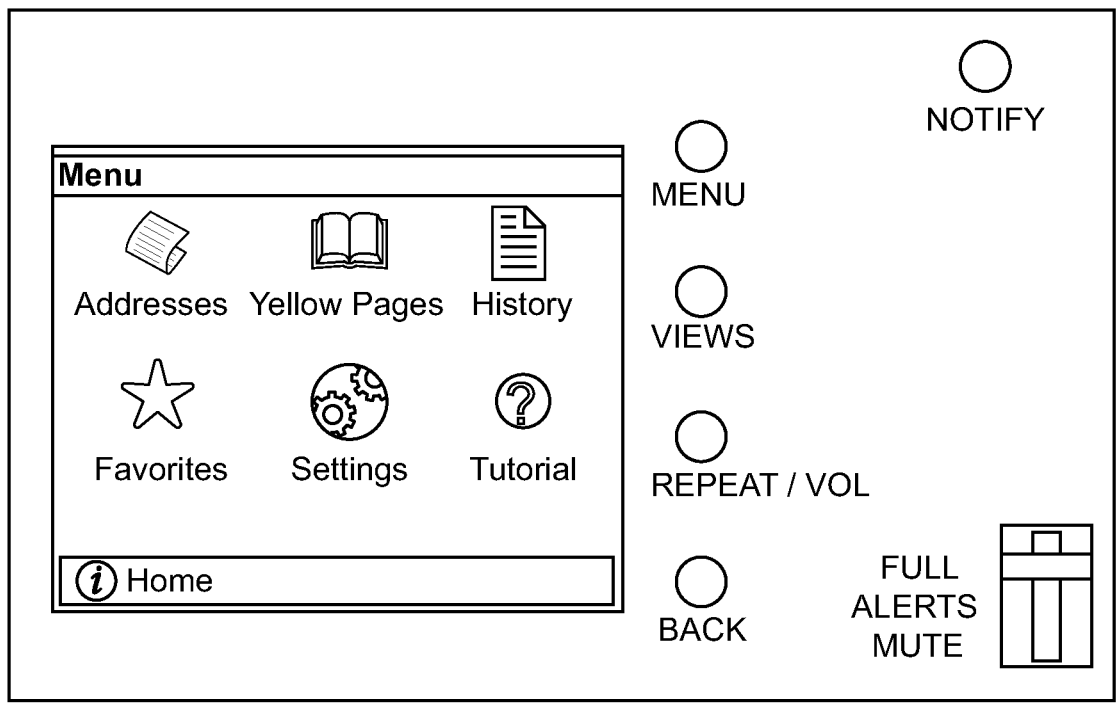
Figure 79:
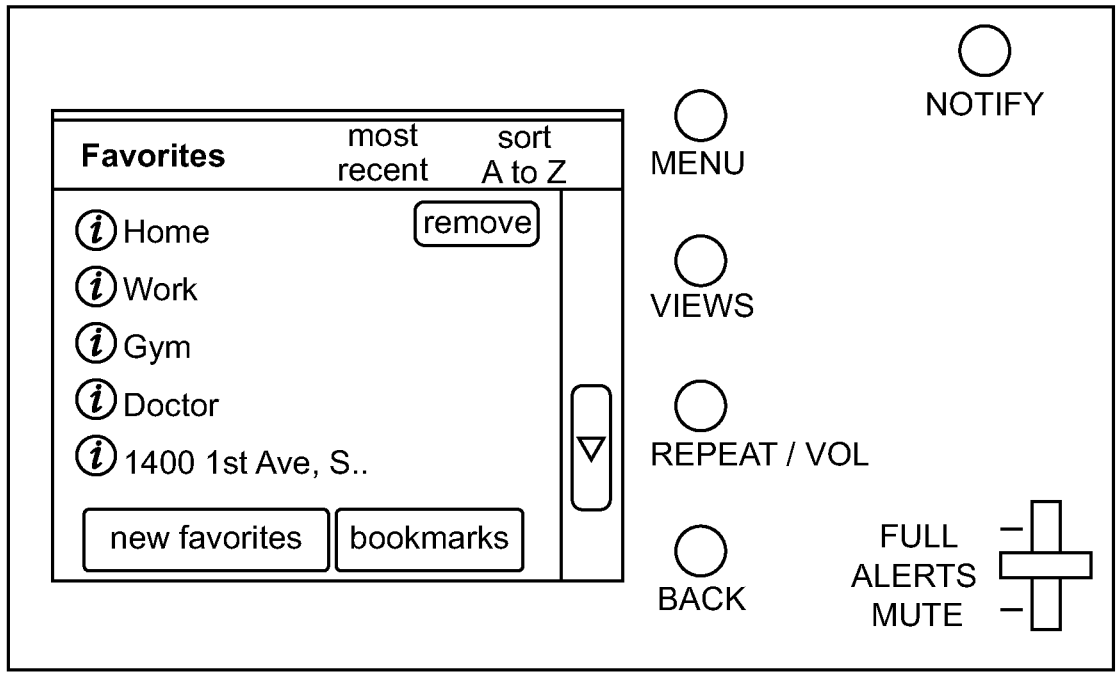
Figure 80:
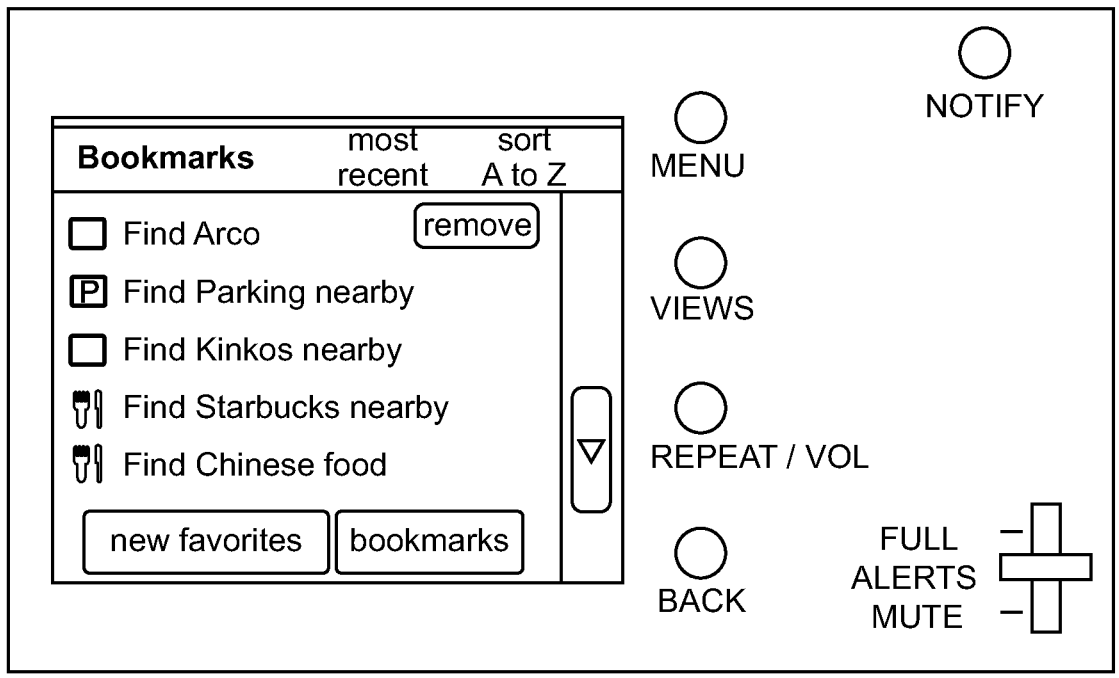
Figure 81:
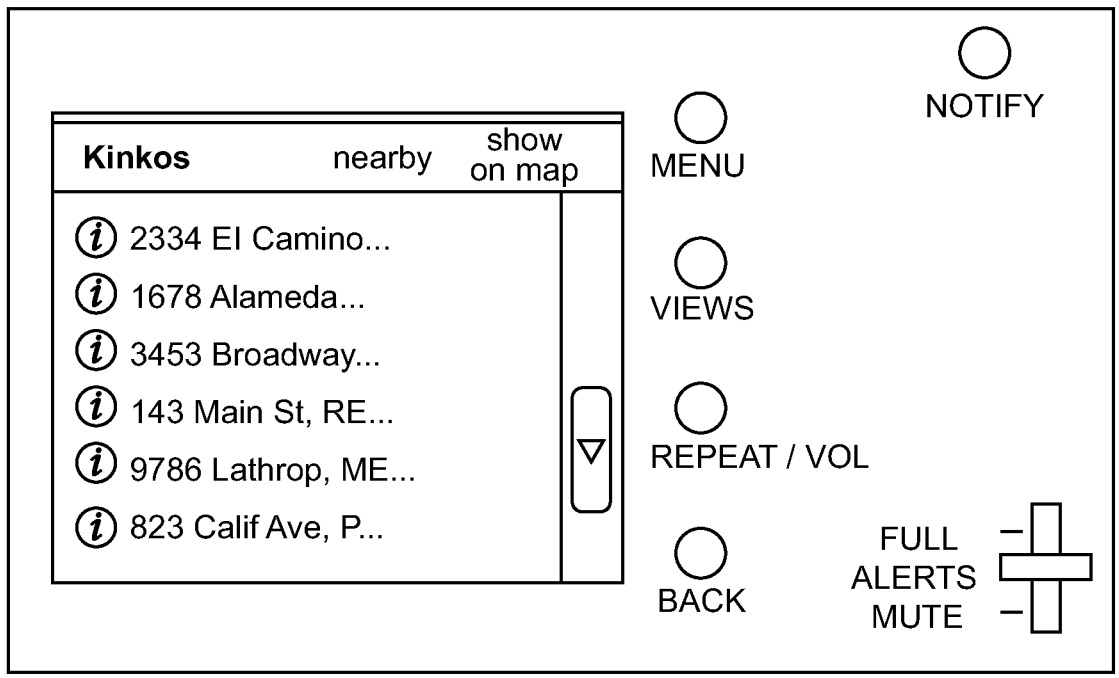

After Barry drops his client off, he decides to stop by a copy store (in this example a Kinkos™ store) to complete a presentation on which he had been working. To find a nearby store, Barry presses the "menu" button as shown in FIG. 77. As usual, this action presents the menu screen as shown in FIG. 78. Because Barry often makes stops at Kinkos™ stores when he is on the road, he has previously saved this as a saved search on the device. Saved searches may be accessed from either the "yellow pages" or the "favorites" screens. Barry selects "favorites," yielding the screen shown in FIG. 79. On the favorites screen, Barry selects "bookmarks" using the appropriate field. This displays the bookmarks screen as shown in FIG. 80. This is a list of Barry's previously saved searches. After Barry selects "Find Kinkos™ Nearby" the screen displays a list of matching locations (FIG. 81) based on the parameters Barry had previously entered and saved. Barry selects the closest location by clicking on its field as shown in FIG. 81. The device then displays a map illustrating the suggested routes between Barry's current location and the selected destination. Barry may follow these directions in one of the manners described above.

Figure 83:
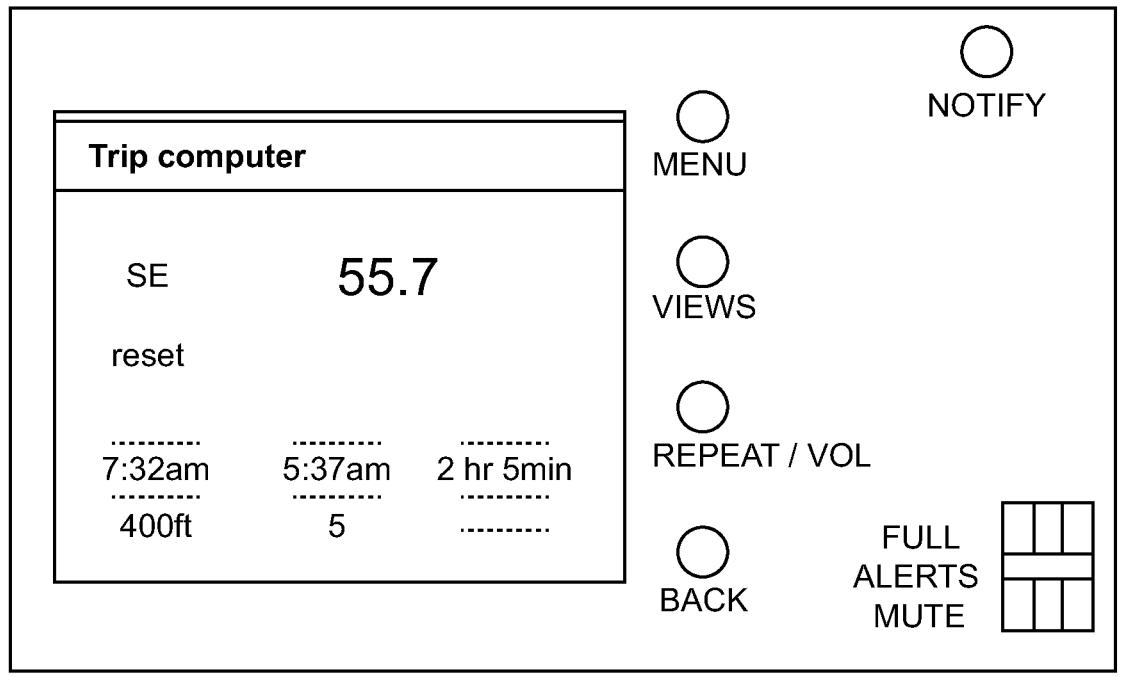
Figure 84:
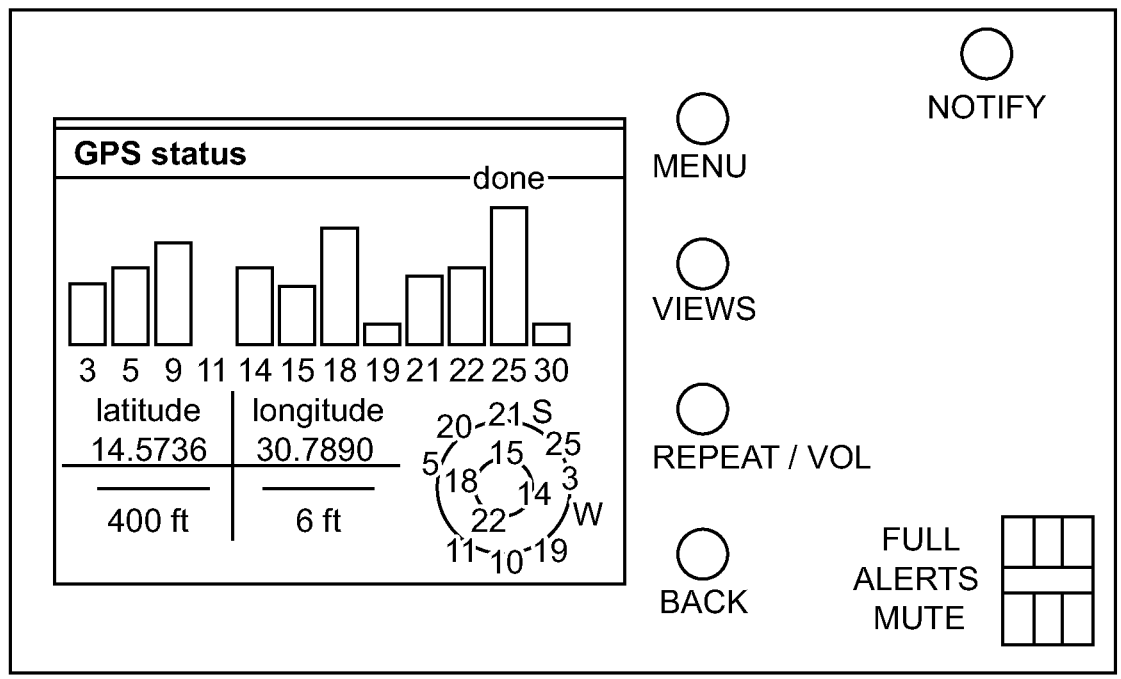
Figure 85A:
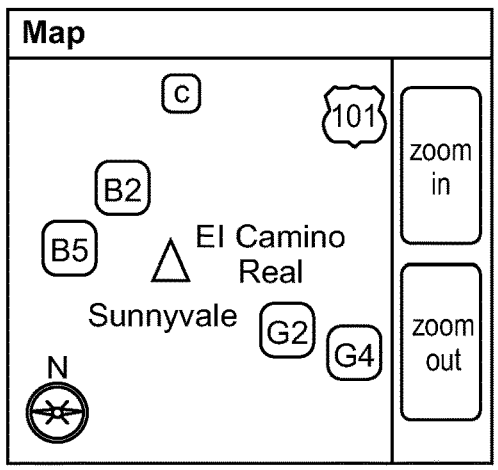
FIG. 85a to FIG. 85e are screen shots showing different map views of various embodiments of the present invention.
Figure 85B:
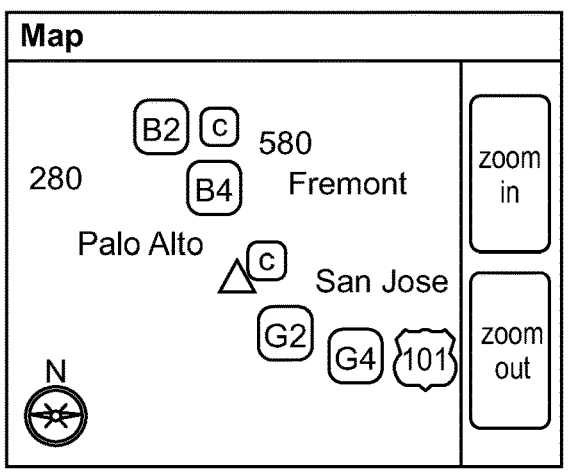
Figure 85C:
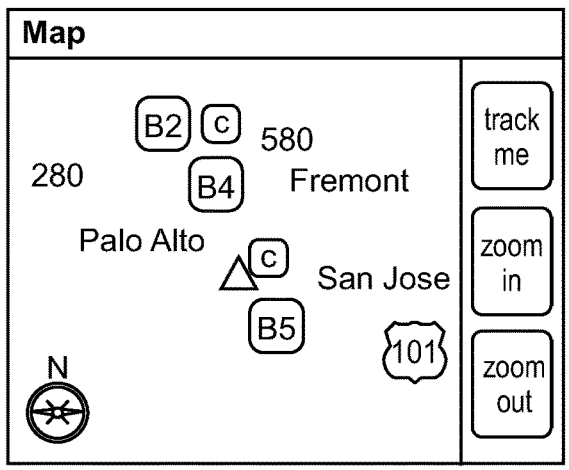
Figure 85D:
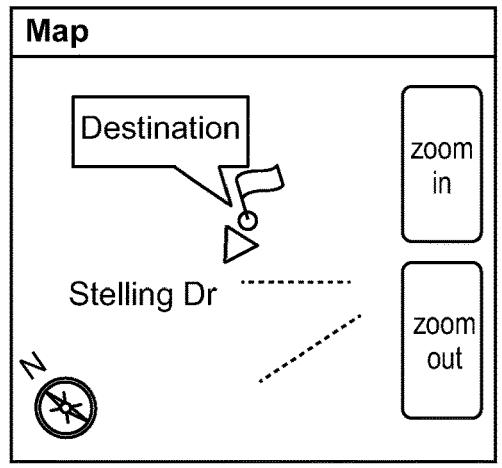
Figure 85E:
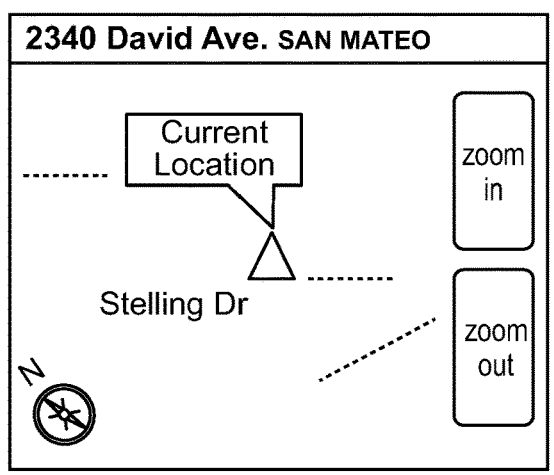
Figure 86A:
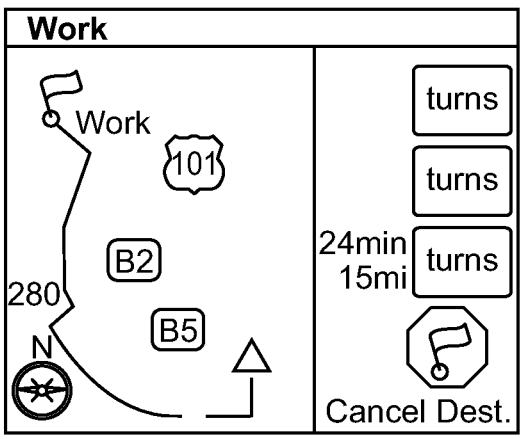
FIG. 86a to FIG. 86h are screen shots showing different route overview screen displays of various embodiments of the present invention.
Figure 86E:
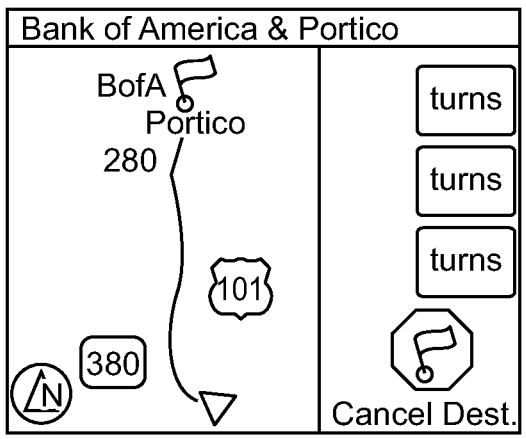
Figure 86B:
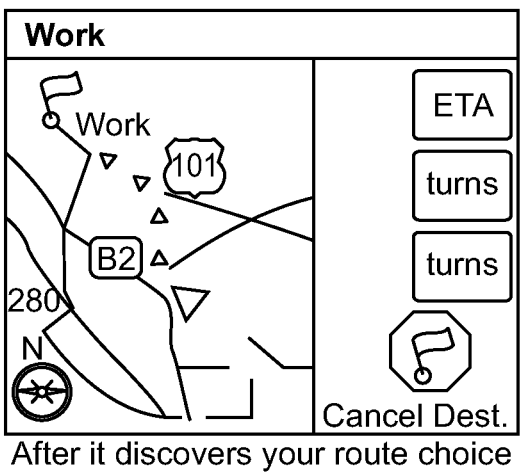
Figure 86C:
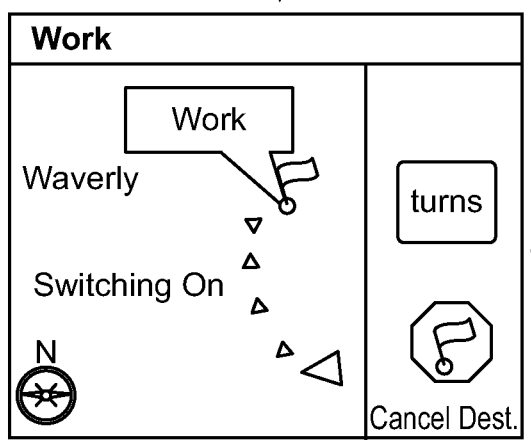
Figure 86D:
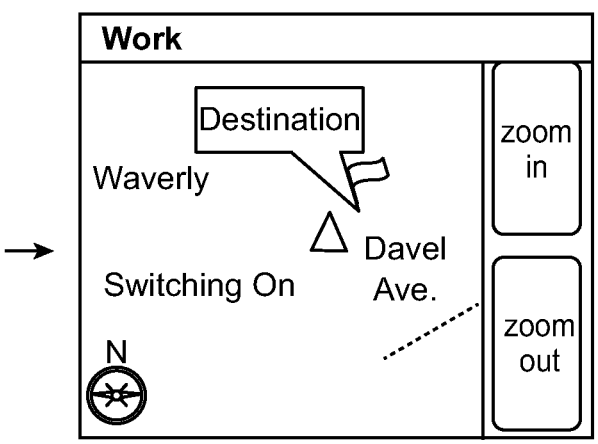
Figure 86F:
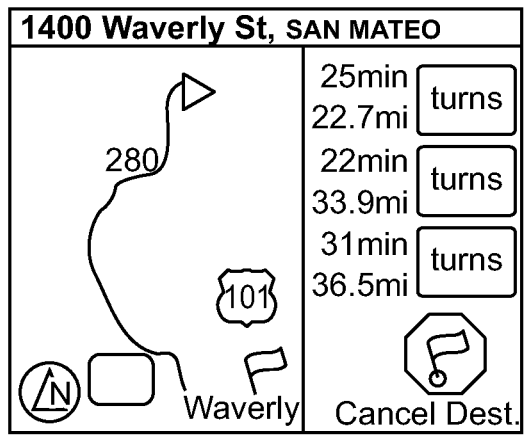
Figure 86G:
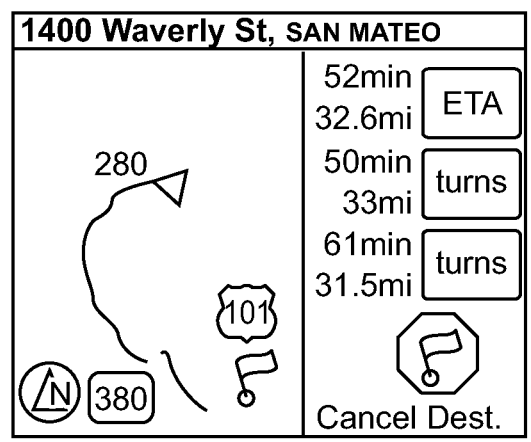
Figure 86H:
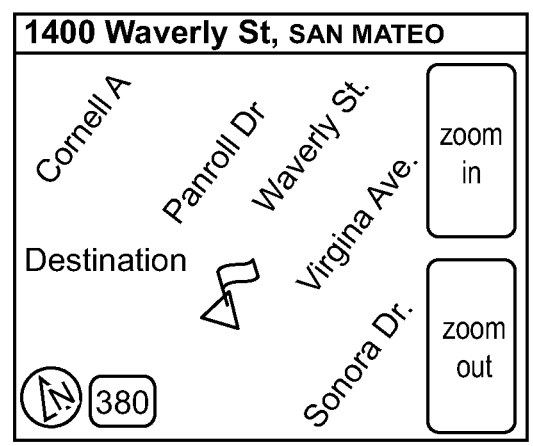

Additional screens may be accessed at any time by pressing the "views" button more than once. In FIG. 83, the screen displays a trip summary including, for example, distance traveled, current speed, current heading, departure and current times, total travel time, ETA, elevation and the like. This screen may also display a count of the number of "jousts" experienced by the device. In this context, a "joust" comprises passing another vehicle with similar equipment communicating via a wireless communications network such as is described in the previously reference co-pending patent applications. Jousts may also refer to events of passing fixed roadside network egress points in the communication network. FIG. 84 shows a GPS summary screen, also accessible via the "views" button giving number of satellites, strength of signal, latitude, longitude, accuracy, and the like. The screen shown in FIG. 84 would be applicable to an implementation of the present invention in which vehicle position is determined using a global positioning system transceiver. This is the presently preferred embodiment, although other equivalent means of determining vehicle position, heading, velocity, and the like are included within the scope of the present invention.

Figure 87A:
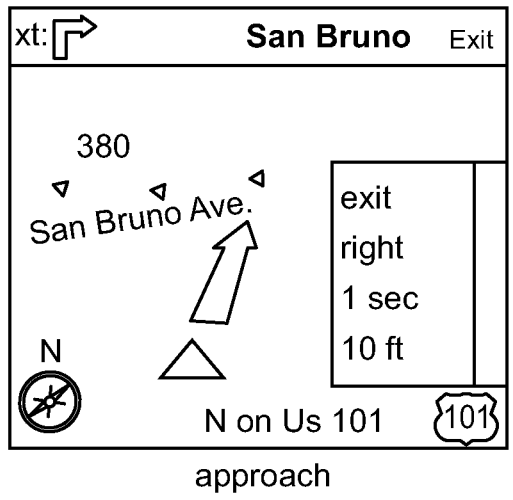
FIG. 87a to FIG. 87c are screen shots showing turn-by-turn data of various embodiments of the present invention.
Figure 87B:
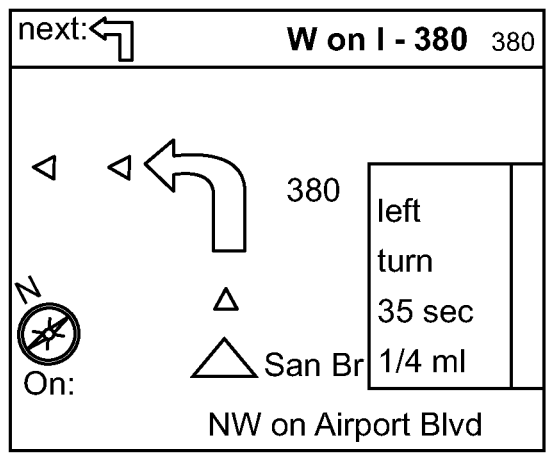
Figure 87C:
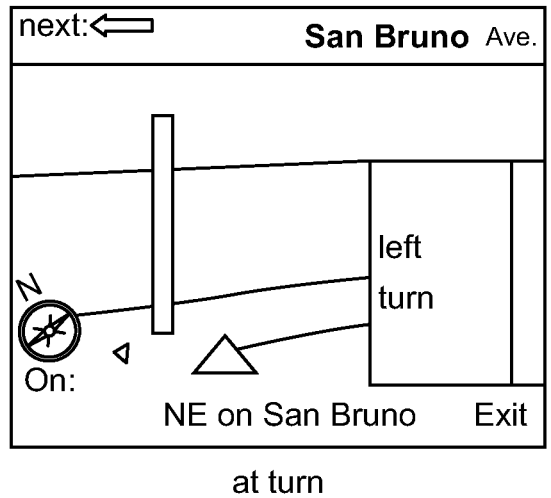

FIG. 85 through FIG. 99 show examples of screens that may be displayed to a user based on situation and user input. FIG. 85 (containing FIGS. 85*a*-85*e*) shows various possible map views. In these examples, no routes have been generated. The maps show possible traffic issues in read and/or yellow to indicate the potential severity of the disruptions. The locations of safety notifications or alerts may also be indicated. FIG. 86 (containing FIGS. 86*a*-86*h*) shows various embodiments of route overview screen displays. These generally include color-coded routes with corresponding ETA and distance estimates. The "turns" buttons may be pressed to access a turn-by-turn interface such as that illustrated in FIG. 87 (containing FIGS. 87*a*-87*c*). Alternatively, the turn-by-turn data may be presented as a list of upcoming turns as shown in FIG. 88 (containing FIGS. 88*a*-88*f*). This view is similar to that provided by online, World Wide Web-based interfaces such as for example those by Mapquest™ or Yahoo™ Also shown in FIG. 88 is an illustrative series of screen shots demonstrating methods for showing traffic details. Color coding (red, yellow, orange, etc.) and/or text feedback may be used to convey the information.

Figure 89A:
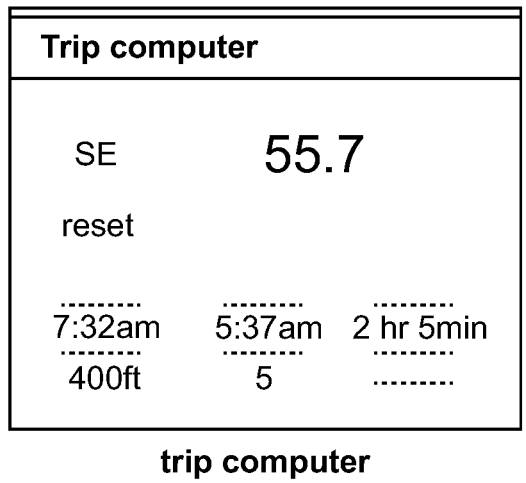
FIG. 89a to FIG. 89c are screen shots showing various examples of displaying trip data and vehicle position data of various embodiments of the present invention.
Figure 89B:
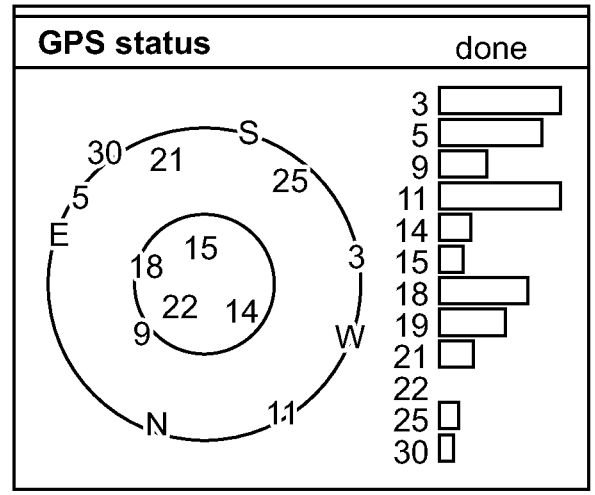
Figure 89C:
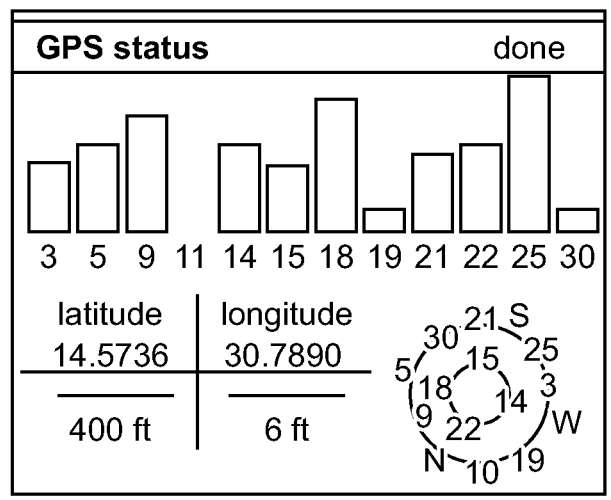
Figure 90A:
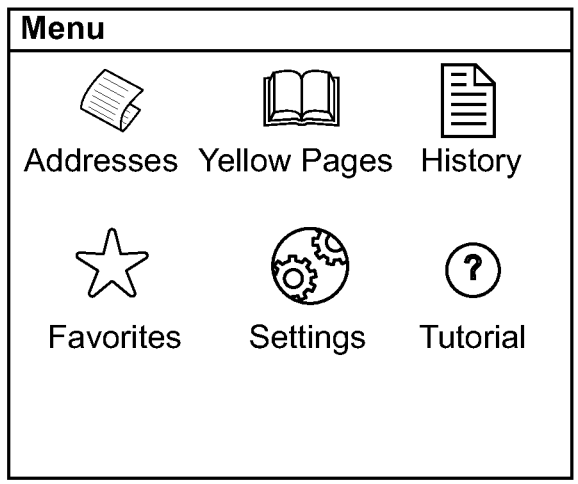
FIG. 90a to FIG. 90f are screen shots showing various examples of menu screens of various embodiments of the present invention.
Figure 90B:
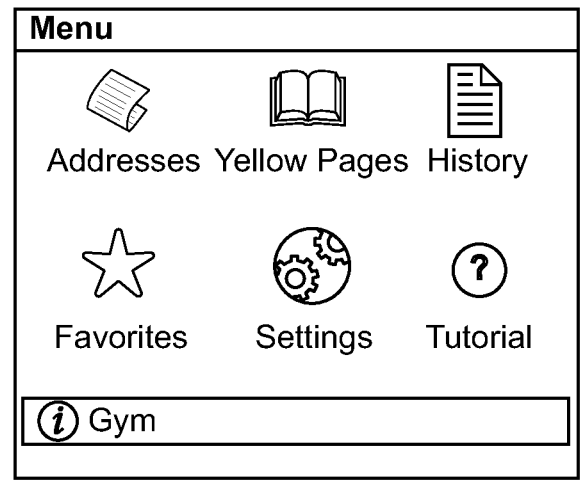
Figure 90C:
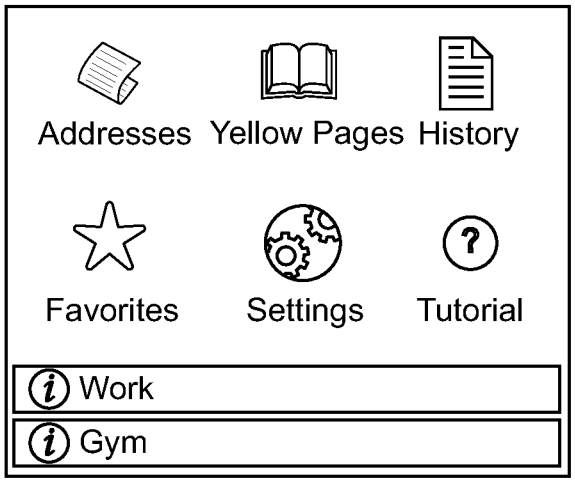
Figure 90D:
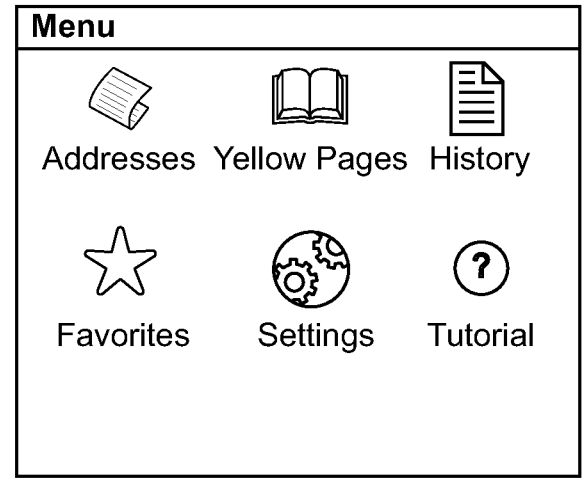
Figure 90E:
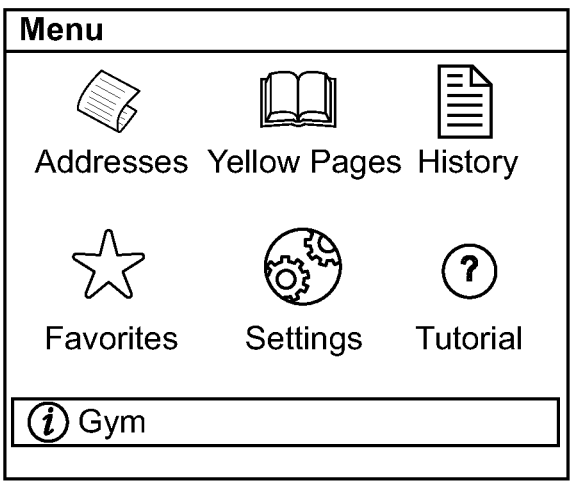
Figure 90F:
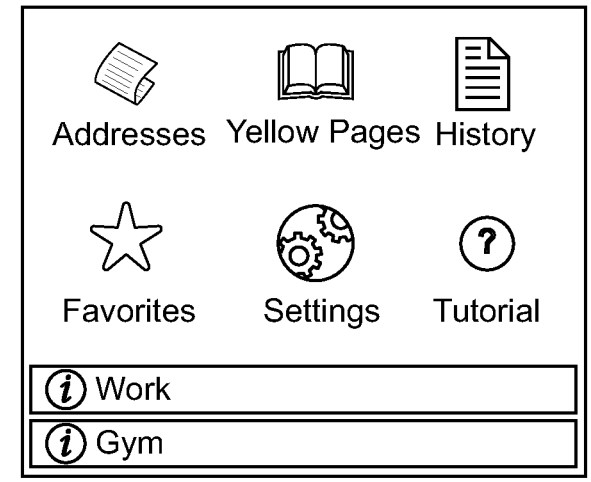
Figure 91A:
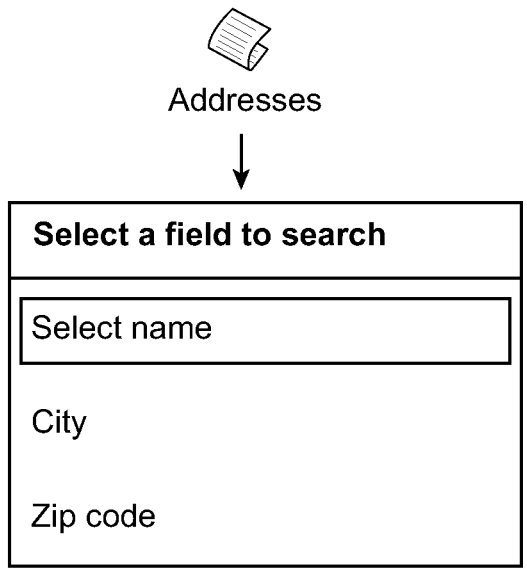
Figure 91C:
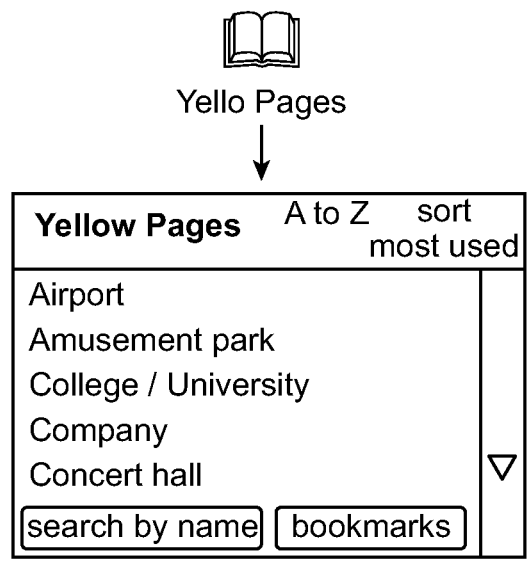
Figure 91B:
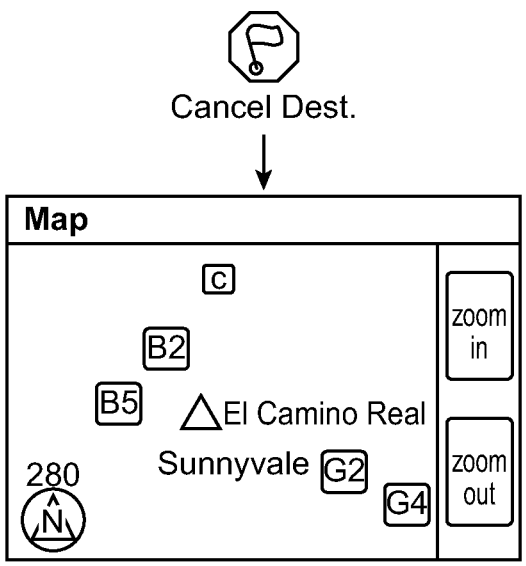
Figure 91D:
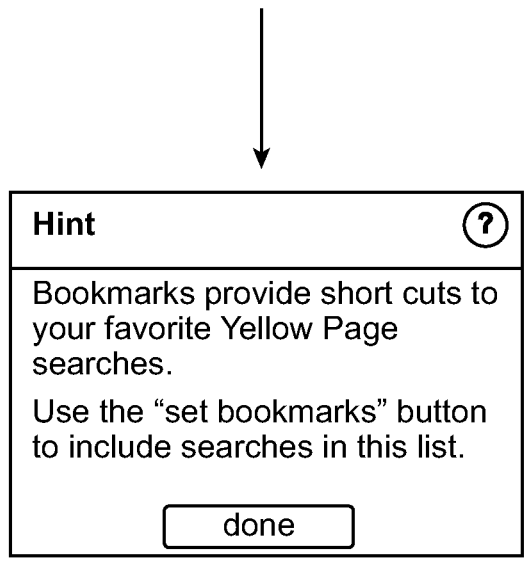
Figures 98A, 98B, 98C:
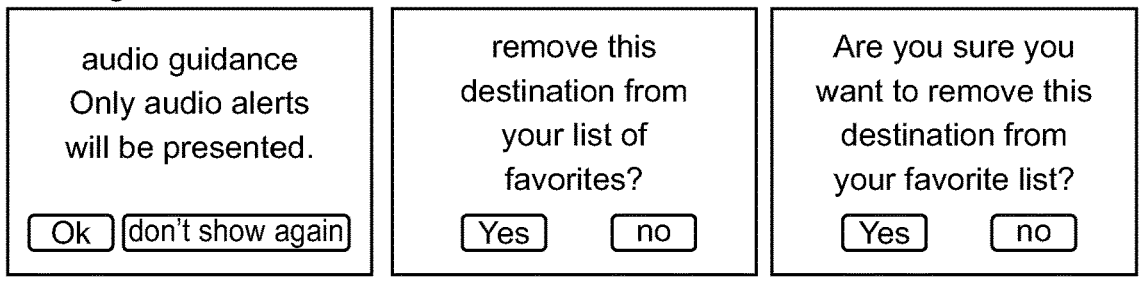
FIG. 98a to FIG. 98o are screen shots showing different types of messages of various embodiments of the present invention.
Figures 98D, 98E, 98F:
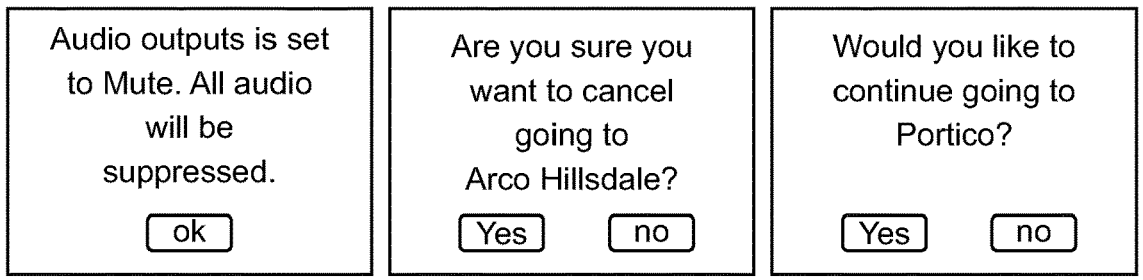
Figures 98G, 98H, 98I:
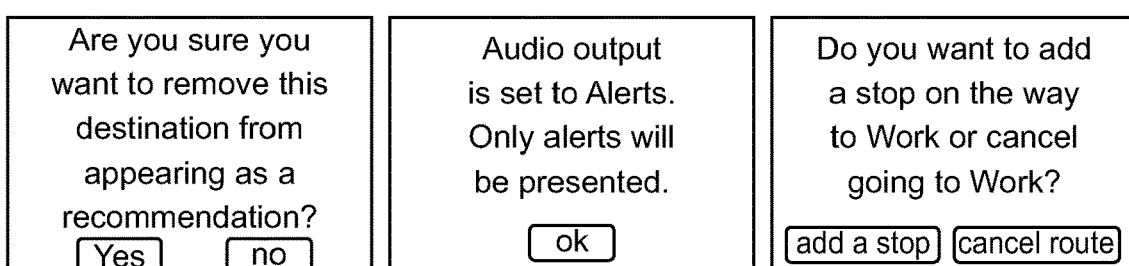
Figures 98J, 98K, 98L:
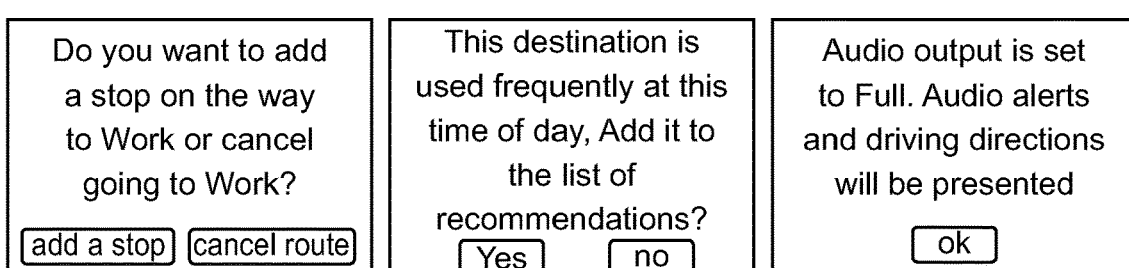
Figures 98M, 98N, 98O:
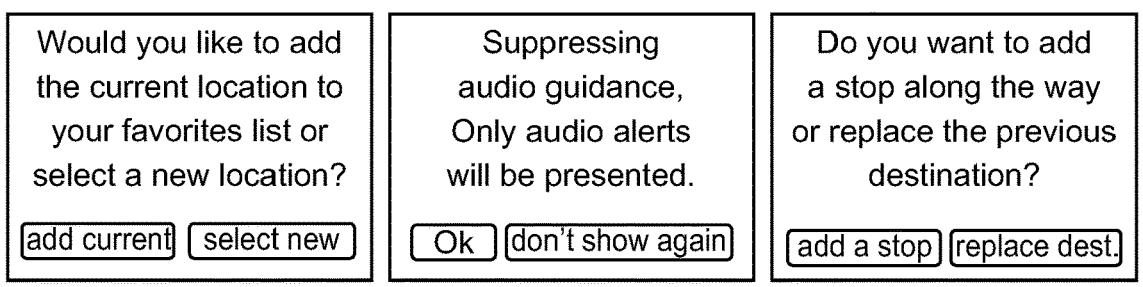
Figure 99A:
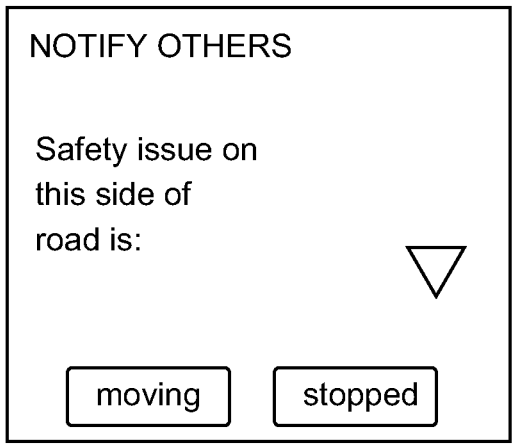
FIG. 99a to FIG. 99d are screen shots showing additional types of messages of various embodiments of the present invention.
Figure 99B:
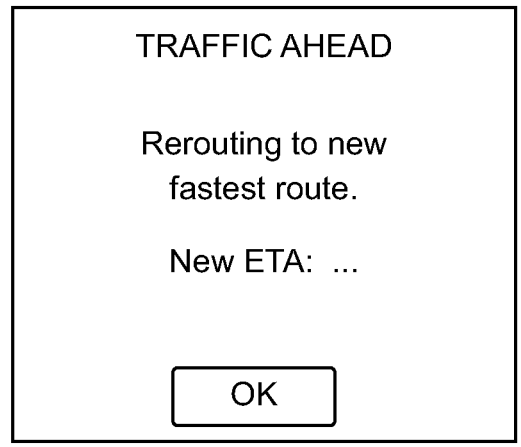
Figure 99C:
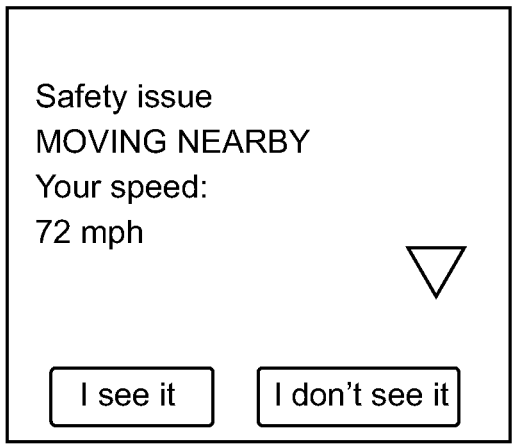
Figure 99D:
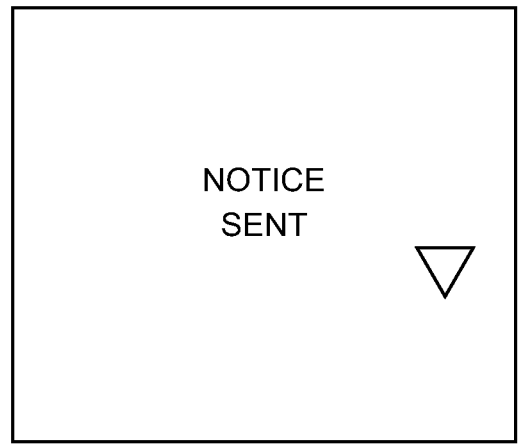

FIG. 89 (containing FIGS. 89a-89c) shows three status screens similar to those shown in FIG. 83 and FIG. 84. FIG. 90 (containing FIGS. 90a-90f) shows examples of menu screens. FIG. 91 (containing FIGS. 91a-91h) illustrates one embodiment of an online tutorial/help feature for first time or early-stage users. FIG. 92 (containing 92a-92h) shows interface screens for accessing, finding, entering, selecting, etc. addresses for destinations and/or locations and for saving or deleting this information as favorites. FIG. 93 (containing FIGS. 93a-93g) illustrates potential embodiments of list screens that might be generated by accessing history, favorites, or yellow pages listings. FIG. 94 (containing FIGS. 94a-94g) shows examples of yellow pages search screens and FIG. 95 shows examples of bookmark screens. FIG. 96 (containing FIGS. 96a-96e) illustrates possible address entry screens, and FIG. 97 (containing FIGS. 97a-97f) shows the adaptive keyboard embodiment wherein the screen highlights only those letters that may be entered to give a name or value that is available in the navigation database. FIG. 98 (containing FIGS. 98a-98n) and FIG. 99 (containing FIGS. 99a-99d) show several examples of messages via which the device may communicate important information to the user.

The foregoing description of specific embodiments and examples of the invention have been presented for the purpose of illustration and description, and although the invention has been illustrated by certain of the preceding examples, it is not to be construed as being limited thereby. They are not intended to be exhaustive or to limit the invention to the precise forms disclosed, and obviously many modifications, embodiments, and variations are possible in light of the above teaching. It is intended that the scope of the invention encompass the generic area as herein disclosed, and by the claims appended hereto and their equivalents.

What is claimed is:

1. A method on a device, the method comprising:
   determining a plurality of destinations based on at least one of a current time of day or day of week and at least one of a time of day or day of week at which each destination in the plurality of destinations was previously traveled to;
   calculating a plurality of routes associated with at least one destination of the plurality of destinations;
   determining that the device is travelling along a route in the plurality of routes without receiving user input selecting the route;
   displaying navigational data associated with the route in response to determining that the device is travelling along the route;
   determining one or more events are associated with the route;
   prompting a user of the device to provide information associated with the one or more events; and
   transmitting a notification based on receiving the information from the user, wherein the notification notifies other users associated with the route regarding the one or more events via a user interface of a navigation system.

2. The method of claim 1, further comprising:
   displaying an estimated time of arrival for the at least one destination based on the route.

3. The method of claim 1, further comprising:
   presenting the plurality of routes on a display of the device.

4. The method of claim 3, further comprising:
   maintaining each route in the plurality of routes on the display as the device travels along the route.

5. The method of claim 4, further comprising:
   updating each of the routes in the plurality of routes as the device travels along the route.

6. The method of claim 1, further comprising:
   displaying a set of additional destinations on a display of the device as the device travels along the route.

7. The method of claim 6, further comprising:
   removing a destination from the set of additional destinations after a decision point within navigation data associated with the destination from the set of additional destinations has been passed.

8. The method of claim 7, wherein removing the destination from the set of additional destination is based on at least one of:
   a time having lapsed since passing the decision point; and
   a distance having been traveled since passing the decision point.

9. The method of claim 1, wherein prompting the user comprises:
   prompting the user to one of
      confirm that the one or more events are occurring,
      confirm that the one or more events are no longer occurring, or
      provide at least one attribute associated with the one or more events.

10. A device comprising:
    a non-transitory computer readable medium; and
    computer readable instructions, stored on the non-transitory computer readable medium, that when executed are effective to cause the device to:
       determine a plurality of destinations based on at least one of a current time of day or day of week and at least one of a time of day or day of week at which each destination in the plurality of destinations was previously traveled to;
       calculate a plurality of routes associated with at least one destination of the plurality of destinations;
       determine that the device is travelling along a route in the plurality of routes without receiving user input selecting the route;
       display navigational data associated with the route in response to determining that the device is travelling along the route;
       determine one or more events are associated with the route;
       prompt a user of the device to provide information associated with the one or more events; and
       transmit a notification based on receiving the information from the user, wherein the notification notifies other users associated with the route regarding the one or more events via a user interface of a navigation system.

11. The device of claim 10, wherein the computer readable instructions further cause the device to:
    display an estimated time of arrival for the at least one destination based on the route.

12. The device of claim 10, wherein the computer readable instructions further cause the device to:
    present the plurality of routes on a display of the device; and
    maintain each route in the plurality of routes on the display as the device travels along the route.

13. The device of claim 12, wherein the computer readable instructions further cause the device to:
update each of the routes in the plurality of routes as the device travels along the route.

14. The device of claim 10, wherein the computer readable instructions further cause the device to:
display a set of additional destinations on a display of the device as the device travels along the route; and
remove a destination from the set of additional destinations after a decision point within navigation data associated with the destination from the set of additional destinations has been passed.

15. A non-transitory computer readable medium comprising readable instructions that are executable by at least one processor to perform a method comprising:
determining a plurality of destinations based on at least one of a current time of day or day of week and at least one of a time of day or day of week at which each destination in the plurality of destinations was previously traveled to;
calculating a plurality of routes associated with at least one destination of the plurality of destinations;
determining that the device is travelling along a route in the plurality of routes without receiving user input selecting the route;
displaying navigational data associated with the route in response to determining that the device is travelling along the route;
determining one or more events are associated with the route;
prompting a user of the device to provide information associated with the one or more events; and
transmitting a notification based on receiving the information from the user, wherein the notification notifies other users associated with the route regarding the one or more events via a user interface of a navigation system.

16. The non-transitory computer readable medium of claim 15, wherein the method further comprises:
displaying an estimated time of arrival for the at least one destination based on the route.

17. The non-transitory computer readable medium of claim 15, wherein the method further comprises:
presenting the plurality of routes on a display of the device.

18. The non-transitory computer readable medium of claim 17, wherein the method further comprises:
maintaining each route in the plurality of routes on the display as the device travels along the route.

19. The non-transitory computer readable medium of claim 18, wherein the method further comprises:
updating each of the routes in the plurality of routes as the device travels along the route.

20. The non-transitory computer readable medium of claim 15, wherein the method further comprises:
displaying a set of additional destinations on a display of the device as the device travels along the route; and
remove a destination from the set of additional destinations after a decision point within navigation data associated with the destination from the set of additional destinations has been passed.

* * * * *